(12) United States Patent
Miyajima

(10) Patent No.: US 8,102,606 B2
(45) Date of Patent: Jan. 24, 2012

(54) ZOOM LENS SYSTEM AND ELECTRONIC IMAGE PICKUP APPARATUS USING THE SAME

(75) Inventor: Toru Miyajima, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 1079 days.

(21) Appl. No.: 11/985,528

(22) Filed: Nov. 14, 2007

(65) Prior Publication Data

US 2008/0111909 A1  May 15, 2008

(30) Foreign Application Priority Data

Nov. 15, 2006 (JP) ................................ 2006-309693

(51) Int. Cl.
*G02B 15/14* (2006.01)
(52) U.S. Cl. ........................ 359/690; 359/687
(58) Field of Classification Search .................. 359/687, 359/690
See application file for complete search history.

(56) References Cited

U.S. PATENT DOCUMENTS

| | | | |
|---|---|---|---|
| 6,094,313 A * | 7/2000 | Yamanashi | 359/686 |
| 6,124,972 A * | 9/2000 | Hayakawa et al. | 359/557 |
| 6,249,389 B1 * | 6/2001 | Ohtake | 359/684 |
| 6,339,509 B1 | 1/2002 | Ohtake | |
| 6,606,200 B1 | 8/2003 | Nakayama et al. | |
| 7,061,686 B2 | 6/2006 | Ohtake | |
| 7,411,741 B2 * | 8/2008 | Katakura et al. | 359/687 |
| 7,692,863 B2 * | 4/2010 | Bito et al. | 359/557 |
| 7,907,350 B2 * | 3/2011 | Mitsuki | 359/684 |
| 2004/0105165 A1 * | 6/2004 | Enomoto | 359/686 |

FOREIGN PATENT DOCUMENTS

| | | |
|---|---|---|
| CN | 1 263 272 | 8/2000 |
| JP | 61-077818 | 4/1986 |
| JP | 61-091614 | 5/1986 |
| JP | 01-185608 | 7/1989 |
| JP | 01-201614 | 8/1989 |
| JP | 02-267511 | 11/1990 |
| JP | 10-148757 | 6/1998 |
| JP | 2002-207167 | 7/2002 |
| JP | 2003-329932 | 11/2003 |
| JP | 2004-212616 | 7/2004 |
| JP | 2004-258240 | 9/2004 |
| JP | 2004-347712 | 12/2004 |

OTHER PUBLICATIONS

Chinese Office Action, dated Jul. 12, 2010, issued in corresponding Chinese Patent Application No. 200710170203.5.

* cited by examiner

*Primary Examiner* — William Choi
(74) *Attorney, Agent, or Firm* — Kenyon & Kenyon LLP

(57) ABSTRACT

A zoom lens system includes, in order from an object side, a first lens unit G1 having a positive refracting power, a second lens unit G2 having a negative refracting power, a third lens unit G3 having a positive refracting power, and a fourth lens unit G4 having a positive refracting power, and at the time of zooming from a wide angle end to a telephoto end, a space between the lens units changes, and the second lens unit includes not more than three lenses, and a biconcave negative lens which satisfies the following conditional expression (1) is disposed nearest to the object side, in the second lens unit, and (the zoom lens system) is characterized by satisfying the following conditional expression (2)

$$-0.1 < SF_{2n1} < 0.5 \quad (1)$$

$$3.0 < f_t/f_w < 12.0 \quad (2).$$

26 Claims, 23 Drawing Sheets

ZOOM LENS SYSTEM AND ELECTRONIC IMAGE PICKUP APPARATUS USING THE SAME

CROSS-REFERENCE TO RELATED APPLICATION

The present application is based upon and claims the benefit of priority from the prior Japanese Patent Application No. 2006-309693 filed on Nov. 15, 2006; the entire contents of which are incorporated herein by reference.

BACKGROUND OF THE INVENTION

1. Field of the Invention

The present invention relates to a zoom lens system and an electronic image pickup apparatus using the same, and particularly to an electronic image pickup apparatus such as a video camera and a digital camera, in which, a size reduction is realized.

2. Description of the Related Art

In recent years, replacing a silver-salt film camera, a digital camera in which, and object is photographed by using a solid image pickup element such as a CCD (Charge Coupled Device) and a CMOS (Complementary Metal Oxide Semiconductor) has become a mainstream. Furthermore, there are several categories of digital cameras in a wide range, from a high-function type for professional use to a compact popular type.

A user of the popular type digital camera seeks to enjoy photography readily, anywhere at any time with a wide range of scenes. In light of this, a small size camera, particularly a slim digital camera which can be accommodated easily in a pocket of clothes or a bag, and carried conveniently has been preferred. On the other hand, while a magnification ratio of about 3 for a digital camera of a compact type has been common, a camera of a higher magnification ratio than the conventional one for widening a photography area has been sought.

As a conventional technology, a compact zoom lens system which is a four-unit zoom lens system including in order from an object side, a first lens unit having a positive refracting power, a second lens unit having a negative refracting power, a third lens unit having a positive refracting power, and a fourth lens unit having a positive refracting power, and in which, the number of lenses in the second lens unit is reduced has been disclosed in Japanese Patent Application Laid-open Publication No. 2004-258240, and No. 2004-212616.

In zoom lens systems discloses in these patent literatures, the second lens unit includes not more than three lenses, which is advantageous for making small the size of the zoom lens system in a radial direction.

Particularly, since a height from an optical axis of off-axis rays is increased in the first lens unit and the second lens unit, when an attempt is made to secure a necessary amount of an edge thickness of a lens, an axial edge thickness tends to increase remarkably. Furthermore, when the number of lenses in the second lens unit increases, since an entrance-pupil position becomes distant as viewed from the object side, the height of the off-axis rays passing through the first lens unit and the second lens unit becomes increasingly higher, and a longitudinal thickness for securing the edge thickness is required to be even more. Naturally, the amount of increase in the number of lenses increases the longitudinal thickness.

From this view point, forming the second lens unit by less number of lenses is advantageous for compactness of a lens barrel.

SUMMARY OF THE INVENTION

According to one aspect of the present invention, there is provided a zoom lens system including, in order from an object side
a first lens unit having a positive refracting power,
a second lens unit having a negative refracting power, and
a third lens unit having a positive refracting power, and
at the time of zooming from a wide angle end to a telephoto end, a space between the lens units changes, and
the second lens unit includes a biconcave negative lens which is disposed nearest to the object side, and satisfies the following conditional expression (1), and
the total number of lenses in the second lens unit is not more than three, and
the zoom lens system satisfies the following conditional expression (2)

$$-1.0 < SF_{2n1} < 0.5 \quad (1)$$

$$3.0 < f_t/f_w < 12.0 \quad (2)$$

where, $SF_{2n1}$ is defined as $SF_{2n1} = (R_{2n1f} + R_{2n1r})/(R_{2n1f} - R_{2n1r})$, when $R_{2n1f}$ is a paraxial radius of curvature of a surface on the object side, of the negative lens disposed nearest to the object side, in the second lens unit, $R_{2n1r}$ is a paraxial radius of curvature of a surface on an image side, of the negative lens disposed nearest to the object side, in the second lens unit, $f_w$ is a focal length of an entire zoom lens system, at the wide angle end, and $f_t$ is a focal length of the entire zoom lens system, at the telephoto end.

Moreover, according to another aspect of the present invention, there is provided an electronic image pickup apparatus, including
the above mentioned zoom lens system, and
an electronic image pickup element, which is disposed at an image side of the zoom lens system, and which converts an image formed by the zoom lens system, to an electronic signal.

BRIEF DESCRIPTION OF THE DRAWINGS

FIG. 1A shows a state at a wide angle end, FIG. 1B shows an intermediate state, and FIG. 1C shows a state at a telephoto end;

FIG. 10A shows a state at the wide angle end, FIG. 10B shows an intermediate state, and FIG. 10C shows a state at the telephoto end;

DETAILED DESCRIPTION OF THE INVENTION

Figure 1A:
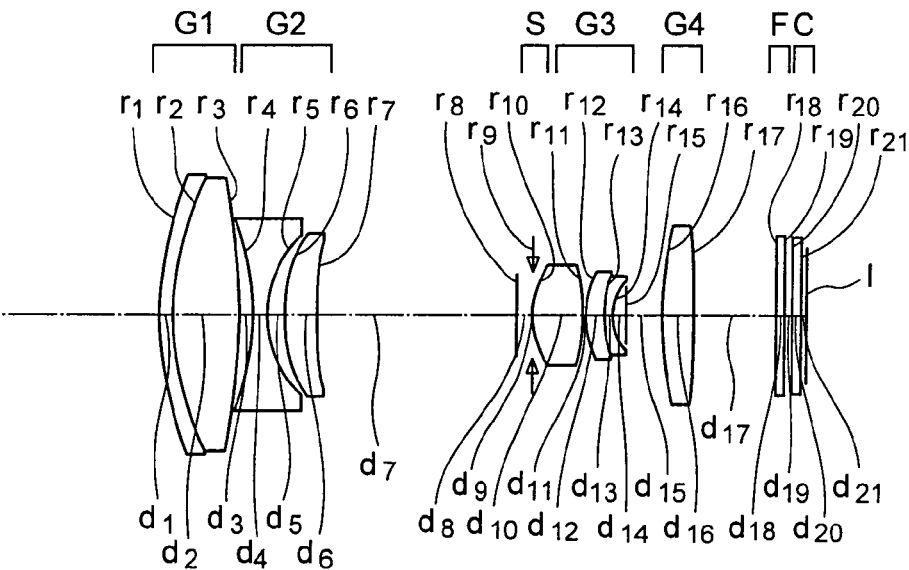
FIG. 1A, FIG. 1B, and FIG. 1C are cross-sectional views along an optical axis showing an optical arrangement at a time of infinite object point focusing according to a first embodiment of a zoom lens system of the present invention, where.

The zoom lens system according to the present invention includes, in order from an object side, a first lens unit having a positive refracting power, a second lens unit having a negative refracting power, and a third lens unit having a positive refracting power, and at a time of zooming from a wide angle end to a telephoto end, a space between the lens units change, and the second lens unit comprises a biconcave negative lens which is disposed nearest to the object side, and satisfies the following conditional expression (1), and the total number of lenses in the second lens unit is not more than three, and the zoom lens system satisfies the following conditional expression (2)

$$-1.0 < SF_{2n1} < 0.5 \tag{1}$$

$$3.0 < f_t/f_2 < 12.0 \tag{2}$$

where, $SF_{2n1}$ is defined as $SF_{2n1} = (R_{2n1f} + R_{2n1r})/(R_{2n1f} - R_{2n1r})$, when $R_{2n1f}$ is a paraxial radius of curvature of a surface on the object side, of the negative lens disposed nearest to the object side, in the second lens unit, $R_{2n1r}$ is a paraxial radius of curvature of a surface on an image side, of the negative lens disposed nearest to the object side, in the second lens unit, $f_w$ is a focal length of an entire zoom lens system, at the wide angle end, and $f_t$ is a focal length of the entire zoom lens system, at the telephoto end.

Moreover, according to a preferable aspect of the present invention, the zoom lens system includes, in order from the object side the first lens unit, the second lens unit, the third lens unit, and a fourth lens unit having a positive refracting power.

A reason for and an effect of having the abovementioned arrangement in the zoom lens system will be described below. In the present invention, for achieving a zoom ratio as in the conditional expression (2), an arrangement which includes, in order from the object side, the first lens unit having a positive refracting power, the second lens unit having a negative refracting power, the third lens unit having a positive refracting power, and a fourth lens unit having a positive refracting power, and in which, the zooming is carried out by changing a space between the lens unit has been adopted. By making such an arrangement, an optical system has been made compact, preventing an increase in an amount of movement of each unit while suppressing a fluctuation in aberration at the time of zooming, by efficiently distributing a load of zooming to each lens unit.

Moreover, making an arrangement such that the second lens unit and the third lens unit include not more than three lenses for suppressing a size in a radial direction, and an optical axial thickness of the second lens unit contributes substantially to making compact the lens barrel.

At this time, this lens unit requires substantial negative refracting power for bearing the magnification. Particularly, since a negative lens nearest to the object side, in the second lens unit requires a substantial negative refracting power, it is essential to suppress a small aberration which occurs in this negative lens. For this, this negative lens may be let to have a substantial power as a biconcave lens, and it is preferable to have balanced occurrence of aberration and compactness by setting the shape of the lens to be optimum.

It is preferable to suppress a curvature of an image-side plane, and to suppress an occurrence of various aberrations such as a longitudinal aberration, by making an arrangement such that an upper limit in the conditional expression (1) is not surpassed. Moreover, by letting principal points of the second lens unit to be positioned toward the object, it is possible to reduce further a thickness of the second lens unit, and the first lens unit can be brought closer to the second lens unit, which is advantageous for shortening an entire length.

By making an arrangement such that a lower limit in the conditional expression (1) is not surpassed, it is easy to suppress a curvature of an object-side plane, and to suppress an occurrence of various off-axis aberrations at the wide angle end.

It is more preferable that the zoom lens system satisfies the following conditional expression.

$$-0.5 < SF_{2n1} < 0.5 \quad (1')$$

It is even more preferable that the zoom lens system satisfies the following conditional expression.

$$-0.45 < SF_{2n1} < 0.45 \quad (1'')$$

By satisfying the conditional expressions (1') and (1''), it is possible to have the abovementioned effect.

The conditional expression (2) is an expression which regulates the magnification ratio for exerting a performance of the zoom lens system of the present invention. By making an arrangement such that an upper limit in the conditional expression (2) is not surpassed, an amount of movement of the lens units can be suppressed easily, and it is easy to suppress the entire length of the zoom lens system.

By making an arrangement such that a lower limit in the conditional expression (2) is not surpassed, a taking image angle is changed is carried out while having the full merit of the compactness.

It is more preferable that the zoom lens system satisfies the following conditional expression.

$$5.0 < f_t/f_w < 10.0 \quad (2')$$

It is even more preferable that the zoom lens system satisfies the following conditional expression.

$$6.0 < f_t/f_w < 8.0 \quad (2'')$$

By satisfying the conditional expressions (2') and (2''), it is possible to show further the abovementioned effect.

Furthermore, in the zoom lens system, it is preferable that the first lens unit includes two lenses, in order from the object side, a negative lens having a concave surface directed toward and image side, and a biconvex positive lens, and the zoom lens system satisfies the following conditional expression.

$$1.0 < R_{1pr}/R_{2n1f} < 5.0 \quad (A),$$

$$0.5 < SF_{1n} < 30.0 \quad (B), \text{ and}$$

$$0.1 < R_{1nr}/R_{1pf} < 10.0 \quad (C)$$

where, $R_{1pr}$ denotes a paraxial radius of curvature of a surface on the image side, of the positive lens in the first lens unit, $SF_{1n}$ is defined as $SF_{1n} = (R_{1nf} + R_{1nr})/(R_{1nf} - R_{1nr})$, when $R_{1nf}$ denotes a paraxial radius of curvature of a surface on the object side, of the negative lens in the first lens unit, and $R_{1pr}$ denotes a paraxial radius of curvature of a surface on the image side, of the negative lens in the first lens unit.

A reason for and an effect of having the abovementioned arrangement in the zoom lens system will be described below. When a lens surface nearest to the object side, of the second lens unit is let to be a concave surface, and when a lens surface on the image side, of the first lens unit is let to be a convex surface, an effect of aberration can be suppressed easily. Moreover, the first lens unit can be positioned further toward the second lens unit, at the wide angle end, which is advantageous for making small the entire length. Moreover, by forming the first lens unit by the abovementioned two lenses, it is easy to carry out correction of aberration in the first lens unit, and to make the system small. For ease of reducing an effective diameter and the entire length at the wide angle end, it is preferable that the abovementioned conditional expressions (A), (B), and (C) are satisfied.

The conditional expression (A) is an expression in which a relationship between paraxial radius of curvature of mutually facing lens surfaces of the first lens unit and the second lens unit is specified. By making small an absolute value of a curvature of a surface of emergence of the positive lens, by making an arrangement such that a lower limit in the conditional expression (A) is not surpassed, a surrounding portion of the surface of emergence of the positive lens, at the wide angle end can be brought closer to the second lens unit, which is advantageous for correction of off-axis aberration at the wide angle end.

By making an arrangement such that an upper limit in the conditional expression (A) is not surpassed, the first lens unit and the second lens unit can be brought closer, at the wide angel end, and it is advantageous for shortening the entire length of the zoom lens system.

The conditional expression (B) is an expression in which a shape of the negative lens is specified. By making an arrangement such that a lower limit in the conditional expression (B) is not surpassed, it is easy to suppress a height of incidence of light rays which are incident on the negative lens, and to make small an effective diameter of the first lens unit.

By making an arrangement such that an upper limit in the conditional expression (B) is not surpassed, it is easy to secure a negative power of the negative lens, and it is advantageous for the correction of aberration in the first lens unit.

The conditional expression (C) is an expression in which a relationship of a paraxial radius of curvature of mutually facing lens surfaces of the negative lens and the positive lens is specified. By making an arrangement such that a lower limit in the conditional expression (C) is not surpassed, it is possible to make small a radius of curvature of an image-side surface of the negative lens, and is preferable for the correction of aberration. Moreover, it is easy to suppress a thickness on the optical axis, of the first lens unit.

By making an arrangement such that an upper limit in the conditional expression (C) is not surpassed, a circumference of the negative lens can be brought closer to the positive lens, and it is advantageous for reducing a size in a radial direction.

Moreover, in the zoom lens system, it is preferable that the first lens unit satisfies the following conditional expression.

$$0 \leq d_{12}/\Sigma_{1G} < 0.2 \quad (D)$$

where, $d_{12}$ denotes a distance on an optical axis between the negative lens and the positive lens in the first lens unit, and $\Sigma_{1G}$ denotes a thickness on the optical axis of the first lens unit.

Surpassing a lower limit value in the conditional expression (D) is physically impossible. By making an arrangement such that an upper limit in the conditional expression (D) is not surpassed, an optical axial distance of the negative lens and the positive lens is reduced, which is advantageous for making the size small. Moreover, an effect on the aberration due to decentering is suppressed.

For achieving a favorable optical performance efficiently, while realizing the compactness, various ideas, other than those mentioned above, have been devised in the present invention. These will be described below in detail. For instance, in the zoom lens system, it is preferable to make the following arrangement regarding the power of the first lens unit.

$$0.40 < f_1/f_t < 0.90 \quad (3)$$

where, $f_1$ denotes a focal length of the first lens unit, and
$f_t$ denotes a focal length of the entire zoom lens system at a telephoto end.

By making an arrangement such that an upper limit in the conditional expression (3) is not surpassed, the power of the first lens unit is secured, and a change in the entire length of the zoom lens system is suppressed, which is advantageous for making the lens barrel small. Moreover, even by suppressing the power of the second lens unit, it is easy to secure a magnification load in the second lens unit, and it is advantageous for reducing an aberration, and making a size small of the second lens unit.

By making an arrangement such that a lower limit in the conditional expression (3) is not surpassed, the power of the first lens unit is suppressed, and an occurrence of a spherical aberration and a comatic aberration at the telephoto end is suppressed, and it is easy to secure the favorable optical performance.

It is more preferable that the zoom lens system satisfies the following conditional expression.

$$0.50 < f_1/f_t < 0.80 \quad (3')$$

It is even more preferable that the zoom lens system satisfies the following conditional expression.

$$0.55 < f_1/f_t < 0.70 \quad (3'')$$

By satisfying the conditional expressions (3') and (3''), it is possible to show further, the abovementioned effect.

Moreover, it is preferable that the zoom lens system satisfies the following conditional expression.

$$0.10 < |f_2/f_t| < 0.20 \quad (4)$$

where, $f_2$ denotes a focal length of the second lens unit, and
$f_t$ denotes a focal length of the entire zoom lens system at a telephoto end.

By making an arrangement such that an upper limit in the conditional expression (4) is not surpassed, the power of the second lens unit is secured, and the an amount of change in a distance between the lens units for zooming is suppressed, which is advantageous for making the lens barrel compact. Moreover, it is easy to achieve a magnification load even when the power of the first lens unit is suppressed, and it is advantageous for reduction of an occurrence of aberration in the first lens unit.

By making an arrangement such that a lower limit in the conditional expression (4) is not surpassed, the refracting power is suppressed moderately, and it is easy to suppress the occurrence of aberration. Moreover, a longitudinal magnification is suppressed from being excessively small, and it is advantageous for securing a zooming ratio for the amount of change in the distance.

It is more preferable that the zoom lens system satisfies the following conditional expression.

$$0.12 < |f_2/f_t| < 0.19 \quad (4')$$

It is even more preferable that the zoom lens system satisfies the following conditional expression.

$$0.15 < |f_2/f_t| < 0.18 \quad (4'')$$

By satisfying the conditional expressions (4') and (4''), it is possible to show further the abovementioned effect.

It is preferable that the zoom lens system satisfies the following conditional expression.

$$0.10 < f_3/f_t < 0.30 \quad (5)$$

where, $f_3$ denotes a focal length of the third lens unit, and
$f_t$ denotes a focal length of the entire zoom lens system, at a telephoto end.

When an arrangement is made such that an upper limit in the conditional expression (5) is not surpassed, it is easy to secure the power and to suppress an amount of change in the distance between the lens units, for the magnification.

By making an arrangement such that a lower limit in the conditional expression (5) is not surpassed, it is easy to suppress the occurrence of aberration in the third lens unit. Moreover, the longitudinal magnification is suppressed from being excessively small, and it is advantageous for securing the magnification ratio for the amount of change in the distance.

It is more preferable that the zoom lens system satisfies the following conditional expression.

$$0.15 < f_3/f_t < 0.28 \quad (5')$$

It is even more preferable that the zoom lens system satisfies the following conditional expression.

$$0.20 < f_3/f_t < 0.25 \quad (5'')$$

By satisfying the conditional expressions (5') and (5''), it is possible to show further the abovementioned effect.

Moreover, it is preferable that the zoom lens system satisfies the following conditional expression.

$$0.10 < f_4/f_t < 0.70 \quad (6)$$

where, $f_4$ denotes a focal length of the fourth lens unit, and
$f_t$ denotes a focal length of the entire zoom lens system at a telephoto end.

By making an arrangement such that an upper limit in the conditional expression (6) is not surpassed, the power of the fourth lens unit is secured, and a lack of correction of an astigmatism and a distortion in the entire zooming range is suppressed.

By making an arrangement such that a lower limit in the conditional expression (6) is not surpassed, the power of the fourth lens unit is suppressed moderately, and an excessive correction of the astigmatism and the distortion in the entire zooming range is suppressed.

It is more preferable that the zoom lens system satisfies the following conditional expression.

$$0.30 < f_4/f_t < 0.65 \quad (6')$$

It is even more preferable that the zoom lens system satisfies the following conditional expression.

$$0.45 < f_4/f_t < 0.60 \quad (6'')$$

By satisfying the conditional expressions (6') and (6''), it is possible to show further the abovementioned effect.

Moreover, the fourth lens unit may be formed by a plastic material. Particularly, it is preferable to have a one-lens structure for the fourth lens unit. In a case of using an electronic image pickup element such as a CCD and a CMOS, it is preferable to let the fourth lens unit have a function of allowing light rays to be incident effectively on the imaging element by disposing an exit-pupil position at an appropriate position.

For carrying out such function, when the power is set in a range described in the conditional expression (6), no comparatively substantial power is required, and it is possible to structure by using a glass material such as plastic, having a low refractive index. Moreover, when plastic is used in the fourth lens unit, a cost is suppressed to be low, and it is possible to provide a cheaper zoom lens system.

Moreover, in the zoom lens system, it is preferable that the first lens unit includes two lenses namely, a negative lens and a positive lens, and the zoom lens system satisfies the following conditional expression.

$$38.0 < \nu_{d1p} - \nu_{d1n} \quad (7)$$

where, $\nu_{d1p}$ denotes an Abbe's number for a d-line of the positive lens in the first lens unit, and $\nu_{d1n}$ denotes an Abbe's number for a d-line of the negative lens in the first lens unit.

A reason for and an effect of having the abovementioned arrangement in the zoom lens system will be described below. The conditional expression (7) is an expression related to a correction of the longitudinal aberration and a correction of an off-axis chromatic aberration of magnification. For correcting favorably in the first lens unit the chromatic aberration which occurs due to substantial positive power of the first lens unit, it is preferable to use a material having a small chromatic dispersibility for the positive lens, and a material having a large chromatic dispersibility for the negative lens. Concretely, it is preferable that the conditional expression (7) which regulates a difference between an Abbe's number for the two lenses is satisfied.

Making an arrangement such that a lower limit in the conditional expression (7) is not surpassed is advantageous for achieving a favorable correction of the chromatic aberration, and securing the zooming ratio.

It is more preferable that the zoom lens system satisfies the following conditional expression.

$$47.0 < \nu_{d1p} - \nu_{d1n} \quad (7')$$

It is even more preferable that the zoom lens system satisfies the following conditional expression.

$$58.0 < \nu_{d1p} - \nu_{d1n} \quad (7'').$$

By satisfying the conditional expressions (7') and (7''), it is possible to show further the abovementioned effect.

Moreover, it is preferable that the zoom lens system satisfies the following conditional expression for the positive lens in the first lens unit.

$$62.0 < \nu_{d1p} < 95.0 \quad (8)$$

where, $\nu_{d1p}$ denotes an Abbe's number for a d-line of the positive lens in the first lens unit.

By making an arrangement such that an upper limit in the conditional expression (8) is not surpassed, a mass production and a procurement of the material become easy, and it is advantageous for the cost reduction.

By making an arrangement such that a lower limit in the conditional expression (8) is not surpassed, the chromatic dispersion is suppressed, and it is advantageous for reducing the chromatic aberration.

It is more preferable that the zoom lens system satisfies the following conditional expression.

$$65.0 < \nu_{d1p} < 93.0 \quad (8')$$

It is even more preferable that the zoom lens system satisfies the following conditional expression.

$$80.0 < \nu_{d1p} < 90.0 \quad (8'')$$

By satisfying the conditional expressions (8') and (8''), it is possible to show further the abovementioned effect.

Moreover, in the zoom lens system, it is preferable that a surface nearest to the image side, of the second lens unit is a concave surface, and the third lens unit includes a positive lens which is disposed nearest to the object side, and of which, a surface on the object side is a convex surface, and the zoom lens system satisfies the following conditional expression.

$$62.0 < \nu_{d3p} < 95.0 \quad (9)$$

where, $\nu_{d3p}$ denotes an Abbe's number for a d-line of the positive lens in the third lens unit.

A reason for and an effect of having the abovementioned arrangement will be described below. It is easy to bring closer the second lens unit and the third lens unit at the telephoto end. Moreover, an axial light beam diverged from the second lens unit is incident on the third lens unit. Therefore, letting the lens in the third lens unit nearest to the object side to be the positive single lens, and imparting a convergence effect on the diverged light beam is advantageous for making small the third lens unit.

By making an arrangement such that an upper limit in the conditional expression (9) is not surpassed, the mass production and the procurement of the material become easy, and it is effective for the cost reduction.

By making an arrangement such that a lower limit in the conditional expression (9) is not surpassed, the chromatic dispersion is suppressed, the longitudinal chromatic aberration is reduced, and it is easy to achieve favorable optical performance over the entire zooming range.

It is more preferable that the zoom lens system satisfies the following conditional expression.

$$65.0 < \nu_{d3p} < 93.0 \quad (9')$$

It is even more preferable that the zoom lens system satisfies the following conditional expression.

$$80.0 < \nu_{d3p} < 90.0 \quad (9'')$$

By satisfying the conditional expressions (9') and (9''), it is possible to show further the abovementioned effect.

Moreover, in the zoom lens system, it is preferable that the following conditional expression is satisfied.

$$1.85 < n_{d1n} < 2.10 \quad (10)$$

where, $n_{d1n}$ denotes a refractive index for a d-line, of the negative lens in the first lens unit.

By making an arrangement such that an upper limit in the conditional expression (10) is not surpassed, the mass production and the procurement of the material become easy, and it is advantageous for the cost reduction.

By making an arrangement such that a lower limit in the conditional expression (10) is not surpassed, an absolute value of a curvature of a lens surface is suppressed to be small even when the desired refracting power is achieved, and it is possible to reduce an occurrence of distortion and an image plane curvature at the wide angle end, and the comatic aberration at the wide angle end and the telephoto end.

It is more preferable that the zoom lens system satisfies the following conditional expression.

$$1.90 < n_{d1n} < 2.05 \quad (10')$$

It is even more preferable that the zoom lens system satisfies the following conditional expression.

$$1.95 < n_{d1n} < 2.05 \quad (10'')$$

By satisfying the conditional expressions (10') and (10"), it is possible to show further the abovementioned effect.

Moreover, in the zoom lens system, it is preferable that the following conditional expression is satisfied.

$$1.76 < n_{d2n} < 2.00 \quad (11)$$

where, $n_{d2n}$ denotes a refractive index for a d-line, of the negative lens in the second lens unit.

A reason for and an effect of making the abovementioned arrangement in the zoom lens system will be described below. Suppressing an increase in curvature of the biconcave negative lens in the second lens unit is advantageous for correction of various off-axis aberrations. By making an arrangement such that an upper limit in the conditional expression (11) is not surpassed, the mass production and the procurement of the material become easy, and it is advantageous for the cost reduction.

By making an arrangement such that a lower limit in the conditional expression (10) is not surpassed, it is possible to make small the absolute value of curvature of the lens surface even when the refracting power is secured, and it is possible to suppress the occurrence of the distortion and the image plane curvature at the wide angle end, and the comatic aberration at the wide angle end and the telephoto end.

It is more preferable that the zoom lens system satisfies the following conditional expression.

$$1.80 < n_{d2n} < 1.95 \quad (11')$$

It is even more preferable that the zoom lens system satisfies the following conditional expression.

$$1.83 < n_{d2n} < 1.90 \quad (11'')$$

By satisfying the conditional expressions (11') and (11"), it is possible to show further the above-mentioned effect.

Moreover, in the zoom lens system, it is preferable that the second lens unit includes a positive lens which is disposed nearest to the image side, or second from the image side, and which satisfies the following conditional expression.

$$1.80 < n_{d2p} < 2.15 \quad (12)$$

where, $n_{d2p}$ denotes a refractive index for a d-line, of the positive lens in the second lens unit.

A reason for and an effect of having the above-mentioned arrangement in the zoom lens system will be described below. By disposing the positive lens in the second lens unit, nearest to the image side, or second from the image side, it is advantageous for reducing an aberration which is susceptible to occur in the negative second lens unit, and making the size small by adjustment of principal points.

By making an arrangement such that an upper limit in the conditional expression (12) is not surpassed, the mass production and the procurement of the material become easy, and it is advantageous for the cost reduction.

By making an arrangement such that a lower limit in the conditional expression (11) is not surpassed, the absolute value of curvature of the lens surface is suppressed to be small even when the desired refracting power is achieved, and it is possible to reduce the occurrence of the distortion and the image plane curvature at the wide angle end, and the comatic aberration at the wide angle end and the telephoto end.

It is more preferable that the zoom lens system satisfies the following conditional expression.

$$1.84 < n_{d2p} < 2.10 \quad (12')$$

It is even more preferable that the zoom lens system satisfies the following conditional expression.

$$1.90 < n_{d2p} < 2.10 \quad (12'')$$

By satisfying the conditional expressions (12') and (12"), it is possible to show further the abovementioned effect.

Moreover, in the zoom lens system, it is preferable that the following conditional expression is satisfied.

$$-0.8 < SF_{1p} < -0.1 \quad (13)$$

where, $SF_{1p}$ is defined as $SF_{1p} = (R_{1pf} + R_{1pr})/(R_{1pf} - R_{1pr})$, when $R_{1pf}$ is a paraxial radius of curvature of a surface on an object side, of the positive lens in the first lens unit, and $R_{1pr}$ is a paraxial radius of curvature of a surface on an image side, of the positive lens in the first lens unit.

By making an arrangement such that an upper limit in the conditional expression (13) is not surpassed, it is advantageous for correction of an aberration such as the image plane curvature which occurs at a an image-side surface of lens, at the wide angle end side.

On the other hand, by making an arrangement such that a lower limit in the conditional expression (13) is not surpassed, it is advantage for correction of the spherical aberration at the telephoto end side, and for having a high zooming ratio. Moreover, positions of principal points of the first lens unit are suppressed from being on the object side, and the principal points of the first lens unit and the second lens unit are susceptible to be closer, and it is easy to lower the height of light rays even when the desired image angle is secured. Consequently, it is possible to reduce the axial thickness even when the edge thickness of lenses in the first lens unit is secured, and it is advantageous for making the size small.

It is more preferable that the zoom lens system satisfies the following conditional expression.

$$-0.75 < SF_{1p} < -0.11 \quad (13')$$

It is even more preferable that the zoom lens system satisfies the following conditional expression.

$$-0.35 < SF_{1p} < -0.13 \quad (13'')$$

By satisfying the conditional expressions (13") and (13"), it is possible to show further the abovementioned effect.

Moreover, in the zoom lens system, it is preferable that the following conditional expression is satisfied.

$$1.0 < (\beta_{2t}/\beta_{2w})/(\beta_{3t}/\beta_{3w}) < 2.5 \quad (14)$$

where, $\beta_{2w}$ denotes a lateral magnification at a wide angle end, of the second lens unit, $\beta_{2t}$ denotes a lateral magnification at a telephoto end, of the second lens unit, $\beta_{3w}$ denotes a lateral magnification at the wide angle end, of the third lens unit, and $\beta_{3t}$ denotes a lateral magnification at the telephoto end, of the third lens unit.

By making an arrangement such that an upper limit in the conditional expression (14) is not surpassed, it is preferable to suppress an excessive zooming load of the second lens unit, and to suppress an occurrence of aberration due to an increase in the power, and an occurrence of various off-axis aberrations such as the image plane curvature and the chromatic aberration of magnification particularly at the telephoto end.

By making an arrangement such that a lower limit in the conditional expression (14) is not surpassed, it is preferable to suppress an increase in the size of the lens barrel due to an increase in an amount of movement of the third lens unit, and an occurrence of aberration due to an increase in the power of the third lens unit, and an occurrence of a longitudinal aberration such as the spherical aberration particularly at the telephoto end.

It is more preferable that the zoom lens system satisfies the following conditional expression.

$$1.3<(\beta_{2t}/\beta_{2w})/(\beta_{3t}/\beta_{3w})<2.0 \tag{14'}$$

It is even more preferable that the zoom lens system satisfies the following conditional expression.

$$1.5<(\beta_{2t}/\beta_{2w})/(\beta_{3t}/\beta_{3w})<1.9 \tag{14''}$$

By satisfying the conditional expressions (14') and (14"), it is possible to show further the abovementioned effect.

Moreover, in the zoom lens system, it is preferable that the following conditional expression is satisfied.

$$2.6<\beta_{2t}/\beta_{2w}<6.0 \tag{15}$$

where, $\beta_{2w}$ is a lateral magnification at a wide angle end, of the second lens unit, and $\beta_{2t}$ is a lateral magnification at a telephoto end, of the second lens unit.

By making an arrangement such that an upper limit in the conditional expression (15) is not surpassed, it is preferable to suppress an occurrence of an aberration due to the increase in the power of the second lens unit, and the occurrence of various off-axis aberrations such as the image plane curvature and the chromatic aberration of magnification at the telephoto end.

By making an arrangement such that a lower limit in the conditional expression (15) is not surpassed, it is preferable to reduce a load of the magnification effect on the other lens units. By suppressing the magnification load of the third lens unit, it is advantageous for reducing the occurrence of a longitudinal aberration such as the spherical aberration at the telephoto end. Moreover, by suppressing the magnification load of the fourth lens unit to a moderate level, it is easy to suppress to a moderate level the power of the fourth lens unit, and to suppress an excessive correction of astigmatism in the entire range.

It is more preferable that the zoom lens system satisfies the following conditional expression.

$$2.6<\beta_{2t}/\beta_{2w}<5.0 \tag{15'}$$

It is even more preferable that the zoom lens system satisfies the following conditional expression.

$$2.9<\beta_{2t}/\beta_{2w}<3.5 \tag{15''}$$

By satisfying the conditional expressions (15') and (15"), it is possible to show further the abovementioned effect.

Moreover, in the zoom lens system, it is preferable that the following conditional expression is satisfied for a zooming effect of the third lens unit.

$$1.2<\beta_{3t}/\beta_{3w}<3.0 \tag{16}$$

where, $\beta_{3w}$ denotes a lateral magnification at a wide angle end, of the third lens unit, and $\beta_{3t}$ denotes a lateral magnification at a telephoto end, of the third lens unit.

By making an arrangement such that an upper limit in the conditional expression (16) is not surpassed, it is easy to suppress an occurrence of an aberration due to the increase in the power of the third lens unit, and the occurrence of a longitudinal aberration such as the spherical aberration, particularly at the telephoto end.

By making an arrangement such that a lower limit in the conditional expression (16) is not surpassed, it is preferable to reduce the load of magnification effect on the other lens units. By suppressing the magnification load of the second lens unit, it is advantageous for reducing an occurrence of various off-axis aberrations such as an image plane curvature and the chromatic aberration of magnification at the telephoto end. Moreover, by suppressing the magnification load of the fourth lens unit, it is easy to suppress the power of the fourth lens unit to a moderate level, and to suppress an excessive correction of astigmatism in the entire range.

It is more preferable that the zoom lens system satisfies the following conditional expression.

$$1.5<\beta_{3t}/\beta_{3w}<2.5 \tag{16'}$$

It is even more preferable that the zoom lens system satisfies the following conditional expression.

$$1.7<\beta_{3t}/\beta_{3w}<2.0 \tag{16''}$$

By satisfying the conditional expressions (16') and (16"), it is possible to show further the abovementioned effect.

Moreover, in the zoom lens system, it is preferable that the following conditional expression is satisfied.

$$0.7<\beta_{4t}/\beta_{4w}<1.7 \tag{17}$$

where, $\beta_{4w}$ denotes a lateral magnification at a wide angle end, of the fourth lens unit, and $\beta_{4t}$ denotes a lateral magnification at a telephoto end, of the fourth lens unit.

A reason for and an effect of having the abovementioned arrangement in the zoom lens system will be described below. By allowing the fourth lens unit to have a moderate zooming load, the magnification load of the second lens unit and the third lens unit can be suppressed easily, and it is advantageous for securing the magnification ratio while suppressing the aberration fluctuation.

By making an arrangement such that an upper limit in the conditional expression (17) is not surpassed, it is easy to suppress an increase in the magnification load of the fourth lens unit, and to suppress the aberration. When the fourth lens unit is let to be a unit which moves at the time of focusing, it is advantageous for suppressing a fluctuation in the image plane curvature at the time of forcing.

It is preferable to reduce the magnification load on the other lens units by making an arrangement such that a lower limit in the conditional expression (17) is not surpassed. By suppressing the magnification load of the second lens unit, it is advantageous for reducing an occurrence of various off-axis aberrations such as the image plane curvature and the chromatic aberration of magnification at the telephoto end. Moreover, by suppressing the magnification load of the third lens unit, it is advantageous for reducing the occurrence of longitudinal aberration such as the spherical aberration, particularly at the telephoto end.

It is more preferable that the zoom lens system satisfies the following conditional expression.

$$0.8<\beta_{4t}/\beta_{4w}<1.5 \tag{17'}$$

It is even more preferable that the zoom lens system satisfies the following conditional expression.

$$1.0<\beta_{4t}/\beta_{4w}<1.3 \tag{17''}$$

By satisfying the conditional expressions (17') and (17'') it is possible to show further the abovementioned effect.

The following arrangement may be made regarding a total sum of an air space on an optical axis, between the second lens unit and the third lens unit, at the wide angle end, and an air space on the optical axis, between the first lens unit and the second lens unit, at the telephoto end with respect to the focal length at the telephoto end of the entire zoom lens system. For this, in the zoom lens system, it is preferable that the following conditional expression is satisfied.

$$0.4<(D_{2w}+D_{1t})/f_t<0.9 \tag{18}$$

where, $D_{2w}$ denotes an air space on an optical axis, between the second lens unit and the third lens unit, at a wide angle end, $D_{1t}$ denotes an air space on the optical axis, between the first lens unit and the second lens unit, at a telephoto end, and $f_t$ denotes a focal length of the entire zoom lens system at the telephoto end.

By making an arrangement such that an upper limit in the conditional expression (18) is not surpassed, it is easy to suppress an amount of movement of a lens unit which moves, and to suppress the thickness of the lens barrel.

By making an arrangement such that a lower limit in the conditional expression (18) is not surpassed; it is easy to suppress the power of each lens unit while achieving a high zooming ratio, and to suppress the fluctuation in aberration.

It is more preferable that the zoom lens system satisfies the following conditional expression.

$$0.5<(D_{2w}+D_{1t})/f_t<0.7 \tag{18'}$$

It is even more preferable that the zoom lens system satisfies the following conditional expression.

$$0.55<(D_{2w}+D_{1t})/f_t<0.65 \tag{18''}$$

By satisfying the conditional expressions (18') and (18''), it is possible to show further the abovementioned effect.

Moreover, in the zoom lens system, it is preferable that the following conditional expression is satisfied.

$$0.1<D_{2w}/f_t<0.5 \tag{19}$$

where, $D_{2w}$ denotes an air space on an optical axis, between the second lens unit and the third lens unit, at a wide angle end, and $f_t$ denotes a focal length of the entire zoom lens system, at a telephoto end.

By making an arrangement such that an upper limit in the conditional expression (19) is not surpassed, it become easy to suppress the entire length of the zoom lens system at the wide angle end. Moreover, it is easy to decrease a height of light rays incident on the first lens unit, and reduce lens diameter of the first lens unit and the second lens unit, and also to suppress the thickness for securing the edge thickness, which is advantageous for making small the zoom lens system and slim the zoom lens system when collapsed.

By making an arrangement such that a lower limit in the conditional expression (19) is not surpassed, it is easy to suppress the power of each lens unit even when the zooming ratio is increased, and to carry out correction of aberration such as the spherical aberration.

It is more preferable that the zoom lens system satisfies the following conditional expression.

$$0.25<D_{2w}/f_t<0.34 \tag{19'}$$

It is even more preferable that the zoom lens system satisfies the following conditional expression.

$$0.28<D_{2w}/f_t<0.33 \tag{19''}$$

By satisfying the conditional expressions (19') and (19''), it is possible to show further the abovementioned effect.

Furthermore, regarding an air space on the optical axis between the second lens unit and the third lens unit at the wide angle end, with respect to the focal length of the entire zoom lens system at the telephoto end, the following arrangement may be made. For this, in the zoom lens system, it is preferable that the following conditional expression is satisfied.

$$0.2<D_{1t}/f_t<0.5 \tag{20}$$

where $D_{1t}$ denotes an air space on an optical axis, between the first lens unit and the second lens unit, at a telephoto end, and $f_t$ denotes a focal length of the entire zoom lens system, at the telephoto end.

By making an arrangement such that an upper limit in the conditional expression (20) is not surpassed, it becomes easy to suppress the entire length of the zoom lens system, at the telephoto end, and it is advantageous for making small thickness of the lens barrel.

By making an arrangement such that a lower limit in the conditional expression (20) is not surpassed, the power of each lens unit is suppressed even when the zoom ratio is increased, and it becomes easy to suppress an occurrence of aberration such as the spherical aberration.

It is more preferable that the zoom lens system satisfies the following conditional expression.

$$0.2<D_{1t}/f_t<0.4 \tag{20'}$$

It is even more preferable that the zoom lens system satisfies the following conditional expression.

$$0.25<D_{1t}/f_t<0.35 \tag{20''}$$

By satisfying the conditional expressions (20') and (20''), it is possible to show further the abovementioned effect.

Moreover, in the zoom lens system, the following arrangement may be made for the entire length of the zoom lens system, with respect to the focal length of the entire system, at the telephoto end. For this, in the zoom lens system, it is preferable that the following conditional expression is satisfied.

$$0.7<T_L/f_t<1.5 \tag{21}$$

where, $T_L$ denotes a distance on an optical axis, up to an image surface from a vertex of a lens surface nearest to the object side, in the first lens unit, at the telephoto end, and $f_t$ denotes a focal length of the entire zoom lens system, at the telephoto end.

A reason for and an effect of having the above-mentioned arrangement in the zoom lens system will be described below. By the abovementioned movement of the first lens unit, it is easy to secure the magnification effect in the second lens unit etc.

By making an arrangement such that an upper limit in the conditional expression (21) is not surpassed, it becomes easy to suppress the entire length of the zoom lens system, at the telephoto end, and to suppress an increase in the thickness of the lens barrel.

By making an arrangement such that a lower limit in the conditional expression (21) is not surpassed, it is easy to suppress the power of each lens unit even when the magnification ratio is increased, and to suppress an occurrence of aberration such as the spherical aberration.

It is more preferable that the zoom lens system satisfies the following conditional expression.

$$0.9 < T_L/f_t < 1.3 \qquad (21')$$

It is even more preferable that the zoom lens system satisfies the following conditional expression.

$$1.0 < T_L/f_t < 1.2 \qquad (21'').$$

By satisfying the conditional expressions (21') and (21"), it is possible to show further the abovementioned effect.

Moreover, in the zoom lens system, it is preferable that the first lens unit includes a cemented doublet in which the negative lens and the positive lens are cemented, and the total number of lenses in the first lens unit is two.

A reason for and an effect of having the abovementioned arrangement in the zoom lens system will be described below. When the first lens unit is let to be a cemented doublet of a negative lens and a positive lens, it is possible to carry out effectively a correction of longitudinal chromatic aberration which is susceptible to be remarkable at the time of making long a focal length at the telephoto end by increasing (making high) the magnification. Moreover, it is possible to suppress deterioration of optical performance in relative decentering of lenses due to an assembling error, which contributes to an improvement in yield and a cost reduction.

When the negative lens and the positive lens in the first lens unit are not cemented, it is advantageous for correcting more effectively the distortion and the comatic aberration at the wide angle end, and the comatic aberration at the telephoto end.

Moreover, in the zoom lens system, it is preferable that the second lens unit includes in order from the object side, a negative lens, a negative lens, and a positive lens, and the total number of lenses in the second lens unit is three.

A reason for and an effect of having the abovementioned arrangement in the zoom lens system will be described below. By distributing the negative power of the second lens unit in two negative lenses, and disposing the positive lens nearest to the image side, it is advantageous for shortening the entire length by correction of an initial aberration, and positioning of principal points toward an object.

Moreover, in the zoom lens system, it is preferable that the second lens unit includes in order from the object side, a negative lens, a positive lens, and a negative lens, and the total number of lenses in the second lens unit is three.

A reason for and an effect of having the abovementioned arrangement in the zoom lens system will be described below. By disposing the lenses symmetrically in the second lens unit, it is easy to suppress a fluctuation at the time of zooming, in various aberrations such as the spherical aberration.

In the zoom lens system, it is preferable that the second lens unit includes two lenses namely, a negative lens and a positive lens, and the total number of lenses in the second lens unit is two. Accordingly, it is advantageous for making small the size of the second lens unit, while suppressing the aberration in the second lens unit.

In the zoom lens system, it is preferable that the total number of lenses in the third lens unit is not more than three. Accordingly, it is advantageous for slimming the lens barrel.

Moreover, in the zoom lens system, it is preferable that the third lens unit includes in order from the object side, a positive lens, a positive lens, and a negative lens, and the negative lens is cemented to the adjacent lens, and a cemented doublet is formed by the positive lens and the negative lens.

A reason for and an effect of having the abovementioned arrangement in the zoom lens system will be described below. By cementing the positive lens and the negative lens, it is possible to carry out effectively the correction of the longitudinal chromatic aberration. Moreover, by distributing the power of the positive lens in two lenses, and letting the positive lens and the negative lens to be the cemented lens, it is possible to prevent degradation of optical performance due to relative decentering of lenses in an assembling process. This leads to an improvement in yield and a reduction in cost.

Moreover, in the zoom lens system, it is preferable that the fourth lens unit includes only one positive lens. Accordingly, it is advantageous for making the size small when collapsed.

Moreover, when the zoom lens system is let to be a four-unit zoom lens system, the fourth lens unit becomes the last lens unit, and is let to have a function of positioning the exit pupil distantly from the image surface. However, since this function can be imparted even by one lens, it is advantageous for making the size small. Moreover, when an arrangement is such that the fourth lens unit is moved at the time of focusing, by letting one lens to be a moving lens, it is possible to reduce a driving load at the time of focusing.

Moreover, in the zoom lens system, it is preferable that the first lens unit includes an aspheric lens surface. Such an arrangement is advantageous for correction of the spherical aberration which is susceptible to occur particularly at the telephoto end.

Moreover, in the zoom lens system, it is preferable that the second lens unit includes an aspheric lens surface.

A reason for and an effect of having the abovementioned arrangement in the zoom lens system will be described below. When an attempt is made to secure the zooming ratio while suppressing the overall length, a change in a position in the second lens unit, at which the light rays are incident, is susceptible to increase. Disposing an aspheric surface in this lens unit is advantageous for correction of an off-axis aberration at the wide angle end.

Moreover, in the zoom lens system, it is preferable that the third lens unit includes an aspheric lens surface. Such arrangement is advantageous for correction of the spherical aberration and the comatic aberration in the entire zoom range.

Moreover, in the zoom lens system, it is preferable that the third lens unit includes a positive single lens having both surfaces aspheric, which is disposed nearest to the object side. Accordingly, by letting both side surfaces of one lens to be aspheric surfaces, it is possible to carry out more favorably the correction of the spherical aberration and the comatic aberration, while suppressing to be small the deterioration of the optical performance due to a relative decentering of lenses in the lens unit.

In the zoom lens system, it is preferable that the fourth lens unit includes an aspheric lens surface. Such an arrangement is advantageous for maintaining optical performance such as correction of the oblique aberration and reduction in fluctuation in the exit-pupil position.

In the zoom lens system, it is preferable that first lens unit, the second lens unit, the third lens unit, and the fourth lens unit move at the time of zooming, and the zoom lens further includes an aperture stop which moves integrally with the third lens unit, in an optical-axis direction.

A reason for and an effect of having the abovementioned arrangement in the zoom lens system will be described below. The zooming effect is imparted efficiently to each lens unit, and favorable correction of an aberration can be carried out easily in the entire zooming area.

Moreover, by moving the aperture stop integrally with the third lens unit, it is possible to carry out an effective correction of the chromatic aberration of magnification and the distortion. This effect is not exerted only from a performance aspect, and it is possible to control appropriately a position of the entrance pupil and a position of the exit pupil.

In other words, a height of light rays of an oblique light beam at the wide angle end, and a height of light rays of a longitudinal light beam at the telephoto end are balanced, and it is possible to make compact an outer diameter of the first lens unit and an outer diameter of the second lens unit, in a balanced manner.

Particularly, reducing the outer diameter of the first lens unit, at the wide angle end leads effectively to making compact the size in the direction of thickness of the lens. Moreover, since it is also possible to control such that a fluctuation in the position of the exit pupil at the time of zooming is decreased, in a case of using a CCD and a CMOS etc., it is possible to prevent an occurrence of shading in a corner of a screen by maintaining an angle of light rays which are incident in an appropriate range, and it becomes suitable for an electronic image pickup element. Moreover, it becomes easy to suppress the fluctuation in aberration due to the compactness of the third lens unit, and the movement of the third lens unit.

Moreover, in the zoom lens system, it is preferable that at the time of zooming from the wide angle end to the telephoto end, the first lens unit moves to be positioned toward the object side at the telephoto end rather than the wide angle end, the second lens unit moves, the third lens unit moves toward the object side, and the fourth lens unit moves. Accordingly, it is easy to adjust an overall balance of aberration while securing the zooming effect to the second lens unit and the third lens unit.

At the time of zooming from the wide angle end to the telephoto end, the first lens unit may be moved to be positioned toward the object side at the telephoto end rather than the wide angle end. At this time, the lens unit may be moved only toward the object side, and may be moved by a locus of a convexity toward the image side.

Moreover, the second lens unit may be moved only toward the image side, or may be moved by a locus of convexity, toward the image side. The third lens unit may be moved only toward the object side. The fourth lens unit may be moved only toward the object side, or may be moved only toward the image side. Or the fourth lens unit may be moves by a locus of convexity, toward the object side, or by a locus of convexity, toward the image side.

In the zoom lens system, it is preferable that an aperture stop is disposed between the second lens unit and the third lens unit.

A reason for and an effect of having the abovementioned arrangement in the zoom lens system will be described below. It is possible to position the entrance pupil at a nearer position as viewed from the object side, and to keep the exit pupil at a distance from an image surface. At this time, it is more preferable to dispose in line, a shutter unit which moves integrally with the aperture stop.

Moreover, since the height of oblique light rays may be decreased, there is no increase in the size of the shutter unit, and a small dead space at the time of moving the aperture stop and the shutter unit, serves the purpose.

Moreover, in the zoom lens system, it is preferable that the zoom lens system is a four-unit zoom lens system. Such an arrangement is advantageous for making the zoom lens system compact.

Moreover, an electronic image pickup apparatus of the present invention includes the zoom lens system described above, and an electronic image pickup element which is disposed at an image side of the zoom lens system, and which converts an image formed by the zoom lens system, to an electric signal.

The zoom lens system of the present invention is advantageous for securing a telecentricity. Consequently, it is preferable to use the zoom lens system in an electronic image pickup apparatus which uses an electronic image pickup element in which, there occurs to be image deterioration due to an angle of incidence.

Moreover, in a case of such electronic image pickup apparatus in which, the electronic image pickup element is used; it is preferable to make an arrangement as follows. For this, it is preferable that the electronic image pickup apparatus includes a processing section which electrically corrects a distortion of the zoom lens system.

Accordingly, the deterioration of a reproduced image is suppressed even when the zoom lens system is structured to be small, and it is advantageous for making small the electronic image pickup apparatus.

In each of the inventions described above, in a case of providing a focusing function to the zoom lens system, an arrangement is made such that an object point which is most distant is focused. When a focusing operation is carried out by the movement of the fourth lens unit in an optical axis direction, it is easy to suppress a fluctuation in the position of the exit pupil. Therefore, such focusing operation is preferable.

Moreover, it is preferable that the present invention satisfies arbitrarily a plurality of conditional expressions simultaneously. Furthermore, a lower limit value and an upper limit value of each conditional expression may be let to be a lower limit value and an upper limit value of a conditional equation in which only the upper limit value is restricted. Moreover, various arrangements described above may be combined arbitrarily.

As it is clear from the abovementioned description, according to the present invention, by devising an idea for the second lens unit, it is possible to provide a zoom lens system which is useful for both increasing the magnification ratio and making the apparatus compact. Furthermore, it is possible to provide a zoom lens system which is useful for making small the first lens unit and the second lens unit.

Moreover, by devising an idea for each lens unit and for a method for movement, it is possible to provide a zoom lens system which is capable of achieving some of or a plurality of the size reduction, a high zooming ratio, a cost reduction, and securing of optical performance. Furthermore, it is possible to provide an electronic image pickup apparatus which includes such zoom lens system.

Exemplary embodiments of a zoom lens system and an electronic image pickup apparatus according to the present invention will be described below in detail by referring to the accompanying diagrams. However, the present invention is not restricted to the embodiments described below.

Embodiments from a first embodiment to a ninth embodiment of the zoom lens system of the present invention will be described below. Lens cross-sectional views of a state at a wide angle end, an intermediate state, and a state at a telephoto end of an infinite object point focusing according to the first embodiment to the ninth embodiment are shown in FIG. 1A, FIG. 1B, and FIG. 1C to FIG. 9A, FIG. 9B, and FIG. 9C.

In FIG. 1A to FIG. 9C, G1 denotes a first lens unit, G2 denotes a second lens unit, S denotes an aperture stop, G3 denotes a third lens unit, G4 denotes a fourth lens unit, F denotes a parallel flat plate which forms a low pass filter in which, a wavelength region restricting coating which restricts infrared light is applied, C denotes a parallel flat plate of carbon glass of an electronic image pickup element, and I denotes an image plane. A multilayered film for restricting a wavelength region may be applied to a surface of the carbon glass C. Moreover, the carbon glass C may be let to have a low pass filter effect.

Figure 1B:
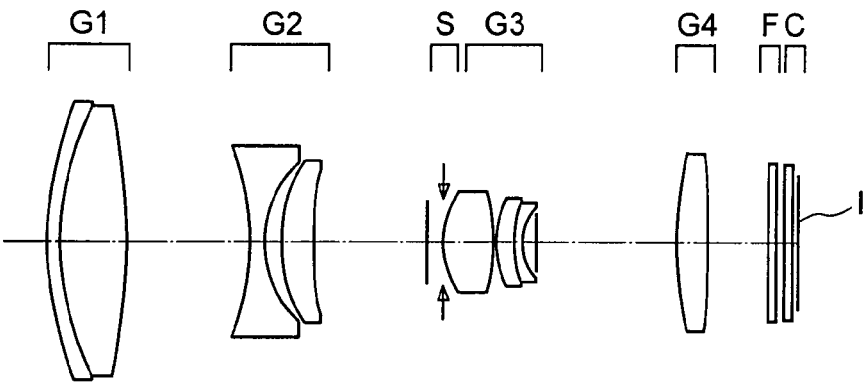
Figure 1C:
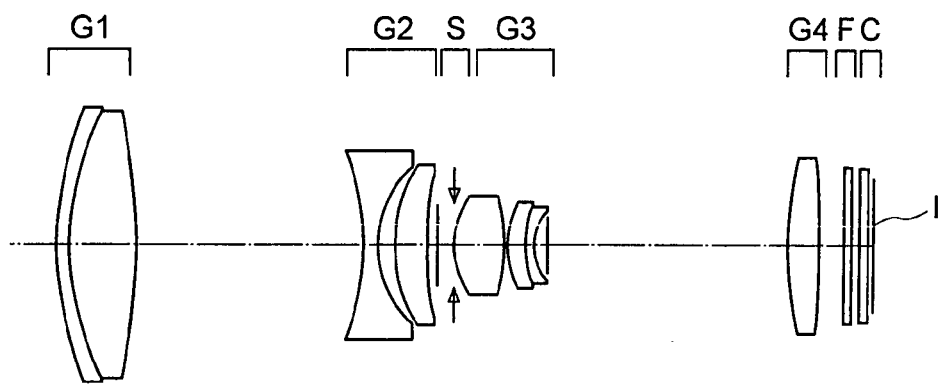

A zoom lens system in the first embodiment, as shown in FIG. 1A to FIG. 1C, includes, in order from an object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward an image side, the third lens unit G3 moves integrally with the aperture stop S, toward the object side, and the fourth lens unit G4 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens and a fourth positive meniscus lens having a convex surface directed toward the object side. The third lens unit G3 includes a fifth biconvex positive lens, a sixth positive meniscus lens having a convex surface directed toward the object side, and a seventh negative meniscus lens having a convex surface directed toward the object side. The sixth positive meniscus lens and the seventh negative meniscus lens are cemented. The fourth lens unit includes an eighth biconvex positive lens. A lens apex of a tenth surface is positioned on the object side farther than the aperture stop S.

An aspheric surface is used for six surfaces namely, a surface on the image side of the second biconvex positive lens, both surfaces of the third biconcave negative lens, both surfaces of the fifth biconvex positive lens, and a surface toward the object side, of the eighth biconvex positive lens. Moreover, an eighth surface is a virtual surface.

Figure 2A:
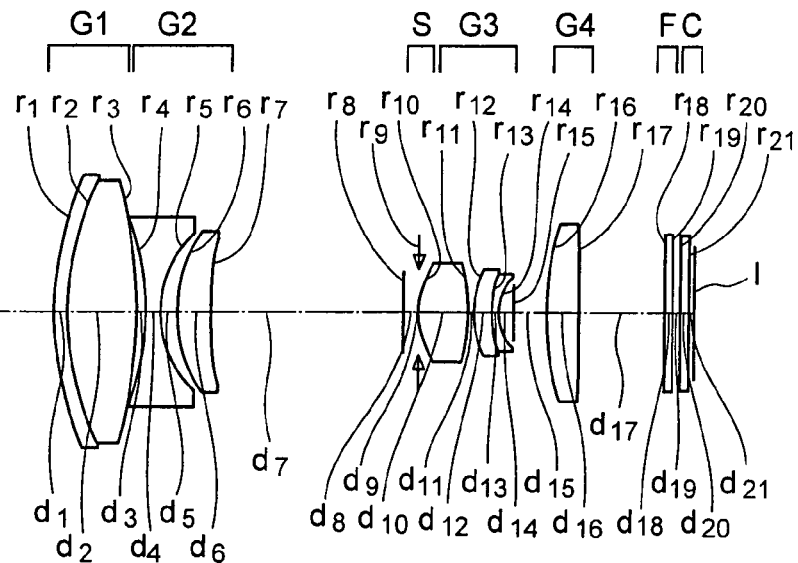
FIG. 2A, FIG. 2B, and FIG. 2C are diagrams similar to FIG. 1A, FIG. 1B, and FIG. 1C respectively, according to a second embodiment of the zoom lens system of the present invention.
Figure 2B:
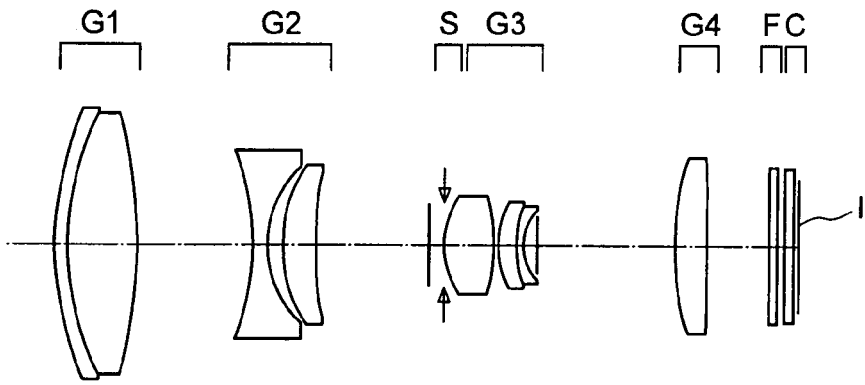
Figure 2C:
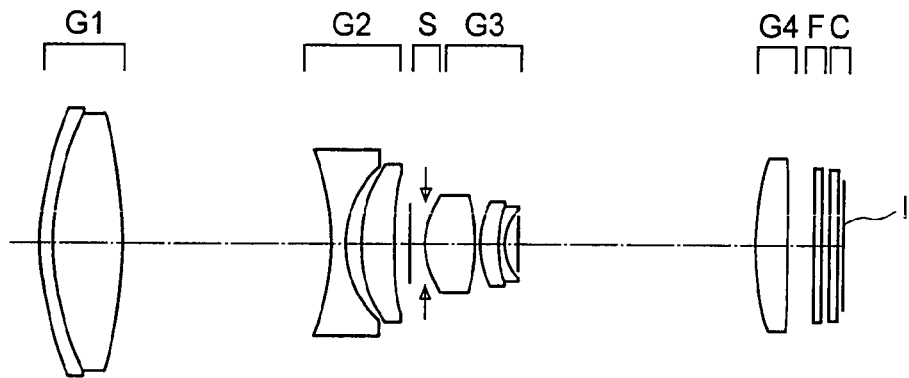

A zoom lens system in the second embodiment, as shown in FIG. 2A to FIG. 2C, includes, in order from the object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S, toward the object side, and the fourth lens unit G4 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens, and a fourth positive meniscus lens having a convex surface directed toward the object side. The third lens unit G3 includes a fifth biconvex positive lens, a sixth positive meniscus lens having a convex surface directed toward the object side, and a seventh negative meniscus lens having a convex surface directed toward the object side. The sixth positive meniscus lens and the seventh negative meniscus lens are cemented. The fourth lens unit G4 includes an eighth biconvex positive lens. A lens apex of a tenth surface is positioned on the object side, farther than the aperture stop S.

An aspheric surface is used for six surfaces namely, a surface on the image side of the second biconvex positive lens, both surfaces of the third biconcave negative lens, both surfaces of the fifth biconvex positive lens, and a surface toward the object side, of the eighth biconvex positive lens. Moreover, an eighth surface is a virtual surface.

Figure 3A:
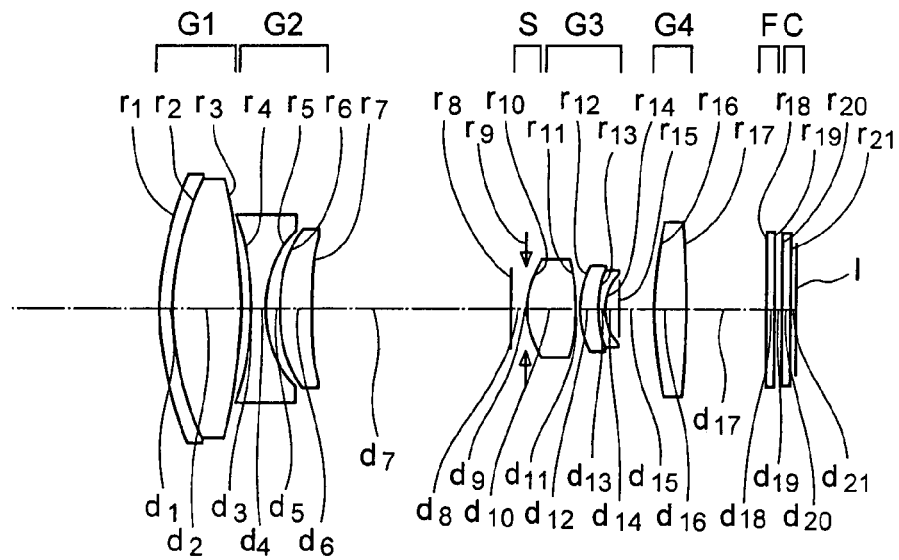
FIG. 3A, FIG. 3B, and FIG. 3C are diagrams similar to FIG. 1A, FIG. 1B, and FIG. 1C respectively, according to a third embodiment of the zoom lens system of the present invention.
Figure 3B:
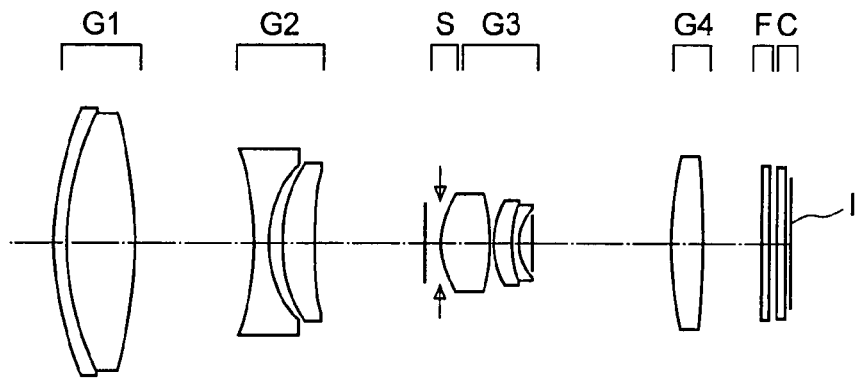
Figure 3C:
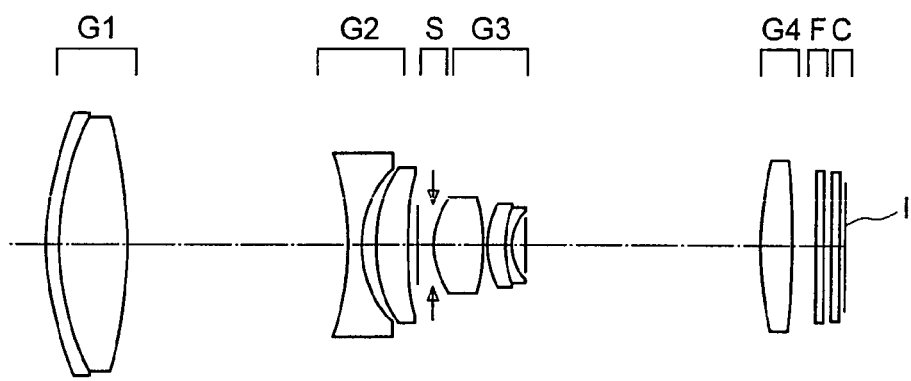

A zoom lens system in the third embodiment, as shown in FIG. 3A to FIG. 3C, includes, in order from the object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S, toward the object side, and the fourth lens unit G4 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens, and a fourth positive meniscus lens having a convex surface directed toward the object side. The third lens unit G3 includes a fifth biconvex positive lens, a sixth positive meniscus lens having a convex surface directed toward the object side, and a seventh negative meniscus lens having a convex surface directed toward the object side. The sixth positive meniscus lens and the seventh negative meniscus lens are cemented. The fourth lens unit G4 includes an eighth biconvex positive lens. A lens apex of a tenth surface is positioned on the object side, farther than the aperture stop.

An aspheric surface is used for six surfaces namely, a surface on the image side of the second biconvex positive lens, both surfaces of the third biconcave negative lens, both surfaces of the fifth biconvex positive lens, and a surface toward the object side, of the eight biconvex positive lens. Moreover, an eighth surface is a virtual surface.

Figure 4A:
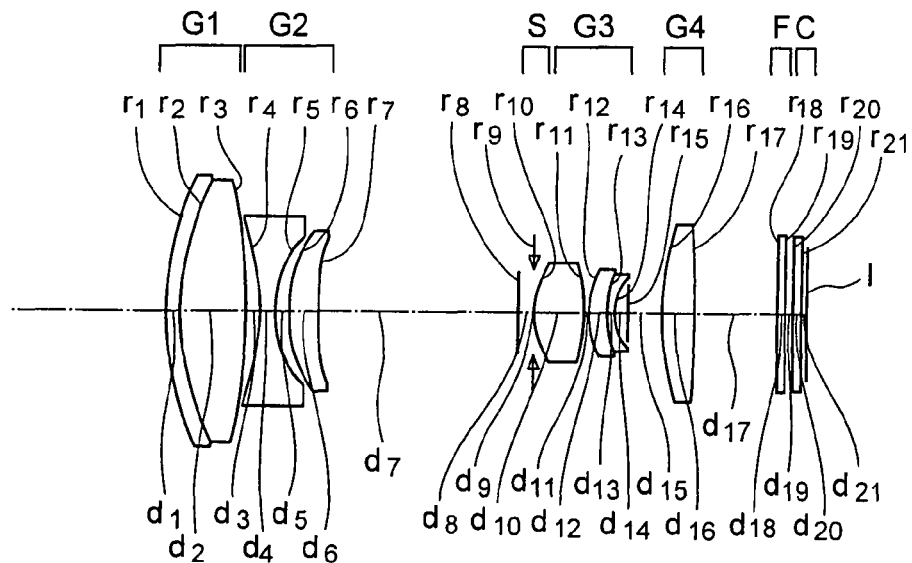
FIG. 4A, FIG. 4B, and FIG. 4C are diagrams similar to FIG. 1A, FIG. 1B, and FIG. 1C respectively, according to a fourth embodiment of the zoom lens system of the present invention.
Figure 4B:
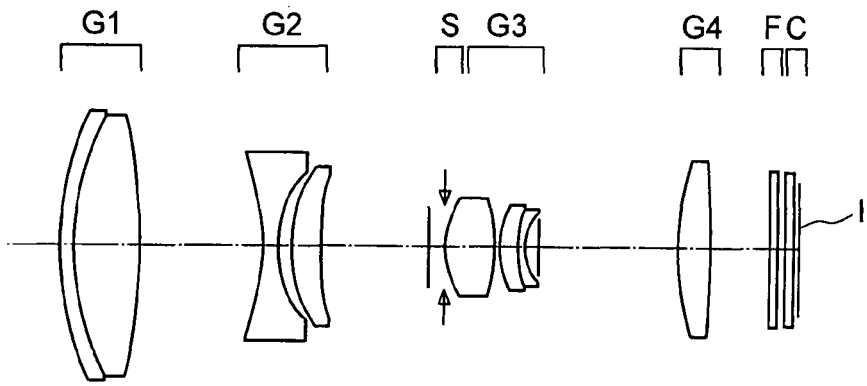
Figure 4C:
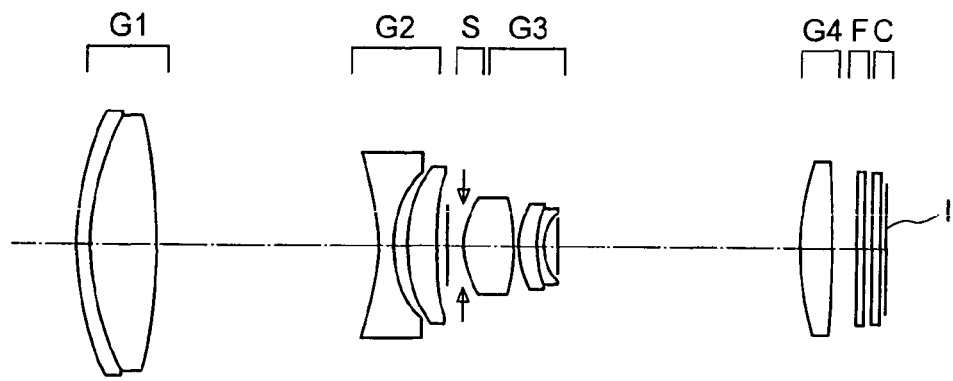

A zoom lens system in the fourth embodiment, as shown in FIG. 4A to FIG. 4C, includes, in order from the object side, a first lens unit G1 having a positive refracting power, a second lens unit. G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S toward the object side, and the fourth lens unit G4 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens, and a fourth positive meniscus lens having a convex surface directed toward the object side. The third lens unit G3 includes a fifth biconvex positive lens, a sixth positive meniscus lens having a convex surface directed toward the object side, and a seventh negative meniscus lens having a convex surface directed toward the object side. The sixth positive meniscus lens and the seventh negative meniscus lens are cemented. The fourth lens unit G4 includes an eight biconvex positive lens. A lens apex of a tenth surface is positioned on the object side, farther than the aperture stop S.

An aspheric surface is used for six surfaces namely, a surface on the image side of the second biconvex positive lens, both surfaces of the third biconcave negative lens, both surfaces of the fifth biconvex positive lens, and a surface toward the object side, of the eighth biconvex positive lens. Moreover, an eighth surface is a virtual surface.

Figure 5A:
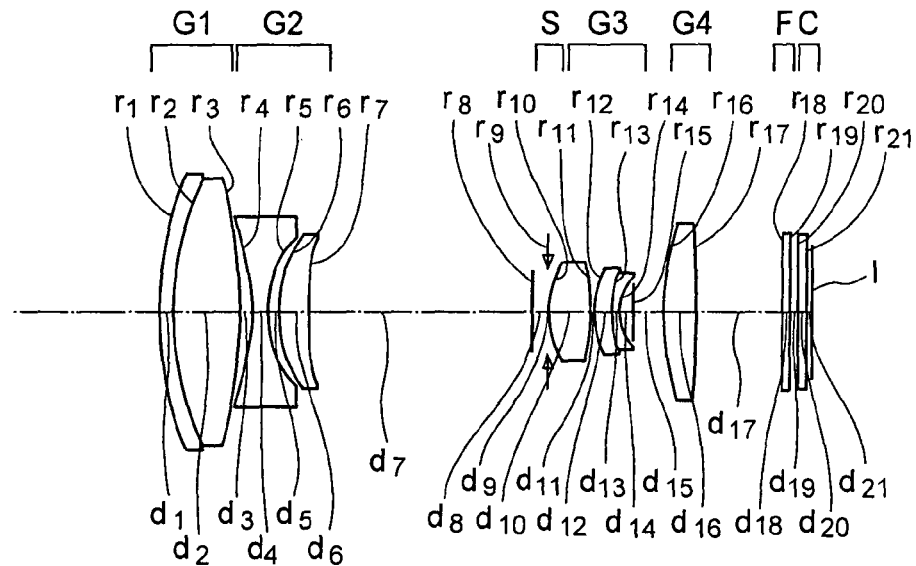
FIG. 5A, FIG. 5B, and FIG. 5C are diagrams similar to FIG. 1A, FIG. 1B, and FIG. 1C respectively, according to a fifth embodiment of the zoom lens system of the present invention.
Figure 5B:
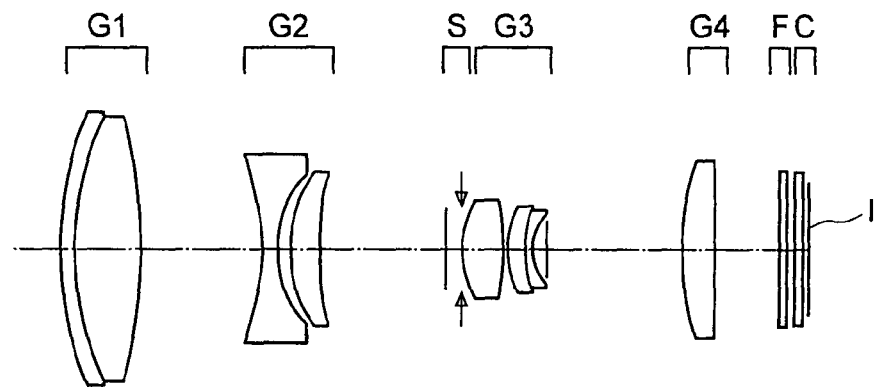
Figure 5C:
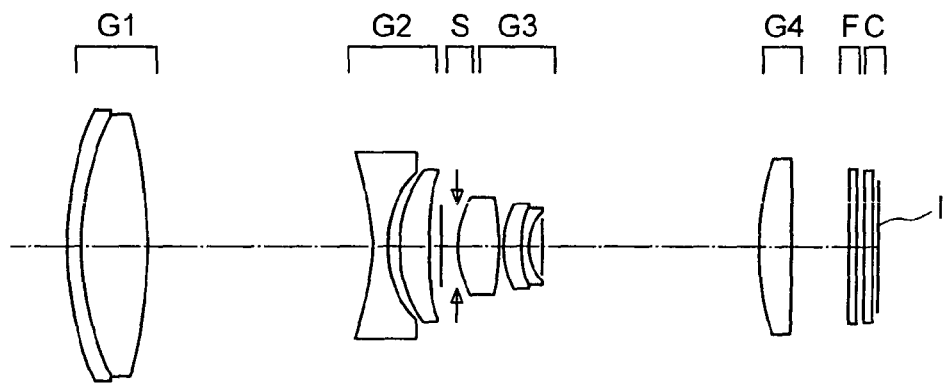

A zoom lens system in the fifth embodiment, as shown in FIG. 5A to FIG. 5C, includes, in order from the object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S, toward the object side, and the fourth lens unit G4 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens, and a fourth positive meniscus lens having a convex surface directed toward the object side. The third lens unit G3 includes a fifth biconvex positive lens, a sixth positive meniscus lens having a convex surface directed toward the object side, and a seventh negative meniscus lens having a convex surface directed toward the object side. The sixth positive meniscus lens and the seventh negative meniscus lens are cemented. The fourth lens unit G4 includes an eighth biconvex positive lens. A lens apex of a tenth surface is positioned on the object side, farther than the aperture stop.

An aspheric surface is used for six surfaces namely, a surface on the image side of the second biconvex positive lens, both surfaces of the third biconcave negative lens, both surfaces of the fifth biconvex positive lens, and a surface toward the object side, of the eighth biconvex positive lens. Moreover, an eighth surface is a virtual surface.

Figure 6A:
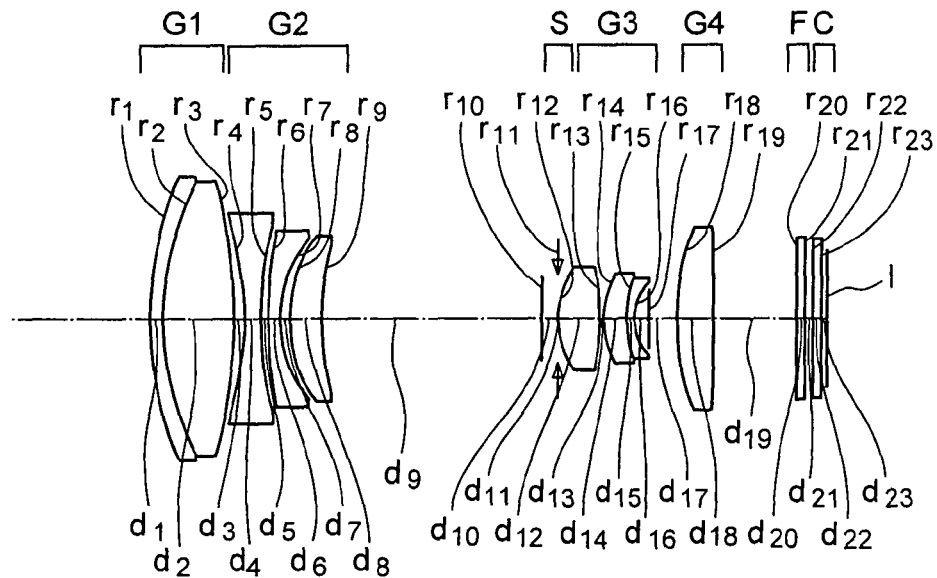
FIG. 6A, FIG. 6B, and FIG. 6C are diagrams similar to FIG. 1A, FIG. 1B, and FIG. 1C respectively, according to a sixth embodiment of the zoom lens system of the present invention.
Figure 6B:
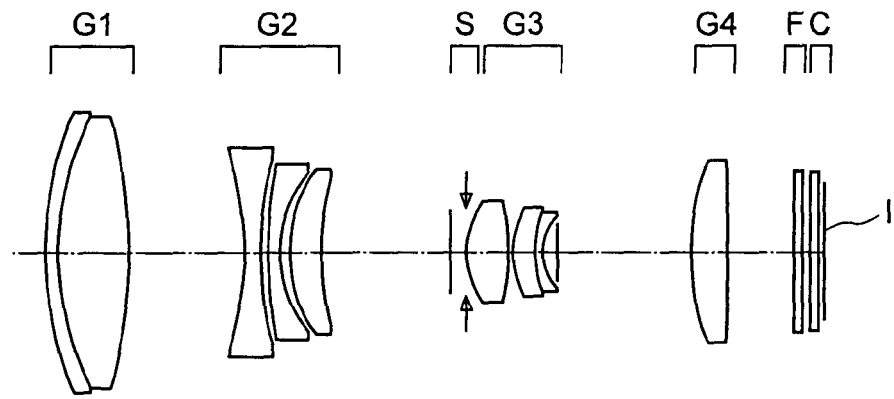
Figure 6C:
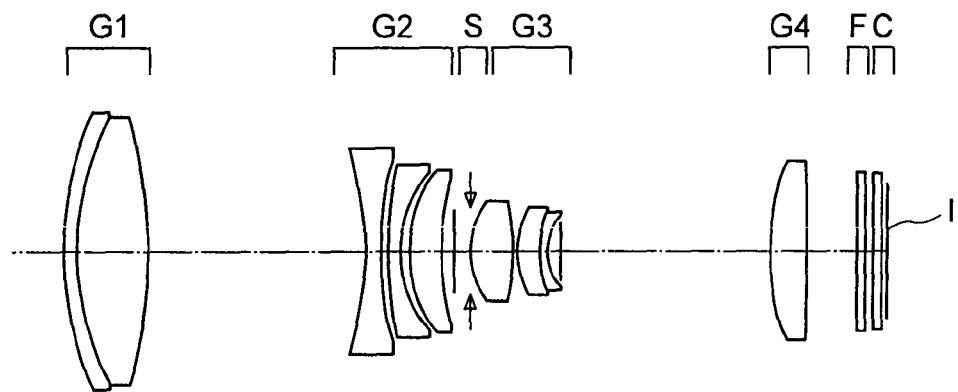

A zoom lens system in the sixth embodiment, as shown in FIG. 6A to FIG. 6C, includes, in order from the object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S, toward the object side, and the fourth lens unit G4 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens, a fourth negative meniscus lens having a convex surface directed toward the object side, and a fifth positive meniscus lens having a convex surface directed toward the object side. The third lens unit G3 includes a sixth biconvex positive lens, a seventh positive meniscus lens having a convex surface directed toward the object side, and an eighth negative meniscus lens having a convex surface directed toward the object side. The seventh positive meniscus lens and the eighth negative meniscus lens are cemented. The fourth lens unit G4 includes a ninth biconvex positive lens. A lens apex of a twelfth surface is positioned on the object side, farther than the aperture stop.

An aspheric surface is used for six surfaces namely, a surface on the image side of the second biconvex positive lens, both surfaces of the third biconcave negative lens, both surfaces of the sixth biconvex positive lens, and a surface toward the object side, of the ninth biconvex positive lens. Moreover, a tenth surface is a virtual surface.

Figure 7A:
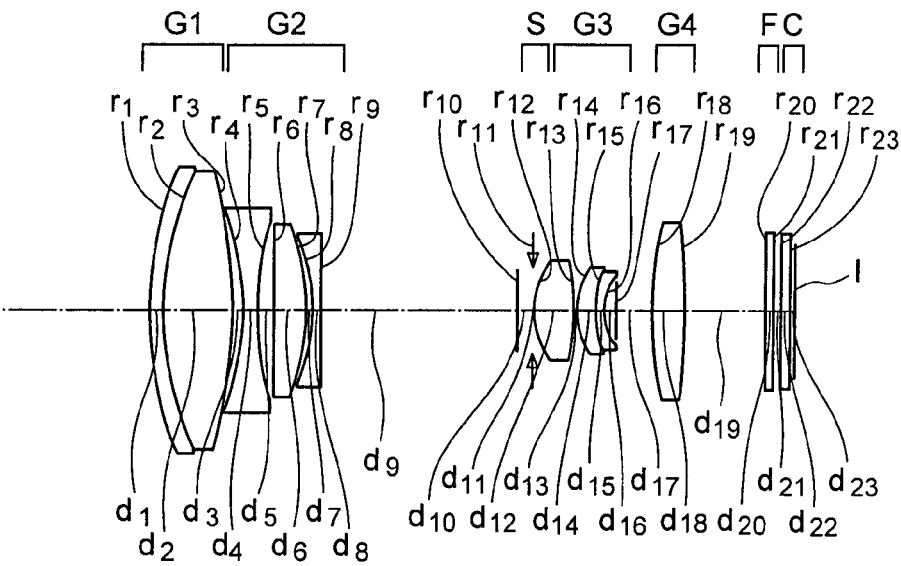
FIG. 7A, FIG. 7B, and FIG. 7C are diagrams similar to FIG. 1A, FIG. 1B, and FIG. 1C respectively, according to a seventh embodiment of the zoom lens system of the present invention.
Figure 7B:
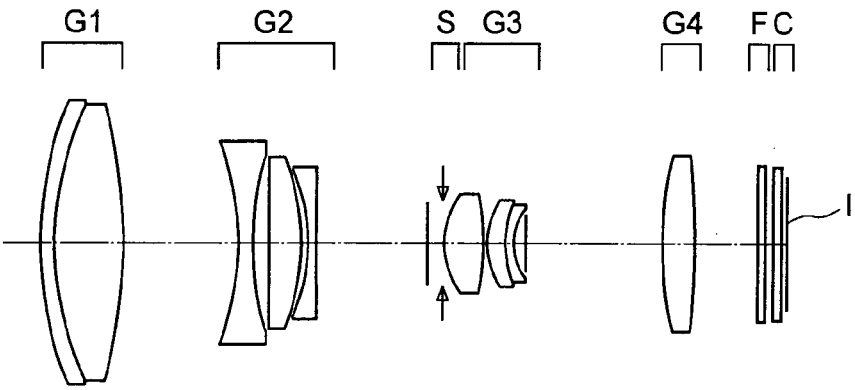
Figure 7C:
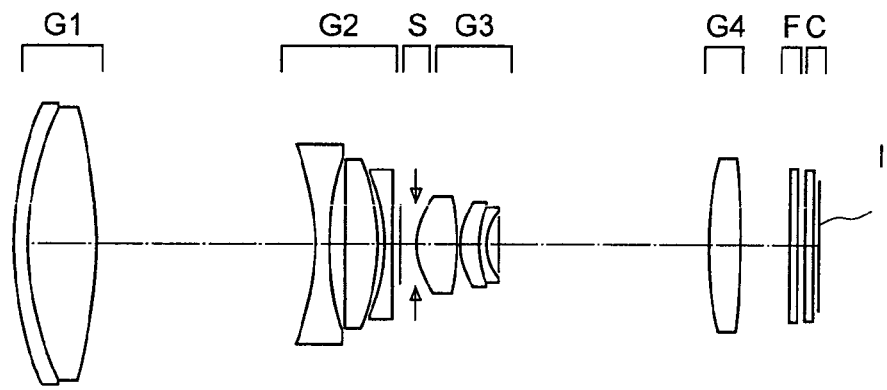

A zoom lens system in the seventh embodiment, as shown in FIG. 7A to FIG. 7C, includes, in order from the object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S, toward the object side, and the fourth lens unit G4 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens, a fourth biconvex positive lens, and a fifth biconcave negative lens. The third lens unit G3 includes a sixth biconvex positive lens, a seventh positive meniscus lens having a convex surface directed toward the object side, and an eighth negative meniscus lens having a convex surface directed toward the object side. The seventh positive meniscus lens and the eighth negative meniscus lens are cemented. The fourth lens unit G4 includes a ninth biconvex positive lens. A lens apex of a twelfth surface is positioned on the object side, farther than the aperture stop S.

An aspheric surface is used for six surfaces namely, a surface on the image side of the second biconvex positive lens, both surfaces of the third biconcave negative lens, both surfaces of the sixth biconvex positive lens, and a surface toward the object side, of the ninth biconvex positive lens. Moreover, a tenth surface is a virtual surface.

Figure 8A:
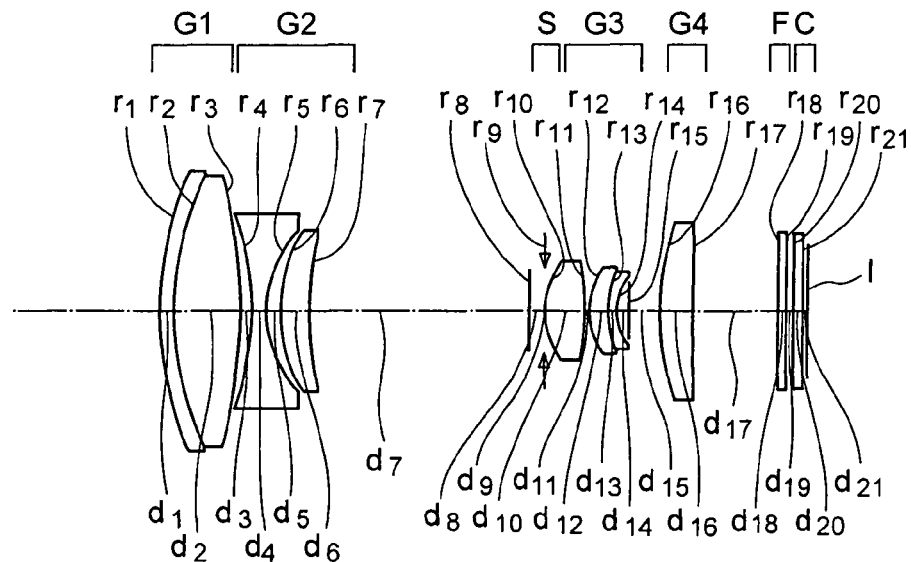
FIG. 8A, FIG. 8B, and FIG. 8C are diagrams similar to FIG. 1A, FIG. 1B, and FIG. 1C respectively, according to an eighth embodiment of the zoom lens system of the present invention.
Figure 8B:
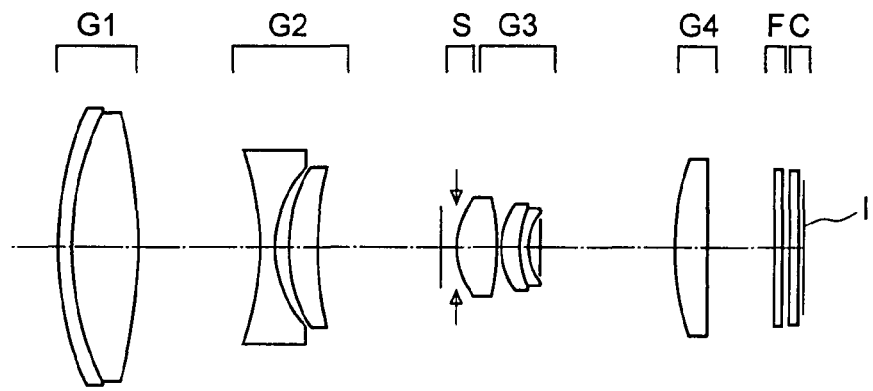
Figure 8C:
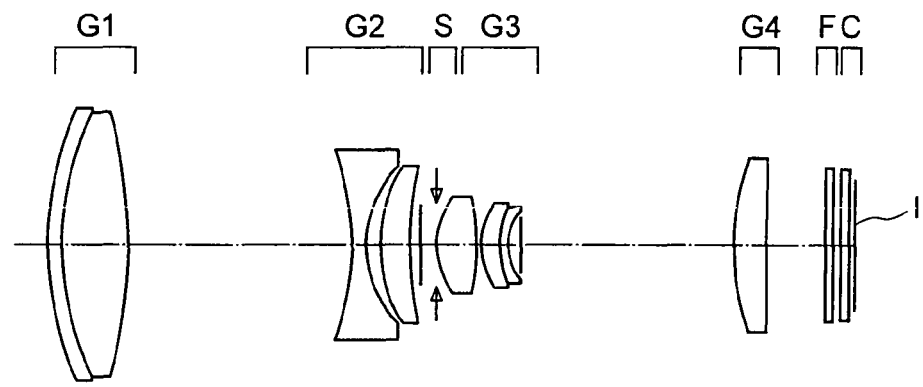

A zoom lens system in the eighth embodiment, as shown in FIG. 8A to FIG. 8C, includes, in order from the object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S, toward the object side, and the fourth lens unit G4 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens, and a fourth positive meniscus lens having a convex surface directed toward the object side. the third lens unit G3 includes a fifth biconvex positive lens, a sixth positive meniscus lens having a convex surface directed toward the object side, and a seventh negative meniscus lens having a convex surface directed toward the object side. The sixth positive meniscus lens and the seventh negative meniscus lens are cemented. The fourth lens unit G4 includes an eighth biconvex positive lens. A lens apex of a tenth surface is positioned on the object side, farther than the aperture stop S.

An aspheric surface is used for six surfaces namely, a surface on the image side of the second biconvex positive lens, both surfaces of the third biconcave negative lens, both surfaces of the fifth biconvex positive lens, and a surface toward the object side, of the eighth biconvex positive lens. Moreover, an eighth surface is a virtual surface.

Figure 9A:
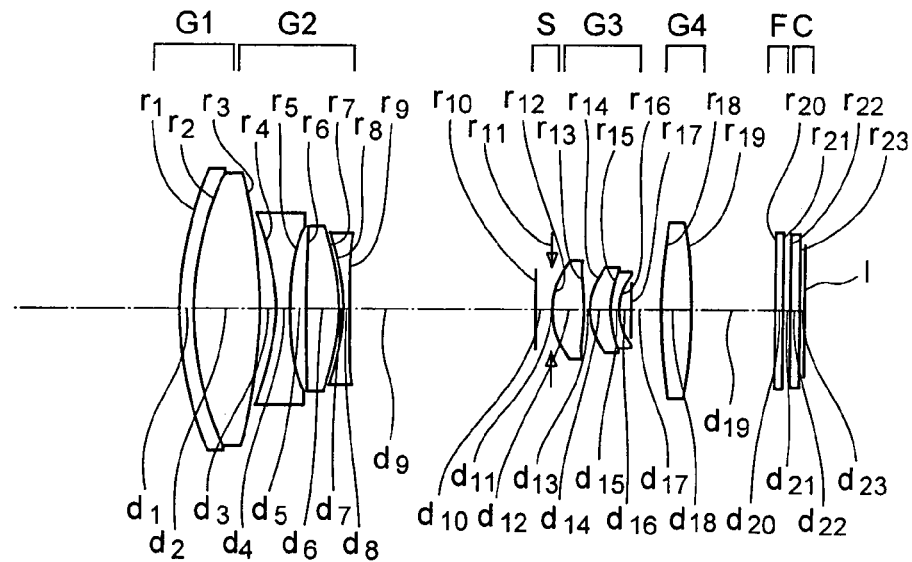
FIG. 9A, FIG. 9B, and FIG. 9C are diagrams similar to FIG. 1A, FIG. 1B, and FIG. 1C respectively, according to a ninth embodiment of the zoom lens system of the present invention.
Figure 9B:
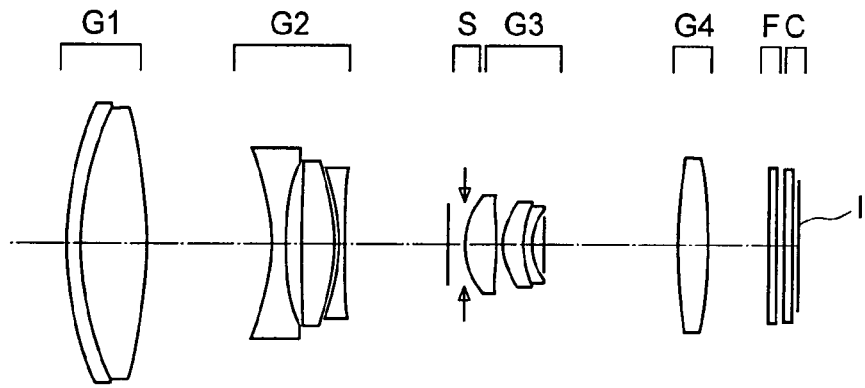
Figure 9C:
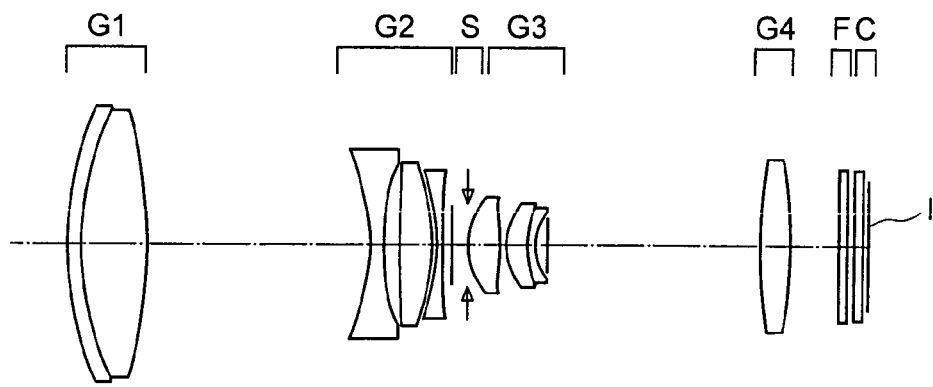
Figure 10A:
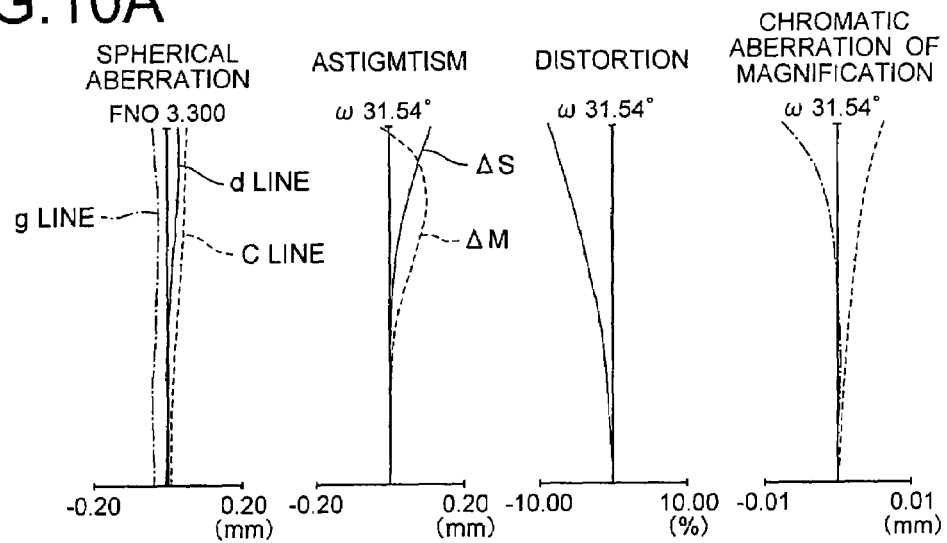
FIG. 10A, FIG. 10B, and FIG. 10C are diagrams showing a spherical aberration, an astigmatism, a distortion, and a chromatic aberration of magnification at the time of the infinite object point focusing, according to the first embodiment, where.
Figure 10B:
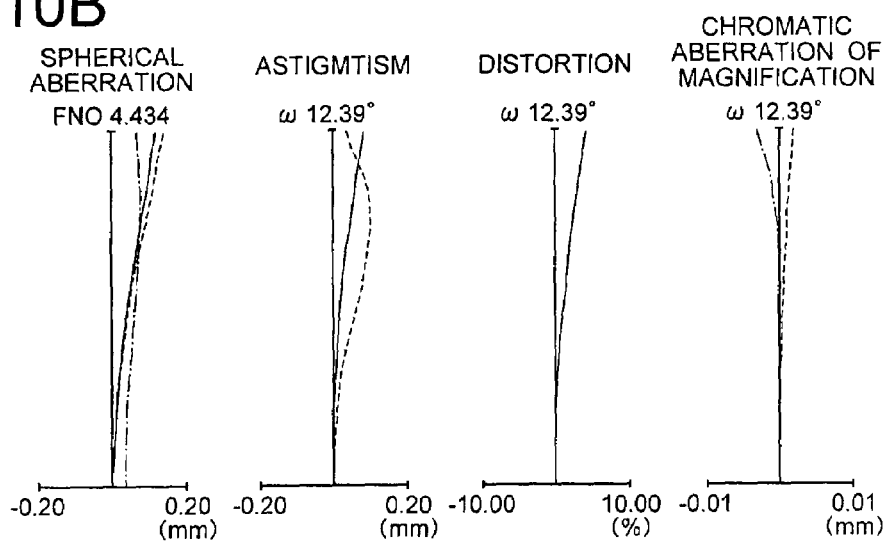
Figure 10C:
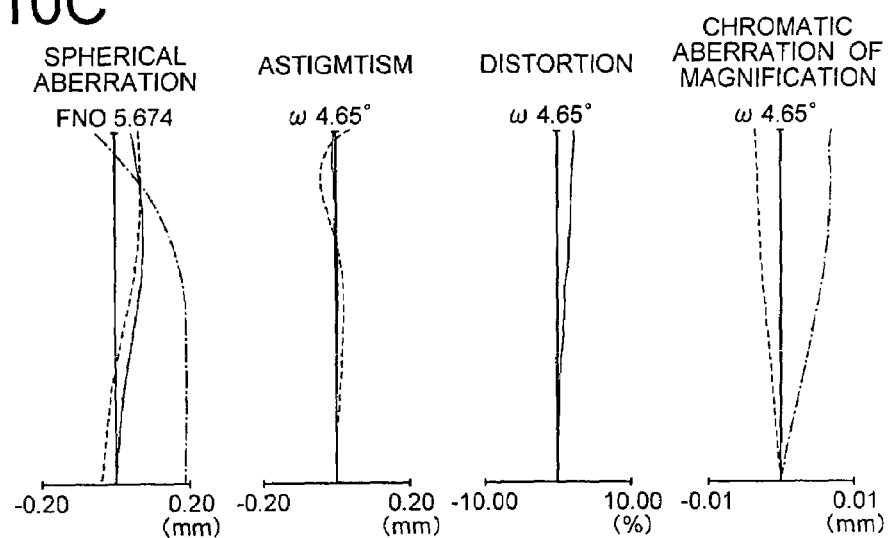
Figure 11A:
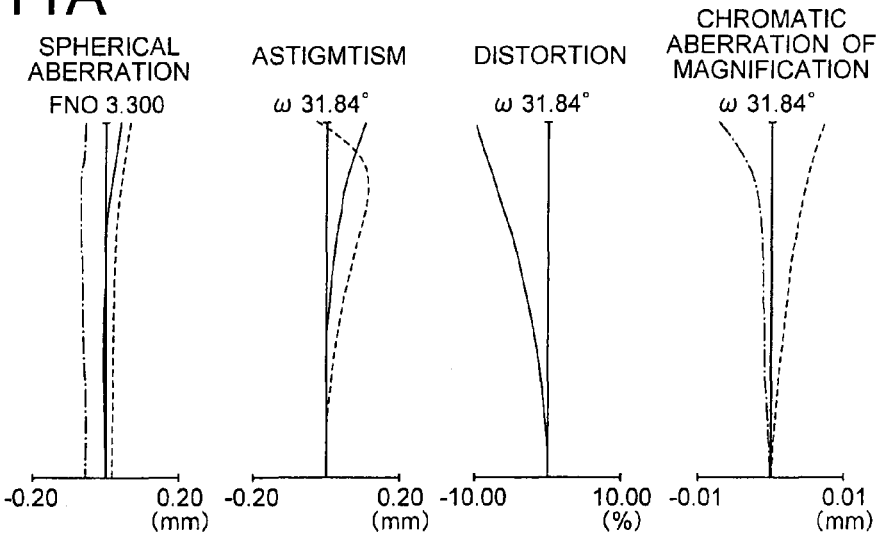
FIG. 11A, FIG. 11B, and FIG. 11C are diagrams similar to FIG. 10A, FIG. 10B, and FIG. 10C respectively, at the time of the infinite object point focusing, according to the second embodiment.
Figure 11B:
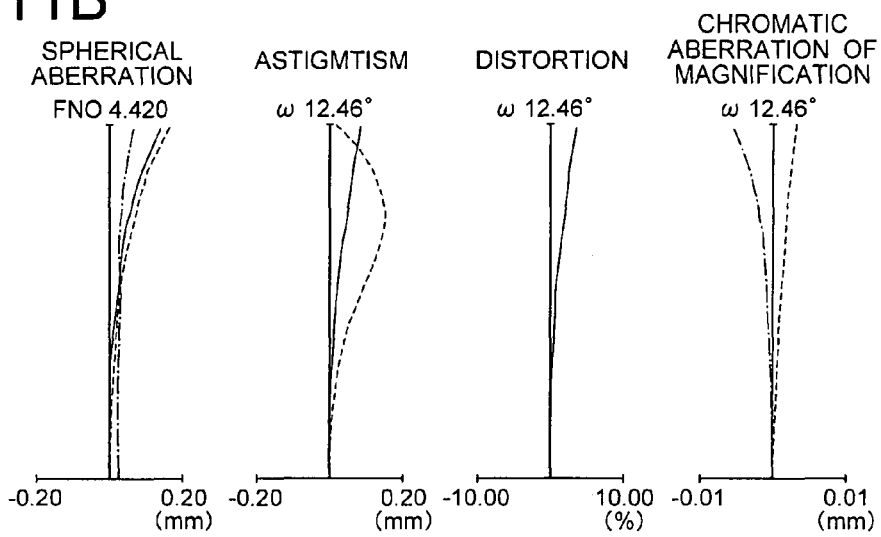
Figure 11C:
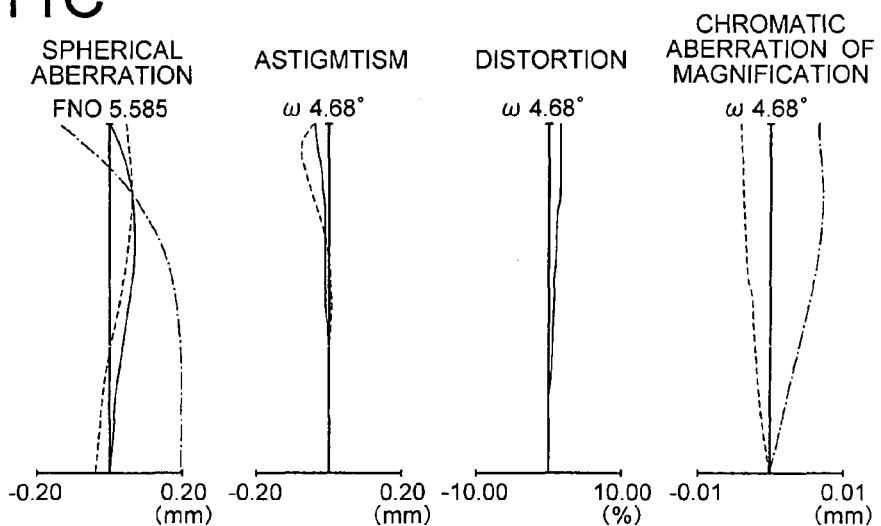
Figure 12A:
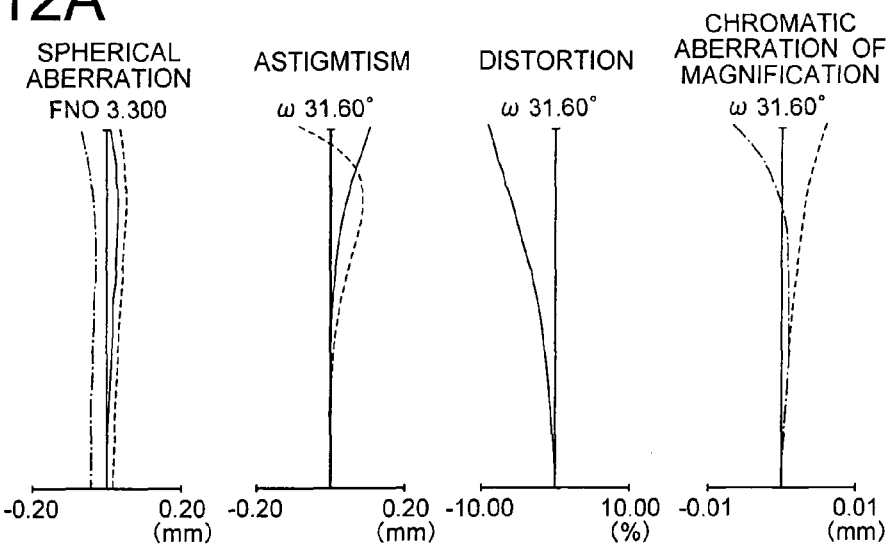
FIG. 12A, FIG. 12B, and FIG. 12C are diagrams similar to FIG. 10A, FIG. 10B, and FIG. 10C respectively, at the time of the infinite object point focusing, according to the third embodiment.
Figure 12B:
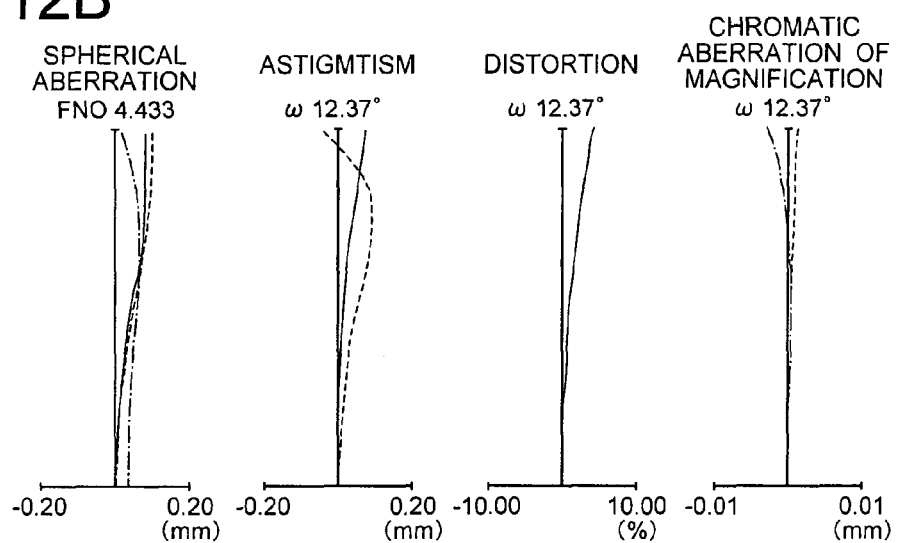
Figure 12C:
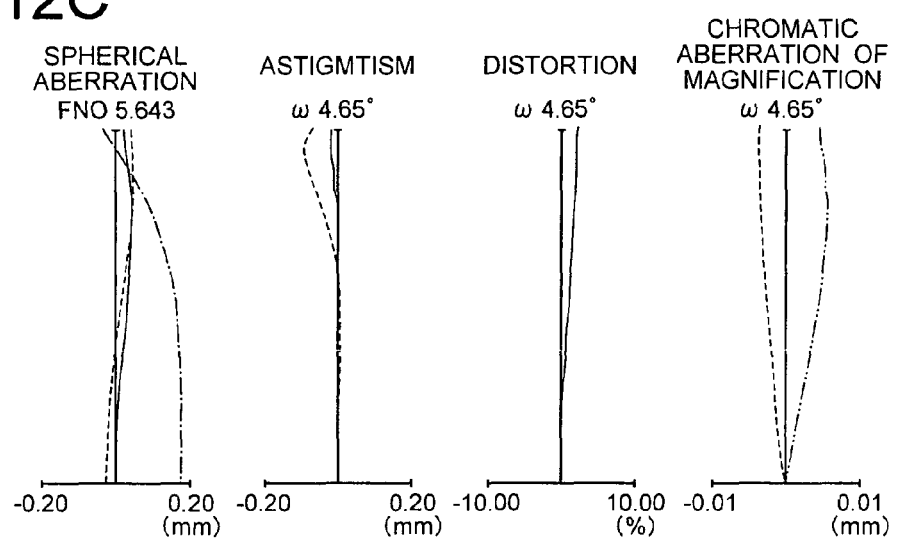
Figure 13A:
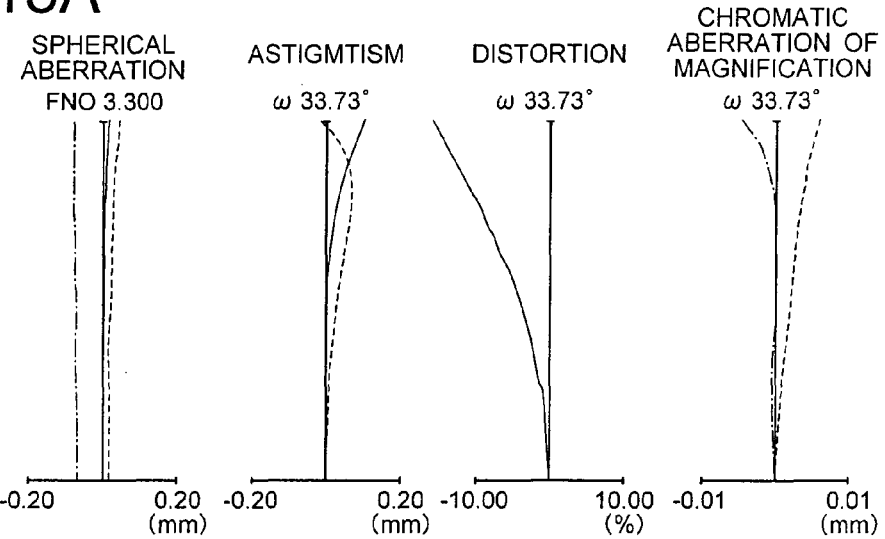
FIG. 13A, FIG. 13B, and FIG. 13C are diagrams similar to FIG. 10A, FIG. 10B, and FIG. 10C respectively, at the time of the infinite object point focusing, according to the fourth embodiment.
Figure 13B:
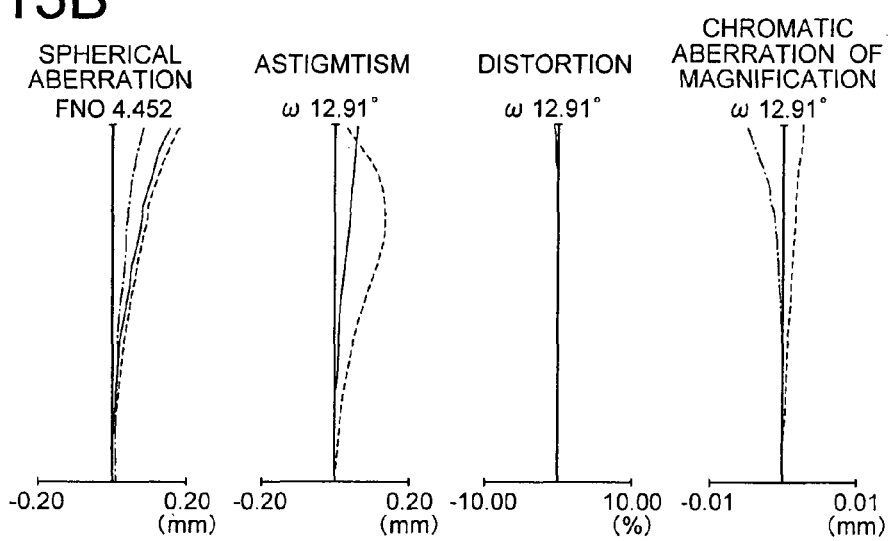
Figure 13C:
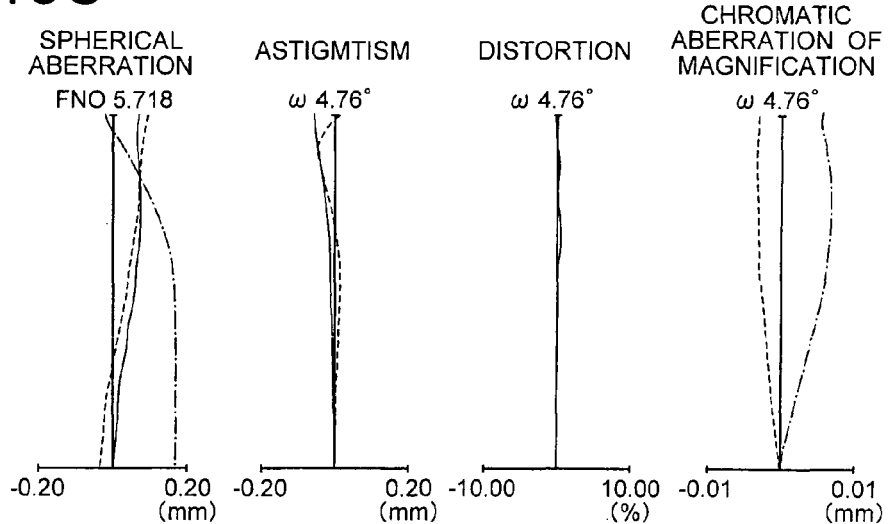
Figure 14A:
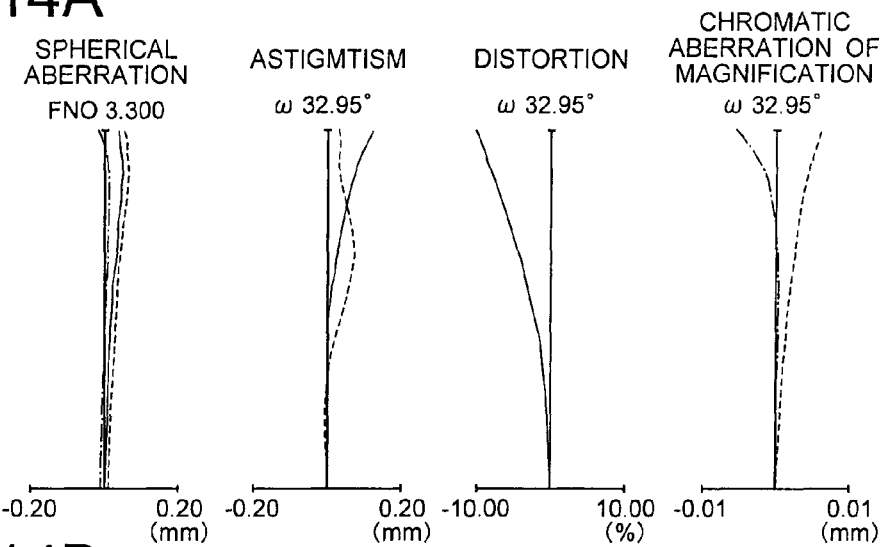
FIG. 14A, FIG. 14B, and FIG. 14C are diagrams similar to FIG. 10A, FIG. 10B, and FIG. 10C respectively, at the time of the infinite object point focusing, according to the fifth embodiment.
Figure 14B:
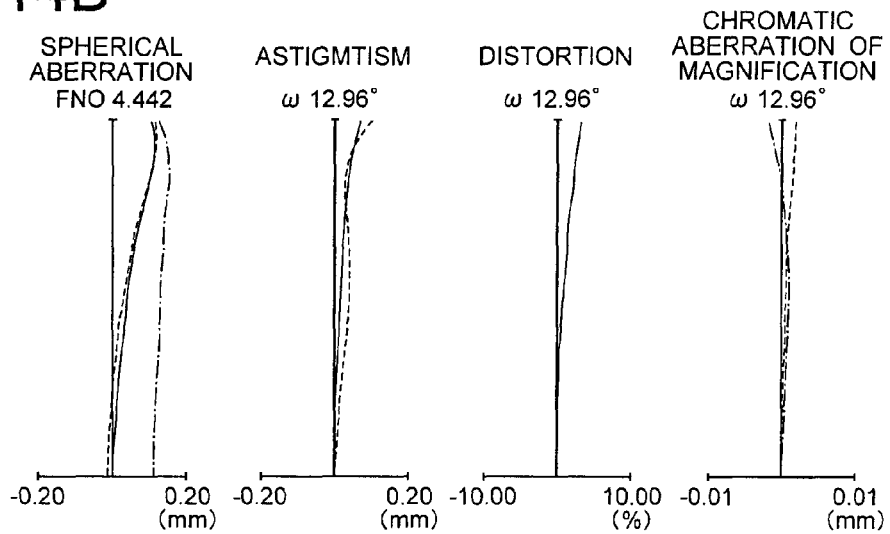
Figure 14C:
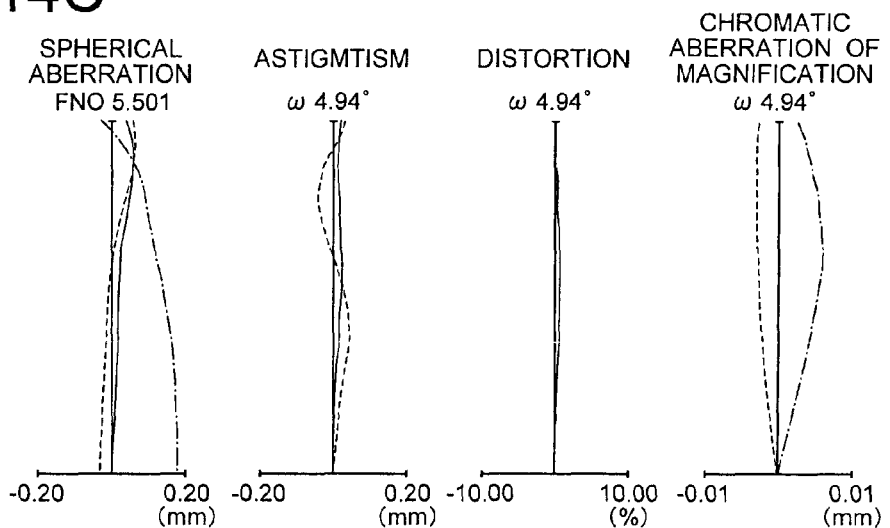
Figure 15A:
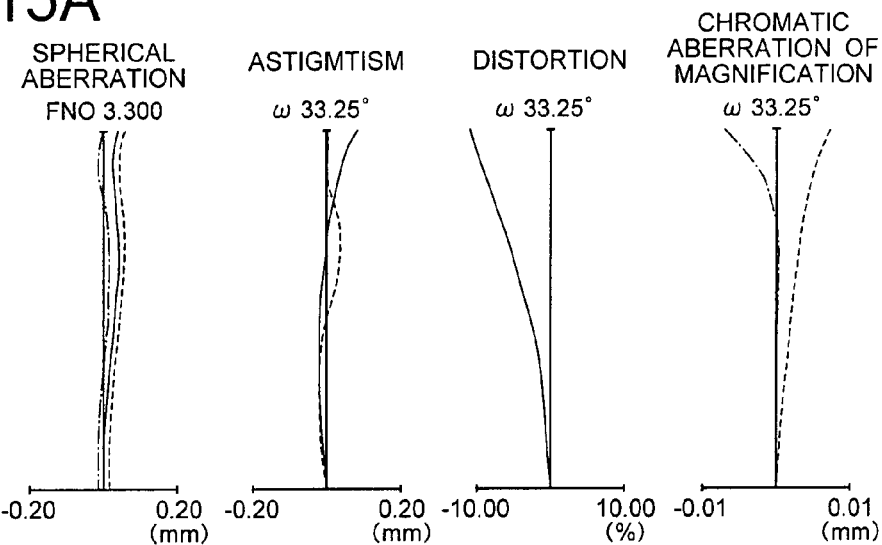
FIG. 15A, FIG. 15B, and FIG. 15C are diagrams similar to FIG. 10A, FIG. 10B, and FIG. 10C respectively, at the time of the infinite object point focusing, according to the sixth embodiment.
Figure 15B:
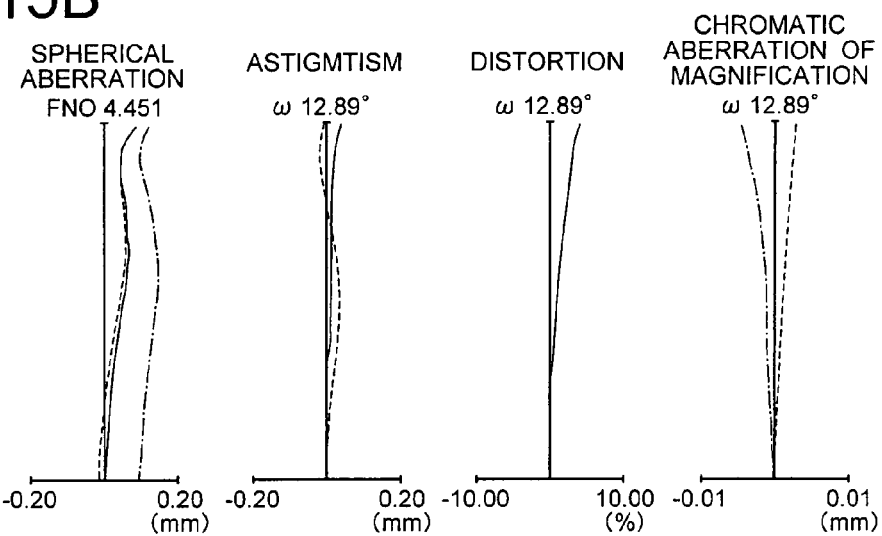
Figure 15C:
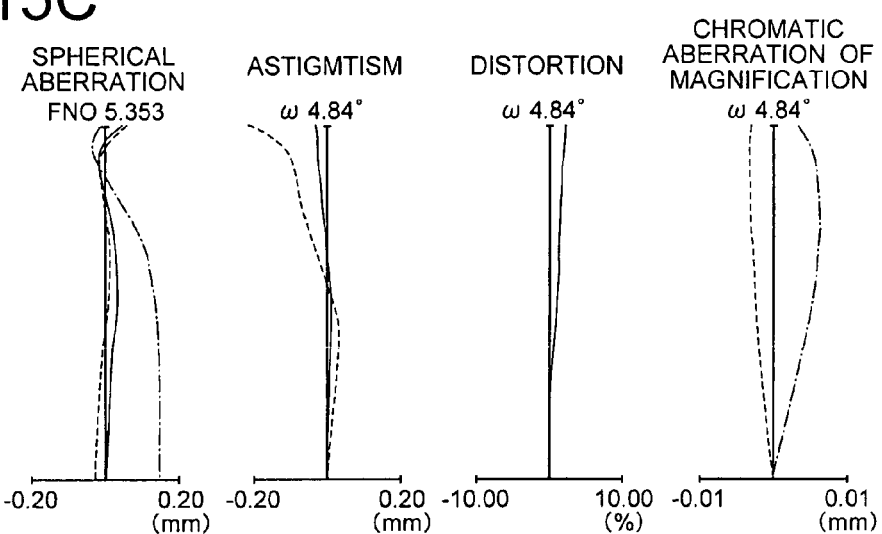
Figure 16A:
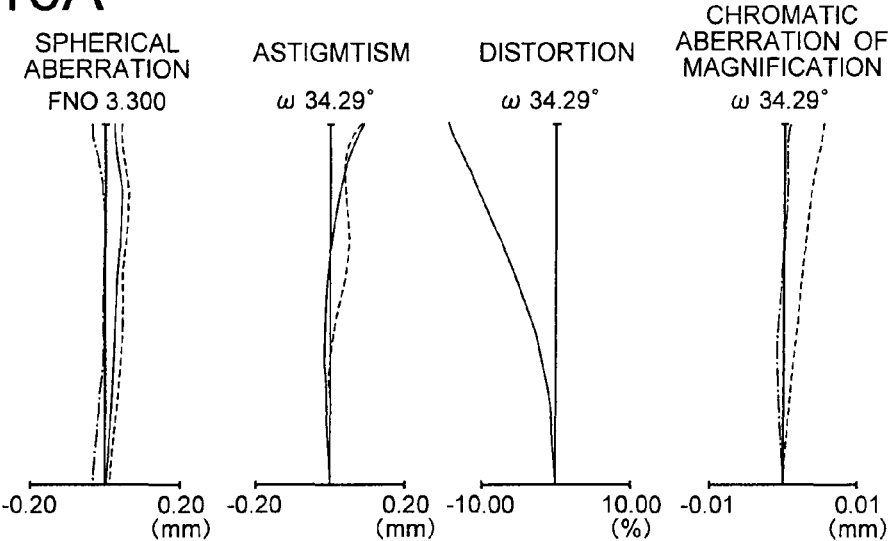
FIG. 16A, FIG. 16B, and FIG. 16C are diagrams similar to FIG. 10A, FIG. 10B, and FIG. 10C respectively, at the time of the infinite object point focusing, according to the seventh embodiment.
Figure 16B:
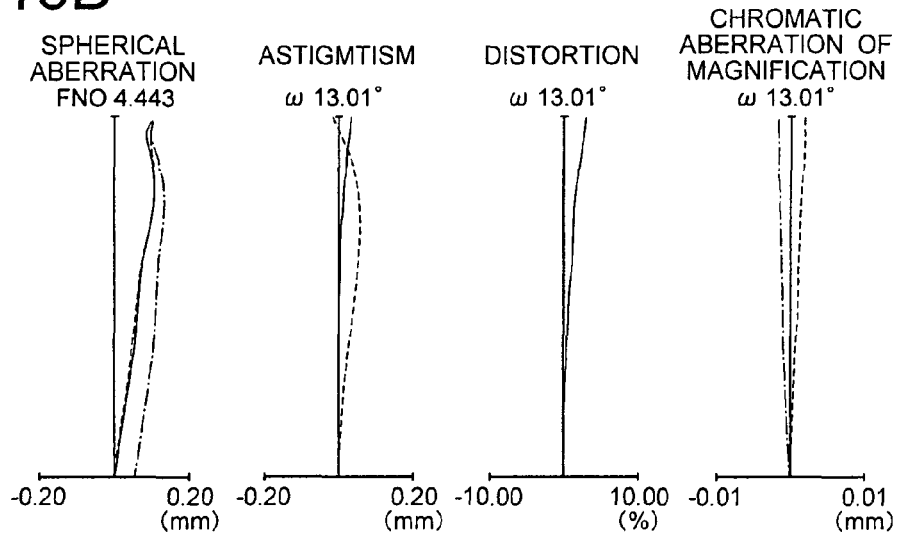
Figure 16C:
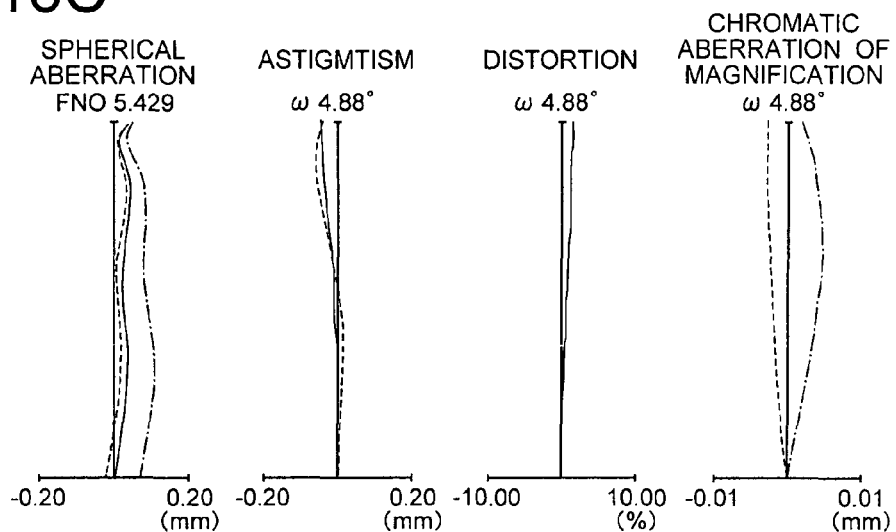
Figure 17A:
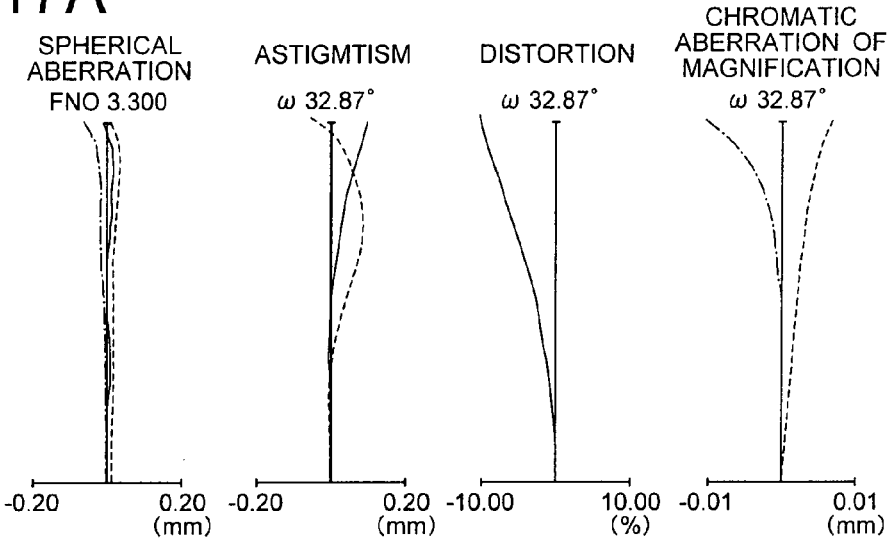
FIG. 17A, FIG. 17B, and FIG. 17C are diagrams similar to FIG. 10A, FIG. 10B, and FIG. 10C respectively, at the time of the infinite object point focusing, according to the eighth embodiment.
Figure 17B:
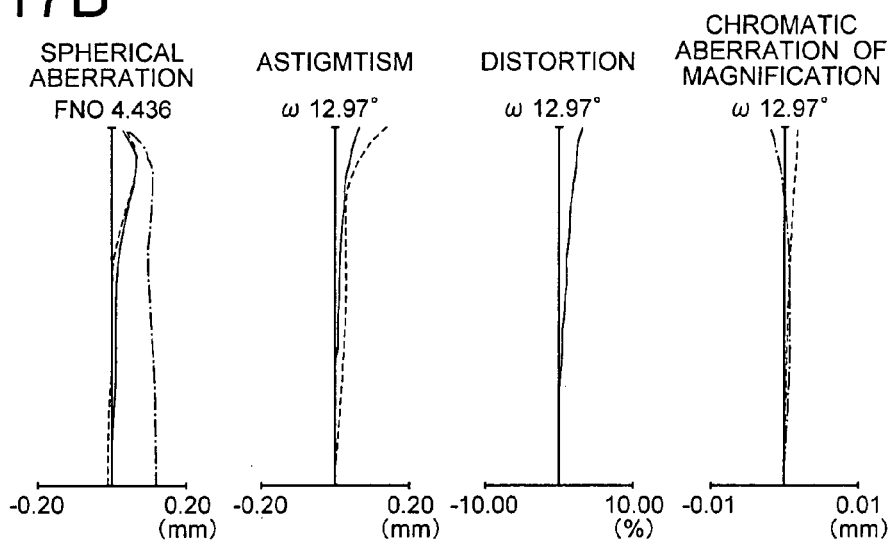
Figure 17C:
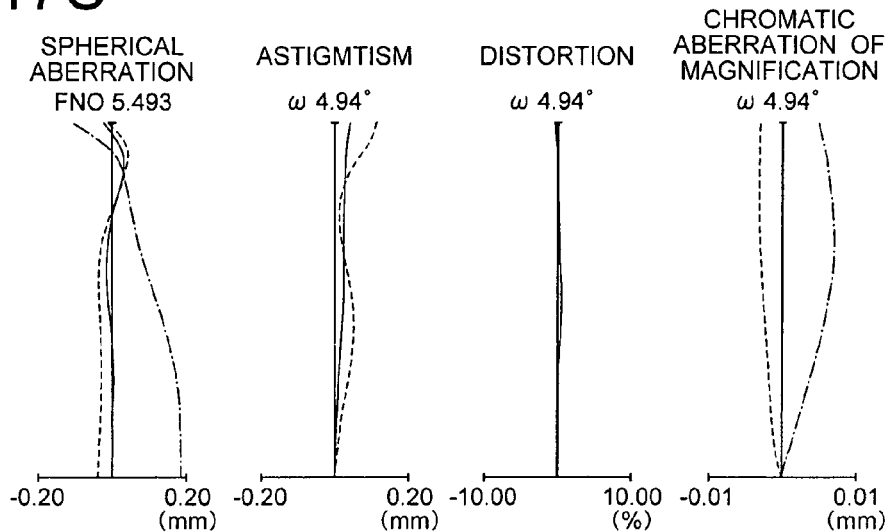
Figure 18A:
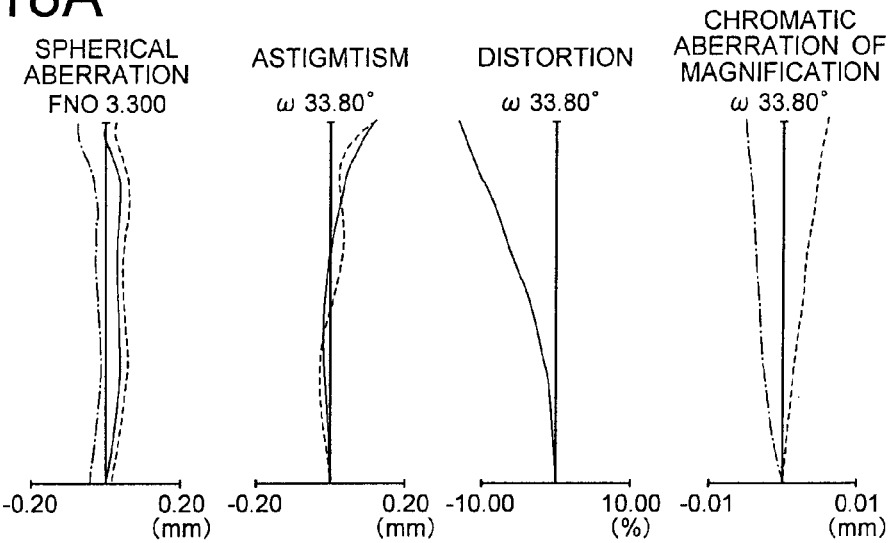
FIG. 18A, FIG. 18B, and FIG. 18C are diagrams similar to FIG. 10A, FIG. 10B, and FIG. 10C respectively, at the time of the infinite object point focusing, according to the ninth embodiment.
Figure 18B:
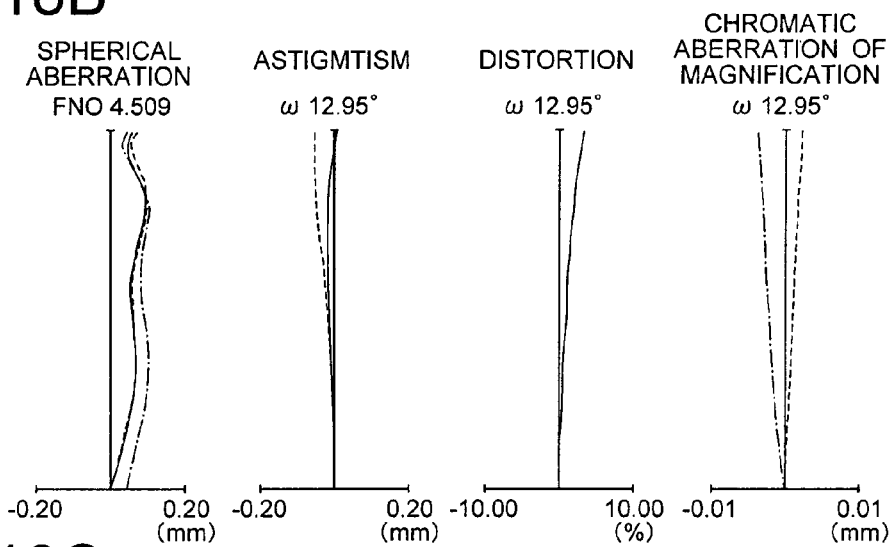
Figure 18C:
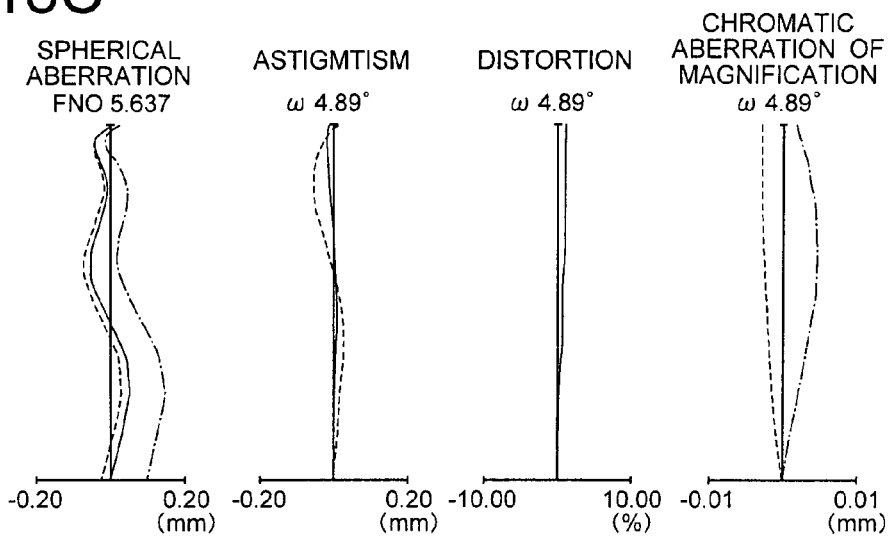

A zoom lens system in the ninth embodiment, as shown in FIG. 9A to FIG. 9C, includes, in order form the object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S, toward the object side, and the fourth lens unit G4 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens, a fourth biconvex positive lens, and a fifth biconcave negative lens. The third lens unit G3 includes a sixth biconvex positive lens, a seventh positive meniscus lens having a convex surface directed toward the object side, and an eighth negative meniscus lens having a convex surface directed toward the object side. The seventh positive meniscus lens and the eighth negative meniscus lens are cemented. The fourth lens unit G4 includes a ninth biconvex positive lens. A lens apex of a twelfth surface is positioned on the object side, farther than the aperture stop S.

An aspheric surface is used for six surfaces namely, a surface on the image side of the second biconvex positive lens, both surfaces of the third biconcave negative lens, both surfaces of the sixth biconvex positive lens, and a surface toward the object side, of the ninth biconvex positive lens. Moreover, a tenth surface is a virtual surface.

Numerical data of each embodiment described above is shown below. Apart from symbols described above, f denotes a focal length of the entire zoom lens system, $F_{NO}$ denotes an F number, ω denotes a half image angle, WE denotes a wide angle end, ST denotes an intermediate state, TE denotes a telephoto end, each of $r_1$, $r_2$, ... denotes radius of curvature of each lens surface, each of $d_1$, $d_2$, ... denotes a distance between two lenses, each of $n_{d1}$, $n_{d2}$, ... denotes a refractive index of each lens for a d-line, and each of $v_{d1}$, $v_{d2}$, ... denotes an Abbe's number for each lens. When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, $A_4$, $A_6$, $A_8$, $A_{10}$, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Further "A" means that the surface is an aspheric surface, and "S" means that the surface is an aperture stop.

Example 1

| | | | |
|---|---|---|---|
| $r_1 = 21.698$ | $d_1 = 0.80$ | $n_{d1} = 2.00170$ | $v_{d1} = 20.64$ |
| $r_2 = 17.688$ | $d_2 = 4.06$ | $n_{d2} = 1.49700$ | $v_{d2} = 81.54$ |
| $r_3 = -29.133$(A) | $d_3 =$ (Variable) | | |
| $r_4 = -12.208$(A) | $d_4 = 0.90$ | $n_{d3} = 1.80610$ | $v_{d3} = 40.88$ |
| $r_5 = 5.778$(A) | $d_5 = 0.98$ | | |
| $r_6 = 9.168$ | $d_6 = 1.90$ | $n_{d4} = 1.92286$ | $v_{d4} = 18.90$ |
| $r_7 = 26.277$ | $d_7 =$ (Variable) | | |
| $r_8 = \infty$ | $d_8 = 0.98$ | | |
| $r_9 = \infty$(S) | $d_9 = -0.10$ | | |
| $r_{10} = 4.600$(A) | $d_{10} = 3.01$ | $n_{d5} = 1.49700$ | $v_{d5} = 81.54$ |
| $r_{11} = -11.717$(A) | $d_{11} = 0.20$ | | |
| $r_{12} = 4.992$ | $d_{12} = 1.26$ | $n_{d6} = 1.60342$ | $v_{d6} = 38.03$ |
| $r_{13} = 8.287$ | $d_{13} = 0.39$ | $n_{d7} = 2.00330$ | $v_{d7} = 28.27$ |
| $r_{14} = 3.230$ | $d_{14} = 0.70$ | | |
| $r_{15} = \infty$ | $d_{15} =$ (Variable) | | |
| $r_{16} = 24.719$(A) | $d_{16} = 1.93$ | $n_{d8} = 1.74330$ | $v_{d8} = 49.33$ |
| $r_{17} = -69.248$ | $d_{17} =$ (Variable) | | |
| $r_{18} = \infty$ | $d_{18} = 0.50$ | $n_{d9} = 1.51633$ | $v_{d9} = 64.14$ |
| $r_{19} = \infty$ | $d_{19} = 0.50$ | | |
| $r_{20} = \infty$ | $d_{20} = 0.50$ | $n_{d10} = 1.51633$ | $v_{d10} = 64.14$ |
| $r_{21} = \infty$ | $d_{21} = 0.37$ | | |
| $r_{22} = \infty$(Light receiving surface of electronic image pickup apparatus, image plane) | | | |

| Aspherical coefficients |
|---|
| 3rd surface |
| K = 0.000 |
| $A_4 = 3.82038$e−05 |
| $A_6 = -8.48090$e−08 |
| $A_8 = 3.61465$e−10 |
| 4th surface |
| K = 0.089 |
| $A_4 = 4.60626$e−05 |
| $A_6 = 1.28261$e−05 |
| $A_8 = -1.58317$e−07 |
| 5th surface |
| K = −0.406 |
| $A_4 = -5.63186$e−04 |
| $A_6 = 8.35981$e−06 |
| $A_8 = 2.80302$e−07 |
| 10th surface |
| K = −0.227 |
| $A_4 = -1.01015$e−03 |
| $A_6 = -2.49056$e−05 |

11th surface

K = 0.000
$A_4 = 6.04770e{-}04$
$A_6 = -2.94658e{-}05$
$A_8 = 1.98114e{-}06$

16th surface

K = 0.000
$A_4 = 1.18442e{-}04$
$A_6 = 3.01521e{-}06$
$A_8 = 4.62981e{-}07$
$A_{10} = -2.00000e{-}08$

Zoom data (∞)

|  | WE | ST | TE |
|---|---|---|---|
| f (mm) | 6.88 | 16.85 | 46.28 |
| $F_{NO}$ | 3.30 | 4.43 | 5.67 |
| 2ω (°) | 63.08 | 24.77 | 9.31 |
| $d_3$ | 0.71 | 7.57 | 13.70 |
| $d_7$ | 12.31 | 6.87 | 0.60 |
| $d_{15}$ | 2.30 | 8.77 | 15.01 |
| $d_{17}$ | 5.06 | 3.68 | 1.50 |

Example 2

| | | | |
|---|---|---|---|
| $r_1 = 20.645$ | $d_1 = 0.80$ | $n_{d1} = 2.00170$ | $\nu_{d1} = 20.64$ |
| $r_2 = 16.835$ | $d_2 = 4.25$ | $n_{d2} = 1.49700$ | $\nu_{d2} = 81.54$ |
| $r_3 = -26.751(A)$ | $d_3 = $ (Variable) | | |
| $r_4 = -14.412(A)$ | $d_4 = 0.94$ | $n_{d3} = 1.88300$ | $\nu_{d3} = 40.76$ |
| $r_5 = 5.846(A)$ | $d_5 = 0.80$ | | |
| $r_6 = 8.130$ | $d_6 = 2.01$ | $n_{d4} = 1.92286$ | $\nu_{d4} = 18.90$ |
| $r_7 = 19.830$ | $d_7 = $ (Variable) | | |
| $r_8 = \infty$ | $d_8 = 0.98$ | | |
| $r_9 = \infty(S)$ | $d_9 = -0.10$ | | |
| $r_{10} = 4.569(A)$ | $d_{10} = 3.11$ | $n_{d5} = 1.49700$ | $\nu_{d5} = 81.54$ |
| $r_{11} = -12.606(A)$ | $d_{11} = 0.23$ | | |
| $r_{12} = 4.855$ | $d_{12} = 1.20$ | $n_{d6} = 1.60342$ | $\nu_{d6} = 38.03$ |
| $r_{13} = 7.083$ | $d_{13} = 0.39$ | $n_{d7} = 2.00330$ | $\nu_{d7} = 28.27$ |
| $r_{14} = 3.164$ | $d_{14} = 0.70$ | | |
| $r_{15} = \infty$ | $d_{15} = $ (Variable) | | |
| $r_{16} = 20.534(A)$ | $d_{16} = 2.09$ | $n_{d8} = 1.74330$ | $\nu_{d8} = 49.33$ |
| $r_{17} = -174.515$ | $d_{17} = $ (Variable) | | |
| $r_{18} = \infty$ | $d_{18} = 0.50$ | $n_{d9} = 1.51633$ | $\nu_{d9} = 64.14$ |
| $r_{19} = \infty$ | $d_{19} = 0.50$ | | |
| $r_{20} = \infty$ | $d_{20} = 0.50$ | $n_{d10} = 1.51633$ | $\nu_{d10} = 64.14$ |
| $r_{21} = \infty$ | $d_{21} = 0.37$ | | |
| $r_{22} = \infty$ (Light receiving surface of electronic image pickup apparatus, image plane) | | | |

Aspherical coefficients

3rd surface

K = 0.000
$A_4 = 4.69441e{-}05$
$A_6 = -1.14534e{-}07$
$A_8 = 4.94209e{-}10$

4th surface

K = 0.089
$A_4 = -1.91915e{-}04$
$A_6 = 1.92984e{-}05$
$A_8 = -2.28818e{-}07$

5th surface

K = −0.406
$A_4 = -5.68873e{-}04$
$A_6 = 7.83764e{-}06$
$A_8 = 6.33582e{-}07$

10th surface

K = −0.227
$A_4 = -9.38774e{-}04$
$A_6 = -2.98017e{-}05$

11th surface

K = 0.000
$A_4 = 6.11227e{-}04$
$A_6 = -3.00252e{-}05$
$A_8 = 1.85735e{-}06$

16th surface

K = 0.000
$A_4 = 2.12280e{-}04$
$A_6 = -2.82589e{-}06$
$A_8 = 6.55635e{-}07$
$A_{10} = -2.00000e{-}08$

Zoom data (∞)

|  | WE | ST | TE |
|---|---|---|---|
| f (mm) | 6.88 | 16.84 | 46.28 |
| $F_{NO}$ | 3.30 | 4.42 | 5.59 |
| 2ω (°) | 63.68 | 24.93 | 9.36 |
| $d_3$ | 0.50 | 6.97 | 12.70 |
| $d_7$ | 12.16 | 7.05 | 0.99 |
| $d_{15}$ | 2.22 | 8.72 | 14.86 |
| $d_{17}$ | 5.09 | 3.81 | 1.61 |

Example 3

| | | | |
|---|---|---|---|
| $r_1 = 22.538$ | $d_1 = 0.80$ | $n_{d1} = 2.00170$ | $\nu_{d1} = 20.64$ |
| $r_2 = 18.176$ | $d_2 = 4.07$ | $n_{d2} = 1.49700$ | $\nu_{d2} = 81.54$ |
| $r_3 = -27.449(A)$ | $d_3 = $ (Variable) | | |
| $r_4 = -11.281(A)$ | $d_4 = 0.90$ | $n_{d3} = 1.80610$ | $\nu_{d3} = 40.88$ |
| $r_5 = 6.540(A)$ | $d_5 = 0.99$ | | |
| $r_6 = 10.399$ | $d_6 = 1.88$ | $n_{d4} = 2.10227$ | $\nu_{d4} = 17.10$ |
| $r_7 = 22.503$ | $d_7 = $ (Variable) | | |
| $r_8 = \infty$ | $d_8 = 0.98$ | | |
| $r_9 = \infty(S)$ | $d_9 = -0.10$ | | |
| $r_{10} = 4.505(A)$ | $d_{10} = 3.06$ | $n_{d5} = 1.49700$ | $\nu_{d5} = 81.54$ |
| $r_{11} = -11.895(A)$ | $d_{11} = 0.22$ | | |
| $r_{12} = 5.146$ | $d_{12} = 1.18$ | $n_{d6} = 1.60342$ | $\nu_{d6} = 38.03$ |
| $r_{13} = 7.646$ | $d_{13} = 0.39$ | $n_{d7} = 2.00330$ | $\nu_{d7} = 28.27$ |
| $r_{14} = 3.245$ | $d_{14} = 0.70$ | | |
| $r_{15} = \infty$ | $d_{15} = $ (Variable) | | |
| $r_{16} = 24.762(A)$ | $d_{16} = 2.06$ | $n_{d8} = 1.74330$ | $\nu_{d8} = 49.33$ |
| $r_{17} = -66.758$ | $d_{17} = $ (Variable) | | |
| $r_{18} = \infty$ | $d_{18} = 0.50$ | $n_{d9} = 1.51633$ | $\nu_{d9} = 64.14$ |
| $r_{19} = \infty$ | $d_{19} = 0.50$ | | |
| $r_{20} = \infty$ | $d_{20} = 0.50$ | $n_{d10} = 1.51633$ | $\nu_{d10} = 64.14$ |
| $r_{21} = \infty$ | $d_{21} = 0.37$ | | |
| $r_{22} = \infty$ (Light receiving surface of electronic image pickup apparatus, image plane) | | | |

Aspherical coefficients

3rd surface

K = 0.000
$A_4 = 3.92559e{-}05$
$A_6 = -6.29929e{-}08$
$A_8 = 2.03948e{-}10$

4th surface

K = 0.089
$A_4 = 2.03912e{-}04$
$A_6 = 1.01180e{-}05$
$A_8 = -1.28824e{-}07$

5th surface

K = −0.406
$A_4$ = −3.80310e−04
$A_6$ = 1.04953e−05
$A_8$ = 2.29140e−07

10th surface

K = −0.227
$A_4$ = −1.05417e−03
$A_6$ = −2.31881e−05

11th surface

K = 0.000
$A_4$ = 6.50102e−04
$A_6$ = −2.65162e−05
$A_8$ = 1.92181e−06

16th surface

K = 0.000
$A_4$ = 1.47469e−04
$A_6$ = −1.30252e−06
$A_8$ = 6.46852e−07
$A_{10}$ = −2.00000e−08

Zoom data (∞)

|  | WE | ST | TE |
|---|---|---|---|
| f (mm) | 6.88 | 16.85 | 46.29 |
| $F_{NO}$ | 3.30 | 4.43 | 5.64 |
| 2ω (°) | 63.19 | 24.73 | 9.31 |
| $d_3$ | 0.68 | 7.52 | 13.70 |
| $d_7$ | 12.42 | 6.96 | 0.69 |
| $d_{15}$ | 2.28 | 8.77 | 14.93 |
| $d_{17}$ | 5.03 | 3.69 | 1.50 |

Example 4

| $r_1$ = 20.479 | $d_1$ = 0.80 | $n_{d1}$ = 2.00170 | $v_{d1}$ = 20.64 |
|---|---|---|---|
| $r_2$ = 16.826 | $d_2$ = 4.06 | $n_{d2}$ = 1.49700 | $v_{d2}$ = 81.54 |
| $r_3$ = −32.919(A) | $d_3$ = (Variable) | | |
| $r_4$ = −11.994(A) | $d_4$ = 0.91 | $n_{d3}$ = 1.83481 | $v_{d3}$ = 42.71 |
| $r_5$ = 6.532(A) | $d_5$ = 0.78 | | |
| $r_6$ = 8.849 | $d_6$ = 1.86 | $n_{d4}$ = 1.92286 | $v_{d4}$ = 18.90 |
| $r_7$ = 21.254 | $d_7$ = (Variable) | | |
| $r_8$ = ∞ | $d_8$ = 0.98 | | |
| $r_9$ = ∞(S) | $d_9$ = −0.10 | | |
| $r_{10}$ = 5.038(A) | $d_{10}$ = 3.14 | $n_{d5}$ = 1.49700 | $v_{d5}$ = 81.54 |
| $r_{11}$ = −11.062(A) | $d_{11}$ = 0.29 | | |
| $r_{12}$ = 5.130 | $d_{12}$ = 1.25 | $n_{d6}$ = 1.60342 | $v_{d6}$ = 38.03 |
| $r_{13}$ = 8.213 | $d_{13}$ = 0.39 | $n_{d7}$ = 2.00330 | $v_{d7}$ = 28.27 |
| $r_{14}$ = 3.497 | $d_{14}$ = 0.70 | | |
| $r_{15}$ = ∞ | $d_{15}$ = (Variable) | | |
| $r_{16}$ = 22.108(A) | $d_{16}$ = 1.98 | $n_{d8}$ = 1.74330 | $v_{d8}$ = 49.33 |
| $r_{17}$ = −144.779 | $d_{17}$ = (Variable) | | |
| $r_{18}$ = ∞ | $d_{18}$ = 0.50 | $n_{d9}$ = 1.51633 | $v_{d9}$ = 64.14 |
| $r_{19}$ = ∞ | $d_{19}$ = 0.50 | | |
| $r_{20}$ = ∞ | $d_{20}$ = 0.50 | $n_{d10}$ = 1.51633 | $v_{d10}$ = 64.14 |
| $r_{21}$ = ∞ | $d_{21}$ = 0.37 | | |
| $r_{22}$ = ∞(Light receiving surface of electronic image pickup apparatus, image plane) | | | |

Aspherical coefficients

3rd surface

K = 0.000
$A_4$ = 3.03379e−05
$A_6$ = −5.30314e−08
$A_8$ = 2.38853e−10

4th surface

K = 0.089
$A_4$ = −4.93344e−05
$A_6$ = 1.67517e−05
$A_8$ = −1.98391e−07

5th surface

K = −0.406
$A_4$ = −4.16293e−04
$A_6$ = 9.24712e−06
$A_8$ = 4.77141e−07

10th surface

K = −0.227
$A_4$ = −8.15716e−04
$A_6$ = −2.26164e−05

11th surface

K = 0.000
$A_4$ = 6.46494e−04
$A_6$ = −3.54167e−05
$A_8$ = 1.87547e−06

16th surface

K = 0.000
$A_4$ = 2.61106e−04
$A_6$ = −1.49917e−06
$A_8$ = 6.34056e−07
$A_{10}$ = −2.00000e−08

Zoom data (∞)

|  | WE | ST | TE |
|---|---|---|---|
| f (mm) | 6.88 | 16.85 | 46.28 |
| $F_{NO}$ | 3.30 | 4.45 | 5.72 |
| 2ω (°) | 67.46 | 25.81 | 9.52 |
| $d_3$ | 0.86 | 7.53 | 13.70 |
| $d_7$ | 12.34 | 6.75 | 0.63 |
| $d_{15}$ | 2.15 | 8.73 | 15.24 |
| $d_{17}$ | 5.07 | 3.69 | 1.43 |

Example 5

| $r_1$ = 23.668 | $d_1$ = 0.80 | $n_{d1}$ = 2.00170 | $v_{d1}$ = 20.64 |
|---|---|---|---|
| $r_2$ = 19.590 | $d_2$ = 3.98 | $n_{d2}$ = 1.49700 | $v_{d2}$ = 81.54 |
| $r_3$ = −27.384(A) | $d_3$ = (Variable) | | |
| $r_4$ = −12.598(A) | $d_4$ = 0.91 | $n_{d3}$ = 1.83481 | $v_{d3}$ = 42.71 |
| $r_5$ = 6.347(A) | $d_5$ = 0.91 | | |
| $r_6$ = 9.462 | $d_6$ = 1.88 | $n_{d4}$ = 1.92286 | $v_{d4}$ = 18.90 |
| $r_7$ = 25.431 | $d_7$ = (Variable) | | |
| $r_8$ = ∞ | $d_8$ = 0.98 | | |
| $r_9$ = ∞(S) | $d_9$ = −0.10 | | |
| $r_{10}$ = 4.380(A) | $d_{10}$ = 2.64 | $n_{d5}$ = 1.49700 | $v_{d5}$ = 81.54 |
| $r_{11}$ = −11.978(A) | $d_{11}$ = 0.21 | | |
| $r_{12}$ = 5.009 | $d_{12}$ = 1.17 | $n_{d6}$ = 1.51742 | $v_{d6}$ = 52.43 |
| $r_{13}$ = 6.232 | $d_{13}$ = 0.40 | $n_{d7}$ = 2.00330 | $v_{d7}$ = 28.27 |
| $r_{14}$ = 3.071 | $d_{14}$ = 0.70 | | |
| $r_{15}$ = ∞ | $d_{15}$ = (Variable) | | |
| $r_{16}$ = 21.580(A) | $d_{16}$ = 2.06 | $n_{d8}$ = 1.81474 | $v_{d8}$ = 37.03 |
| $r_{17}$ = −978.404 | $d_{17}$ = (Variable) | | |
| $r_{18}$ = ∞ | $d_{18}$ = 0.50 | $n_{d9}$ = 1.51633 | $v_{d9}$ = 64.14 |
| $r_{19}$ = ∞ | $d_{19}$ = 0.50 | | |
| $r_{20}$ = ∞ | $d_{20}$ = 0.50 | $n_{d10}$ = 1.51633 | $v_{d10}$ = 64.14 |
| $r_{21}$ = ∞ | $d_{21}$ = 0.37 | | |
| $r_{22}$ = ∞(Light receiving surface of electronic image pickup apparatus, image plane) | | | |

Aspherical coefficients

3rd surface

K = −7.111
$A_4$ = −5.55917e−07

-continued $A_6 = 1.43935e{-}08$
$A_8 = 1.59184e{-}10$
$A_{10} = 2.14201e{-}14$
4th surface $K = 0.164$
$A_4 = -5.56372e{-}05$
$A_6 = 2.25017e{-}05$
$A_8 = -6.41799e{-}07$
$A_{10} = 7.92547e{-}09$
5th surface $K = 0.426$
$A_4 = -1.02133e{-}03$
$A_6 = 2.17154e{-}05$
$A_8 = -1.26409e{-}06$
$A_{10} = 6.37628e{-}09$
10th surface $K = -3.075$
$A_4 = 2.84705e{-}03$
$A_6 = -1.36330e{-}04$
11th surface $K = 8.240$
$A_4 = 7.87536e{-}04$
$A_6 = 4.92757e{-}05$
$A_8 = -1.38094e{-}05$
$A_{10} = 8.57143e{-}07$
16th surface $K = -4.140$
$A_4 = 1.27942e{-}04$
$A_6 = 2.38646e{-}05$
$A_8 = -1.38465e{-}06$
$A_{10} = 2.83638e{-}08$ Zoom data (∞)

| | WE | ST | TE |
|---|---|---|---|
| f (mm) | 6.62 | 16.17 | 44.53 |
| $F_{NO}$ | 3.30 | 4.44 | 5.50 |
| 2ω (°) | 65.90 | 25.93 | 9.87 |
| $d_3$ | 0.70 | 7.35 | 13.70 |
| $d_7$ | 13.43 | 7.55 | 0.60 |
| $d_{15}$ | 1.98 | 8.49 | 13.39 |
| $d_{17}$ | 5.27 | 4.06 | 3.60 |

Example 6

| $r_1 = 22.602$ | $d_1 = 0.80$ | $n_{d1} = 2.00170$ | $v_{d1} = 20.64$ |
|---|---|---|---|
| $r_2 = 18.738$ | $d_2 = 4.13$ | $n_{d2} = 1.49700$ | $v_{d2} = 81.54$ |
| $r_3 = -25.691$(A) | $d_3$ = (Variable) | | |
| $r_4 = -13.288$(A) | $d_4 = 0.91$ | $n_{d3} = 1.83481$ | $v_{d3} = 42.71$ |
| $r_5 = 16.534$(A) | $d_5 = 0.55$ | | |
| $r_6 = 28.680$ | $d_6 = 0.70$ | $n_{d4} = 1.88300$ | $v_{d4} = 40.76$ |
| $r_7 = 7.398$ | $d_7 = 0.47$ | | |
| $r_8 = 8.542$ | $d_8 = 2.05$ | $n_{d5} = 1.92286$ | $v_{d5} = 18.90$ |
| $r_9 = 23.121$ | $d_9$ = (Variable) | | |
| $r_{10} = \infty$ | $d_{10} = 0.98$ | | |
| $r_{11} = \infty$(S) | $d_{11} = -0.10$ | | |
| $r_{12} = 4.478$(A) | $d_{12} = 2.56$ | $n_{d6} = 1.49700$ | $v_{d6} = 81.54$ |
| $r_{13} = -15.247$(A) | $d_{13} = 0.20$ | | |
| $r_{14} = 4.817$ | $d_{14} = 1.47$ | $n_{d7} = 1.51742$ | $v_{d7} = 52.43$ |
| $r_{15} = 7.370$ | $d_{15} = 0.40$ | $n_{d8} = 2.00330$ | $v_{d8} = 28.27$ |
| $r_{16} = 3.171$ | $d_{16} = 0.70$ | | |
| $r_{17} = \infty$ | $d_{17}$ = (Variable) | | |
| $r_{18} = 17.556$(A) | $d_{18} = 2.28$ | $n_{d9} = 1.81474$ | $v_{d9} = 37.03$ |
| $r_{19} = -356.352$ | $d_{19}$ = (Variable) | | |
| $r_{20} = \infty$ | $d_{20} = 0.50$ | $n_{d10} = 1.51633$ | $v_{d10} = 64.14$ |
| $r_{21} = \infty$ | $d_{21} = 0.50$ | | |

-continued

| $r_{22} = \infty$ | $d_{22} = 0.50$ | $n_{d11} = 1.51633$ | $v_{d11} = 64.14$ |
|---|---|---|---|
| $r_{23} = \infty$ | $d_{23} = 0.37$ | | |
| $r_{24} = \infty$ (Light receiving surface of electronic image pickup apparatus, image plane) | | | |

Aspherical coefficients

3rd surface $K = -2.655$
$A_4 = 2.84235e{-}05$
$A_6 = -1.26821e{-}07$
$A_8 = 6.53842e{-}10$
$A_{10} = 2.14201e{-}14$
4th surface $K = 1.985$
$A_4 = -1.54238e{-}04$
$A_6 = 3.31806e{-}05$
$A_8 = -7.71567e{-}07$
$A_{10} = 7.92547e{-}09$
5th surface $K = 7.086$
$A_4 = -9.45498e{-}04$
$A_6 = 3.71912e{-}05$
$A_8 = -9.25584e{-}07$
$A_{10} = 6.37628e{-}09$
12th surface $K = -1.244$
$A_4 = 5.05817e{-}04$
$A_6 = 4.58343e{-}05$
13th surface $K = 0.148$
$A_4 = 6.24060e{-}04$
$A_6 = 7.30506e{-}05$
$A_8 = -8.70760e{-}06$
$A_{10} = 8.57143e{-}07$
18th surface $K = -5.979$
$A_4 = 1.62882e{-}04$
$A_6 = 2.08747e{-}05$
$A_8 = -1.27158e{-}06$
$A_{10} = 2.83638e{-}08$ Zoom data (∞)
(∞)

| | WE | ST | TE |
|---|---|---|---|
| f (mm) | 6.62 | 16.17 | 44.53 |
| $F_{NO}$ | 3.30 | 4.45 | 5.35 |
| 2ω (°) | 66.51 | 25.78 | 9.68 |
| $d_3$ | 0.61 | 6.85 | 12.93 |
| $d_9$ | 13.00 | 7.50 | 0.60 |
| $d_{17}$ | 1.91 | 8.34 | 12.90 |
| $d_{19}$ | 4.88 | 4.05 | 3.00 |

Example 7

| $r_1 = 23.899$ | $d_1 = 0.80$ | $n_{d1} = 2.00170$ | $v_{d1} = 20.64$ |
|---|---|---|---|
| $r_2 = 19.824$ | $d_2 = 4.24$ | $n_{d2} = 1.49700$ | $v_{d2} = 81.54$ |
| $r_3 = -26.164$(A) | $d_3$ = (Variable) | | |
| $r_4 = -10.790$(A) | $d_4 = 0.91$ | $n_{d3} = 1.83481$ | $v_{d3} = 42.71$ |
| $r_5 = 22.431$(A) | $d_5 = 0.90$ | | |
| $r_6 = 218.971$ | $d_6 = 2.10$ | $n_{d4} = 1.92286$ | $v_{d4} = 18.90$ |
| $r_7 = -13.195$ | $d_7 = 0.30$ | | |
| $r_8 = -10.758$ | $d_8 = 0.50$ | $n_{d5} = 1.88300$ | $v_{d5} = 40.76$ |
| $r_9 = 103.691$ | $d_9$ = (Variable) | | |
| $r_{10} = \infty$ | $d_{10} = 0.98$ | | |
| $r_{11} = \infty$(S) | $d_{11} = -0.10$ | | |

-continued

| | | | |
|---|---|---|---|
| $r_{12} = 4.295$(A) | $d_{12} = 2.51$ | $n_{d6} = 1.49700$ | $\nu_{d6} = 81.54$ |
| $r_{13} = -13.710$(A) | $d_{13} = 0.20$ | | |
| $r_{14} = 4.763$ | $d_{14} = 1.22$ | $n_{d7} = 1.51742$ | $\nu_{d7} = 52.43$ |
| $r_{15} = 6.332$ | $d_{15} = 0.40$ | $n_{d8} = 2.00330$ | $\nu_{d8} = 28.27$ |
| $r_{16} = 3.093$ | $d_{16} = 0.70$ | | |
| $r_{17} = \infty$ | $d_{17} = $ (Variable) | | |
| $r_{18} = 29.444$(A) | $d_{18} = 1.99$ | $n_{d9} = 1.81474$ | $\nu_{d9} = 37.03$ |
| $r_{19} = -51.206$ | $d_{19} = $ (Variable) | | |
| $r_{20} = \infty$ | $d_{20} = 0.50$ | $n_{d10} = 1.51633$ | $\nu_{d10} = 64.14$ |
| $r_{21} = \infty$ | $d_{21} = 0.50$ | | |
| $r_{22} = \infty$ | $d_{22} = 0.50$ | $n_{d11} = 1.51633$ | $\nu_{d11} = 64.14$ |
| $r_{23} = \infty$ | $d_{23} = 0.37$ | | |
| $r_{24} = \infty$(Light receiving surface of electronic image pickup apparatus, image plane) | | | |

Aspherical coefficients

3rd surface $K = -3.386$
$A_4 = 1.84236e-05$
$A_6 = -5.49013e-08$
$A_8 = 2.40556e-10$
$A_{10} = -3.81661e-13$ 4th surface $K = -3.373$
$A_4 = -5.91701e-06$
$A_6 = 1.42524e-05$
$A_8 = -3.49467e-07$
$A_{10} = 3.04350e-09$ 5th surface $K = 3.350$
$A_4 = -1.83526e-04$
$A_6 = 2.07397e-05$
$A_8 = -4.59555e-07$
$A_{10} = 6.67020e-09$ 12th surface $K = -1.796$
$A_4 = 1.38580e-03$
$A_6 = 5.53570e-06$ 13th surface $K = -92.455$
$A_4 = -3.55086e-03$
$A_6 = 7.78041e-04$
$A_8 = -9.98896e-05$
$A_{10} = 5.79723e-06$ 18th surface $K = 5.707$
$A_4 = 1.30782e-04$
$A_6 = 9.36732e-06$
$A_8 = -4.60064e-07$
$A_{10} = 7.60826e-09$ Zoom data (∞)

| | WE | ST | TE |
|---|---|---|---|
| f (mm) | 6.62 | 16.17 | 44.53 |
| $F_{NO}$ | 3.30 | 4.44 | 5.43 |
| 2ω (°) | 68.57 | 26.03 | 9.75 |
| $d_3$ | 0.58 | 7.10 | 13.39 |
| $d_9$ | 12.27 | 6.94 | 0.60 |
| $d_{17}$ | 2.29 | 8.51 | 13.18 |
| $d_{19}$ | 4.97 | 3.90 | 3.00 |

Example 8

| | | | |
|---|---|---|---|
| $r_1 = 23.976$ | $d_1 = 0.80$ | $n_{d1} = 2.00170$ | $\nu_{d1} = 20.64$ |
| $r_2 = 19.903$ | $d_2 = 3.96$ | $n_{d2} = 1.49700$ | $\nu_{d2} = 81.54$ |
| $r_3 = -27.088$(A) | $d_3 = $ (Variable) | | |
| $r_4 = -13.009$(A) | $d_4 = 0.91$ | $n_{d3} = 1.83481$ | $\nu_{d3} = 42.71$ |
| $r_5 = 6.302$(A) | $d_5 = 0.92$ | | |
| $r_6 = 9.256$ | $d_6 = 1.87$ | $n_{d4} = 1.92286$ | $\nu_{d4} = 18.90$ |
| $r_7 = 23.104$ | $d_7 = $ (Variable) | | |
| $r_8 = \infty$ | $d_8 = 0.98$ | | |
| $r_9 = \infty$(S) | $d_9 = -0.10$ | | |
| $r_{10} = 4.405$(A) | $d_{10} = 2.63$ | $n_{d5} = 1.49700$ | $\nu_{d5} = 81.54$ |
| $r_{11} = -10.942$(A) | $d_{11} = 0.23$ | | |
| $r_{12} = 5.290$ | $d_{12} = 1.14$ | $n_{d6} = 1.51742$ | $\nu_{d6} = 52.43$ |
| $r_{13} = 6.299$ | $d_{13} = 0.41$ | $n_{d7} = 2.00330$ | $\nu_{d7} = 28.27$ |
| $r_{14} = 3.124$ | $d_{14} = 0.70$ | | |
| $r_{15} = \infty$ | $d_{15} = $ (Variable) | | |
| $r_{16} = 21.612$(A) | $d_{16} = 2.06$ | $n_{d8} = 1.81474$ | $\nu_{d8} = 37.03$ |
| $r_{17} = -3334.342$ | $d_{17} = $ (Variable) | | |
| $r_{18} = \infty$ | $d_{18} = 0.50$ | $n_{d9} = 1.51633$ | $\nu_{d9} = 64.14$ |
| $r_{19} = \infty$ | $d_{19} = 0.50$ | | |
| $r_{20} = \infty$ | $d_{20} = 0.50$ | $n_{d10} = 1.51633$ | $\nu_{d10} = 64.14$ |
| $r_{21} = \infty$ | $d_{21} = 0.37$ | | |
| $r_{22} = \infty$(Light receiving surface of electronic image pickup apparatus, image plane) | | | |

Aspherical coefficients

3rd surface $K = -3.358$
$A_4 = 2.30297e-05$
$A_6 = -1.22671e-07$
$A_8 = 7.32069e-10$
$A_{10} = 2.14201e-14$ 4th surface $K = -0.491$
$A_4 = -1.79874e-04$
$A_6 = 2.75493e-05$
$A_8 = -7.26410e-07$
$A_{10} = 7.92547e-09$ 5th surface $K = 0.311$
$A_4 = -1.03567e-03$
$A_6 = 2.81436e-05$
$A_8 = -1.04751e-06$
$A_{10} = 6.37628e-09$ 10th surface $K = -3.062$
$A_4 = 2.72342e-03$
$A_6 = -1.57228e-04$ 11th surface $K = -22.869$
$A_4 = -1.92400e-03$
$A_6 = 1.43485e-04$
$A_8 = -2.06398e-05$
$A_{10} = 8.57143e-07$ 16th surface $K = -3.300$
$A_4 = 1.45283e-04$
$A_6 = 2.16436e-05$
$A_8 = -1.33025e-06$
$A_{10} = 2.83638e-08$ Zoom data (∞)

| | WE | ST | TE |
|---|---|---|---|
| f (mm) | 6.62 | 16.18 | 44.54 |
| $F_{NO}$ | 3.30 | 4.44 | 5.49 |
| 2ω (°) | 65.74 | 25.95 | 9.88 |
| $d_3$ | 0.67 | 7.35 | 13.69 |
| $d_7$ | 13.36 | 7.50 | 0.60 |
| $d_{15}$ | 2.02 | 8.52 | 13.40 |
| $d_{17}$ | 5.28 | 4.07 | 3.61 |

Example 9

| | | | |
|---|---|---|---|
| $r_1 = 23.104$ | $d_1 = 0.80$ | $n_{d1} = 2.00170$ | $v_{d1} = 20.64$ |
| $r_2 = 19.396$ | $d_2 = 4.18$ | $n_{d2} = 1.49700$ | $v_{d2} = 81.54$ |
| $r_3 = -28.307(A)$ | $d_3 = $ (Variable) | | |
| $r_4 = -8.746(A)$ | $d_4 = 0.90$ | $nn_{d3} = 1.80610$ | $v_{d3} = 40.92$ |
| $r_5 = 22.609(A)$ | $d_5 = 0.96$ | | |
| $r_6 = 115.759$ | $d_6 = 1.98$ | $n_{d4} = 1.92286$ | $v_{d4} = 18.90$ |
| $r_7 = -14.259$ | $d_7 = 0.21$ | | |
| $r_8 = -13.143$ | $d_8 = 0.50$ | $n_{d5} = 1.88300$ | $v_{d5} = 40.76$ |
| $r_9 = 72.040$ | $d_9 = $ (Variable) | | |
| $r_{10} = \infty$ | $d_{10} = 0.98$ | | |
| $r_{11} = \infty(S)$ | $d_{11} = -0.10$ | | |
| $r_{12} = 4.226(A)$ | $d_{12} = 2.08$ | $n_{d6} = 1.49700$ | $v_{d6} = 81.54$ |
| $r_{13} = -16.546(A)$ | $d_{13} = 0.38$ | | |
| $r_{14} = 4.496$ | $d_{14} = 1.32$ | $n_{d7} = 1.51742$ | $v_{d7} = 52.43$ |
| $r_{15} = 6.297$ | $d_{15} = 0.40$ | $n_{d8} = 2.00330$ | $v_{d8} = 28.27$ |
| $r_{16} = 3.029$ | $d_{16} = 0.70$ | | |
| $r_{17} = \infty$ | $d_{17} = $ (Variable) | | |
| $r_{18} = 42.015(A)$ | $d_{18} = 1.93$ | $n_{d9} = 1.81474$ | $v_{d9} = 37.03$ |
| $r_{19} = -32.646$ | $d_{19} = $ (Variable) | | |
| $r_{20} = \infty$ | $d_{20} = 0.50$ | $n_{d10} = 1.51633$ | $v_{d10} = 64.14$ |
| $r_{21} = \infty$ | $d_{21} = 0.50$ | | |
| $r_{22} = \infty$ | $d_{22} = 0.50$ | $n_{d11} = 1.51633$ | $v_{d11} = 64.14$ |
| $r_{23} = \infty$ | $d_{23} = 0.37$ | | |
| $r_{24} = \infty$(Light receiving surface of electronic image pickup apparatus, image plane) | | | |

Aspherical coefficients

3rd surface

$K = -5.090$
$A_4 = 9.69822e-06$
$A_6 = -7.03853e-09$
$A_8 = 8.40603e-11$
$A_{10} = -7.99864e-13$

4th surface

$K = -7.664$
$A_4 = -2.42260e-04$
$A_6 = 1.92938e-05$
$A_8 = -4.98886e-07$
$A_{10} = 4.81577e-09$

5th surface

$K = 14.395$
$A_4 = 3.36955e-04$
$A_6 = -1.56311e-06$
$A_8 = -5.73815e-08$
$A_{10} = -1.93332e-09$

12th surface

$K = -4.899$
$A_4 = 6.91677e-03$
$A_6 = -4.70828e-04$
$A_8 = 3.61315e-05$
$A_{10} = 9.97270e-22$

13th surface

$K = -161.860$
$A_4 = -2.97697e-03$
$A_6 = 9.82793e-04$
$A_8 = -1.34602e-04$
$A_{10} = 1.02130e-05$

18th surface

$K = -238.183$
$A_4 = 4.66205e-04$
$A_6 = -2.07951e-06$
$A_8 = -1.03870e-07$
$A_{10} = 1.44607e-09$

Zoom data ($\infty$)

| | WE | ST | TE |
|---|---|---|---|
| f (mm) | 6.63 | 16.23 | 44.53 |
| $F_{NO}$ | 3.30 | 4.51 | 5.64 |
| $2\omega$ (°) | 67.60 | 25.89 | 9.77 |
| $d_3$ | 0.95 | 7.52 | 13.67 |
| $d_9$ | 11.63 | 6.65 | 0.60 |
| $d_{17}$ | 1.89 | 8.46 | 13.34 |
| $d_{19}$ | 5.04 | 3.61 | 3.00 |

A spherical aberration, an astigmatism, a distortion, and a chromatic aberration of magnification at the wide angle end, the intermediate state, and the telephoto end, at the time of infinite object point focusing according to the first embodiment to the ninth embodiment described above, are shown in FIG. 10A, FIG. 10B, and FIG. 10C to FIG. 18A, FIG. 18B, and FIG. 18C.

In the diagrams, '$\omega$' is a half image angle.

Values of conditional expressions (1) to (12) in the embodiments are given below.

| | | Ex 1 | Ex 2 | Ex 3 | Ex 4 | Ex 5 |
|---|---|---|---|---|---|---|
| (1) | $SF_{2n1}$ | 0.357 | 0.423 | 0.266 | 0.295 | 0.330 |
| (2) | $f_t/f_w$ | 6.725 | 6.728 | 6.726 | 6.725 | 6.725 |
| (A) | $R_{1pr}/R_{2n1f}$ | 2.386 | 1.856 | 2.433 | 2.745 | 2.174 |
| (B) | $SF_{1n}$ | 9.822 | 9.837 | 9.334 | 10.212 | 10.608 |
| (C) | $R_{1nr}/R_{1pf}$ | 1 | 1 | 1 | 1 | 1 |
| (D) | $d_{12}/\Sigma_{1G}$ | 0 | 0 | 0 | 0 | 0 |
| (3) | $f_1/f_t$ | 0.634 | 0.595 | 0.633 | 0.645 | 0.660 |
| (4) | $|f_2/f_t|$ | 0.164 | 0.154 | 0.164 | 0.163 | 0.172 |
| (5) | $f_3/f_t$ | 0.220 | 0.217 | 0.220 | 0.219 | 0.234 |
| (6) | $f_4/f_t$ | 0.534 | 0.537 | 0.530 | 0.560 | 0.583 |
| (7) | $v_{d1p} - v_{d1n}$ | 60.896 | 60.896 | 60.896 | 60.896 | 60.896 |
| (8) | $v_{d1p}$ | 81.540 | 81.540 | 81.540 | 81.540 | 81.540 |
| (9) | $v_{d3p}$ | 81.540 | 81.540 | 81.540 | 81.540 | 81.540 |
| (10) | $n_{d1n}$ | 2.002 | 2.002 | 2.002 | 2.002 | 2.002 |
| (11) | $n_{d2n}$ | 1.806 | 1.883 | 1.806 | 1.835 | 1.835 |
| (12) | $n_{d2p}$ | 1.923 | 1.923 | 2.102 | 1.923 | 1.923 |
| (13) | $SF_{1p}$ | -0.244 | -0.228 | -0.203 | -0.324 | -0.166 |
| (14) | $(\beta_{2t}/\beta_{2w})/(\beta_{3t}/\beta_{3w})$ | 1.759 | 1.874 | 1.784 | 1.654 | 1.576 |
| (15) | $\beta_{2t}/\beta_{2w}$ | 3.133 | 3.237 | 3.153 | 3.048 | 3.115 |
| (16) | $\beta_{3t}/\beta_{3w}$ | 1.781 | 1.727 | 1.768 | 1.842 | 1.977 |
| (17) | $\beta_{4t}/\beta_{4w}$ | 1.205 | 1.204 | 1.207 | 1.198 | 1.092 |
| (18) | $(D_{2w} + D_{1t})/f_t$ | 0.581 | 0.556 | 0.583 | 0.582 | 0.629 |
| (19) | $D_{2w}/f_t$ | 0.285 | 0.282 | 0.287 | 0.286 | 0.321 |
| (20) | $D_{1t}/f_t$ | 0.296 | 0.274 | 0.296 | 0.296 | 0.308 |
| (21) | $T_L/f_t$ | 1.074 | 1.068 | 1.077 | 1.079 | 1.116 |

| | | Ex 6 | Ex 7 | Ex 8 | Ex 9 |
|---|---|---|---|---|---|
| (1) | $SF_{2n1}$ | -0.109 | -0.350 | 0.347 | -0.442 |
| (2) | $f_t/f_w$ | 6.724 | 6.722 | 6.727 | 6.721 |
| (A) | $R_{1pr}/R_{2n1f}$ | 1.933 | 2.425 | 2.082 | 3.237 |
| (B) | $SF_{1n}$ | 10.699 | 10.730 | 10.773 | 11.462 |
| (C) | $R_{1nr}/R_{1pf}$ | 1 | 1 | 1 | 1 |
| (D) | $d_{12}/\Sigma_{1G}$ | 0 | 0 | 0 | 0 |
| (3) | $f_1/f_t$ | 0.625 | 0.648 | 0.659 | 0.657 |
| (4) | $|f_2/f_t|$ | 0.166 | 0.162 | 0.171 | 0.160 |
| (5) | $f_3/f_t$ | 0.235 | 0.224 | 0.234 | 0.216 |
| (6) | $f_4/f_t$ | 0.462 | 0.521 | 0.592 | 0.512 |
| (7) | $v_{d1p} - v_{d1n}$ | 60.896 | 60.896 | 60.896 | 60.896 |
| (8) | $v_{d1p}$ | 81.540 | 81.540 | 81.540 | 81.540 |
| (9) | $v_{d3p}$ | 81.540 | 81.540 | 52.430 | 81.540 |
| (10) | $n_{d1n}$ | 2.002 | 2.002 | 2.002 | 2.002 |
| (11) | $n_{d2n}$ | 1.835 | 1.835 | 1.835 | 1.806 |
| (12) | $n_{d2p}$ | 1.923 | 1.923 | 1.923 | 1.923 |
| (13) | $SF_{1p}$ | -0.156 | -0.138 | -0.153 | -0.187 |
| (14) | $(\beta_{2t}/\beta_{2w})/(\beta_{3t}/\beta_{3w})$ | 1.955 | 1.754 | 1.580 | 1.608 |
| (15) | $\beta_{2t}/\beta_{2w}$ | 3.389 | 3.239 | 3.122 | 3.094 |
| (16) | $\beta_{3t}/\beta_{3w}$ | 1.733 | 1.847 | 1.975 | 1.924 |
| (17) | $\beta_{4t}/\beta_{4w}$ | 1.145 | 1.123 | 1.091 | 1.129 |
| (18) | $(D_{2w} + D_{1t})/f_t$ | 0.602 | 0.596 | 0.627 | 0.588 |
| (19) | $D_{2w}/f_t$ | 0.312 | 0.295 | 0.320 | 0.281 |

-continued

| | | | | |
|---|---|---|---|---|
| (20) $D_1/f_t$ | 0.290 | 0.301 | 0.307 | 0.307 |
| (21) $T_L/f_t$ | 1.109 | 1.116 | 1.116 | 1.116 |

In the following embodiments, a zoom lens optical system having a seven times high zooming ratio, in which easy slimming of a camera is taken into consideration has been realized. Naturally, an image quality of an image taken is maintained to be favorable, and moreover, it is a low cost zoom lens optical system which is suitable for use in an electronic image pickup element such as a CCD and a CMOS.

Moreover, a flare aperture, apart from the aperture stop, may be disposed for cutting unnecessary light such as a ghost and a flare. The flare aperture may be disposed at any of locations namely, on the object side of the first lens unit, between the first lens unit and the second lens unit, between the second lens unit and the third lens unit, between the third lens unit and the fourth lens unit, and between the fourth lens unit and the image surface. An arrangement may be made such that flare light rays are cut by a frame member, or another member may be arranged. Moreover, a direct printing may be carried out, or a paint may be applied, or a seal may be adhered to the optical system. The shape may be any shape such as a circular shape, an elliptical shape, a rectangular shape, a polygon, and an area surrounded by a function curve. Moreover, not only harmful light beam, but also light beam such as a coma flare around a screen may be cut.

Moreover, the ghost and the flare may be reduced by applying an antireflection coating to each lens. A multi-coating is desirable, as the multi-coating is capable of reducing effectively the ghost and the flare. Moreover, an infra-red rays cutting coating may be applied to the lens surfaces and cover glasses.

Moreover, it is desirable that focusing is carried out by moving the fourth lens unit. When the focusing is carried out by moving the fourth lens unit, since the lenses are light weight, a load on a motor is small. Furthermore, since the overall length does not change at the time of focusing, and a drive motor can be disposed inside a lens frame, it is advantageous for making the lens frame compact. Although the focusing is desirable in the fourth lens unit as described above, it may be carried out by (in) the first lens unit, the second lens unit, and the third lens unit. The focusing may also be carried out by moving a plurality of lens units. Moreover, the focusing may be carried out by drawing out the entire lens system, or by drawing out some of the lenses, or the focusing may be carried over.

The shading in a portion surrounding an image may be reduced by shifting a micro lens of the CCD. For instance, a design of the micro lens of the CCD may be changed according to an angle of incidence of light rays for each image height. Moreover, an amount of degradation in the portion surrounding an image may be corrected by an image processing.

Moreover, a distortion may be let to occur intentionally in the optical system, and the distortion may be corrected by carrying out electrically an image processing after taking pictures.

Incidentally, for preventing the occurrence of the ghost and the flare, generally, the antireflection coating is applied to a surface of a lens in contact with air.

On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, when the antireflection coating is applied positively even to the cemented surface, it is possible to reduce further the ghost and the flare, and to achieve a more favorable image.

Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. In these patent literatures, a cemented lens surface coating in a first lens unit of a positive preceding zoom lens system has been described, and the same as disclosed in these patent literatures, may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit, it is effective to apply the coating on the cemented surface based on a similar idea.

(Correction of Distortion)

Incidentally, when the zoom lens system of the present invention is used, a digital correction of distortion of an image is carried out electrically. A basic concept for the digital correction of the distortion of an image will be described below.

Figure 19:
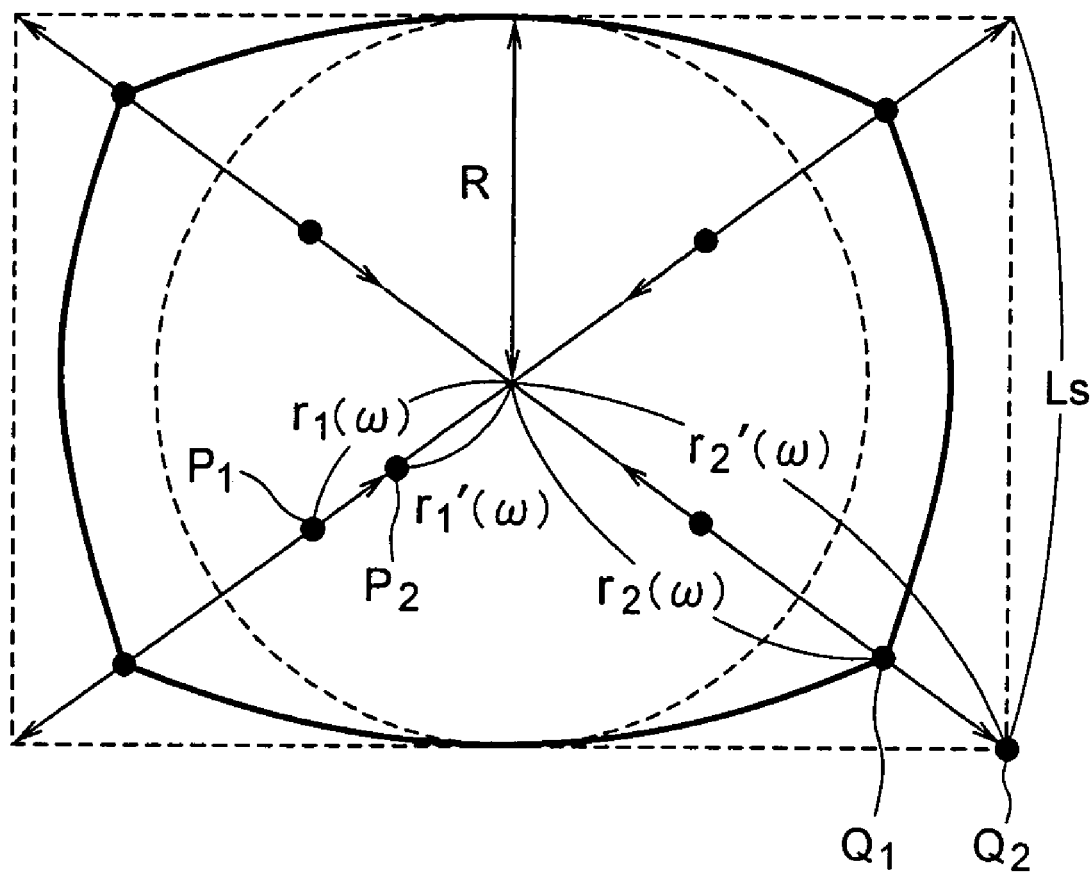
FIG. 19 is a diagram describing a correction of a distortion.

For example, as shown in FIG. 19, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius $r(\omega)$ other than the radius R is moved in a substantial direction of radiation, and the correction is carried out by moving on a concentric circle such that the radius becomes $r'(\omega)$.

For example, in FIG. 19, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, r'(ω) can be expressed as follows.

$$r'(\omega) = \alpha \cdot f \tan \omega (0 \leq \alpha \leq 1)$$

where, ω is a half image angle of an object and f is a focal length of an imaging optical system (the zoom lens system in the present invention).

Here, when an ideal image height corresponding to a circle (image height) of radius R is let to be Y, then $$\alpha = R/Y = R/(f \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup surface (plane), with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it is considered to be advantageous from a point of amount of data and amount of calculation.

Incidentally, an optical image ceases to be a continuous amount at a point of time when an image is picked up by an electronic image pickup element (for sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the zooming (a circle for which the magnification can be fixed) does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be carried out by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image becomes asymmetric. Moreover, it is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that r(ω), in other words, a relationship of half image angle and the image height, or a relationship between a real image height r and an ideal image height r'/α is recorded in a recording medium which is built-in in the electronic image pickup apparatus.

For an image after the distortion correction not to have an extreme shortage of an amount of light at both ends in a direction of short side, the radius R may satisfy the following conditional expression.

$$0 \leq R \leq 0.6 Ls$$

where, Ls is a length of a short side of the effective image pickup plane.

It is preferable that the radius R satisfies the following conditional expression.

$$0.3 Ls \leq R \leq 0.6 Ls$$

Furthermore, it is most advantageous to match the radius R with a radius of a circle making an internal contact in a short side direction of a substantially effective image pickup surface (plane). In a case of correction in which, the magnification is fixed near the radius R=0, in other words, near the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result is obtained which satisfies substantially the following relationship $$r'(\omega) = \alpha \cdot f \tan \omega$$

near a telephoto end in the focal point zones which are divided.

However, in this case, at a wide angle end in the focal point zones which are divided, a barrel-shaped distortion is remained to some extent. Moreover, when the number of divided zones is increased, there arises a need to hold specific data necessary for correction, additionally in a recording medium. For this reason, it is not preferable to increase the number of divided zones. Therefore, one or a plurality of coefficients associated with each focal length in the focal point zones which are divided, are calculated in advance. The coefficients may be determined based on a measurement by simulation or a measurement by actual equipment.

An amount of correction in a case in which, the correction result which satisfies substantially the following relationship $$r'(\omega) = \alpha \cdot f \tan \omega$$

near the telephoto end in the focal point zones which are divided may be calculated, and may be let to be a final amount of correction by multiplying uniformly the coefficient for each focal length with respect to this amount of correction.

Incidentally, when there is no distortion in an image obtained by imaging (forming an image) of an infinite object, the following relationship $$f = y/\tan \omega$$

holds.

Here, Y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shaped distortion in the imaging system, the relationship becomes $$f > y/\tan \omega.$$

In other words, when the focal length f of the imaging system, and the image height y are let to be fixed, a value of ω becomes large.

(Digital Camera)

Figure 20:
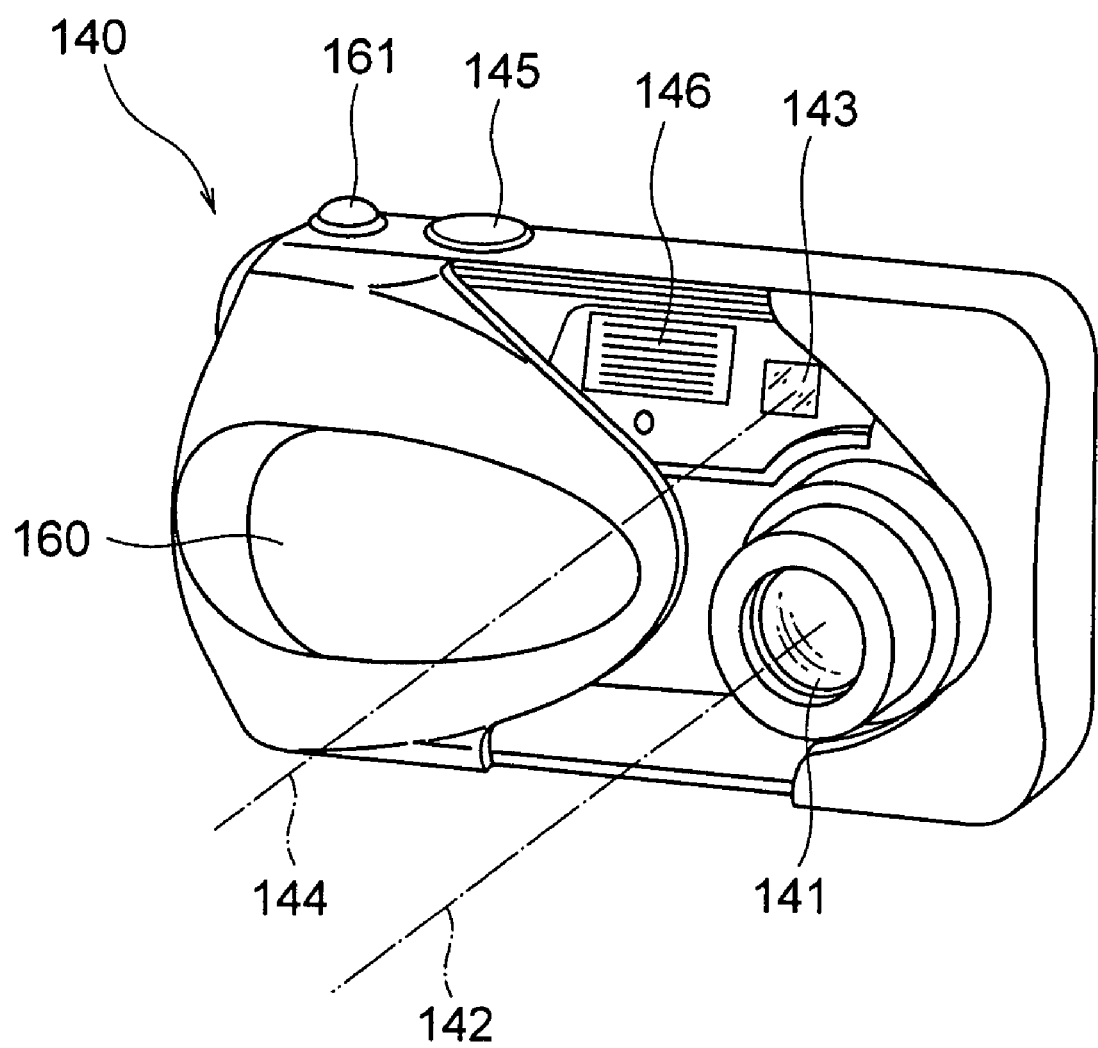
FIG. 20 is a front perspective view showing an appearance of a digital camera in which, the zoom lens system according to the present invention is incorporated.
Figure 21:
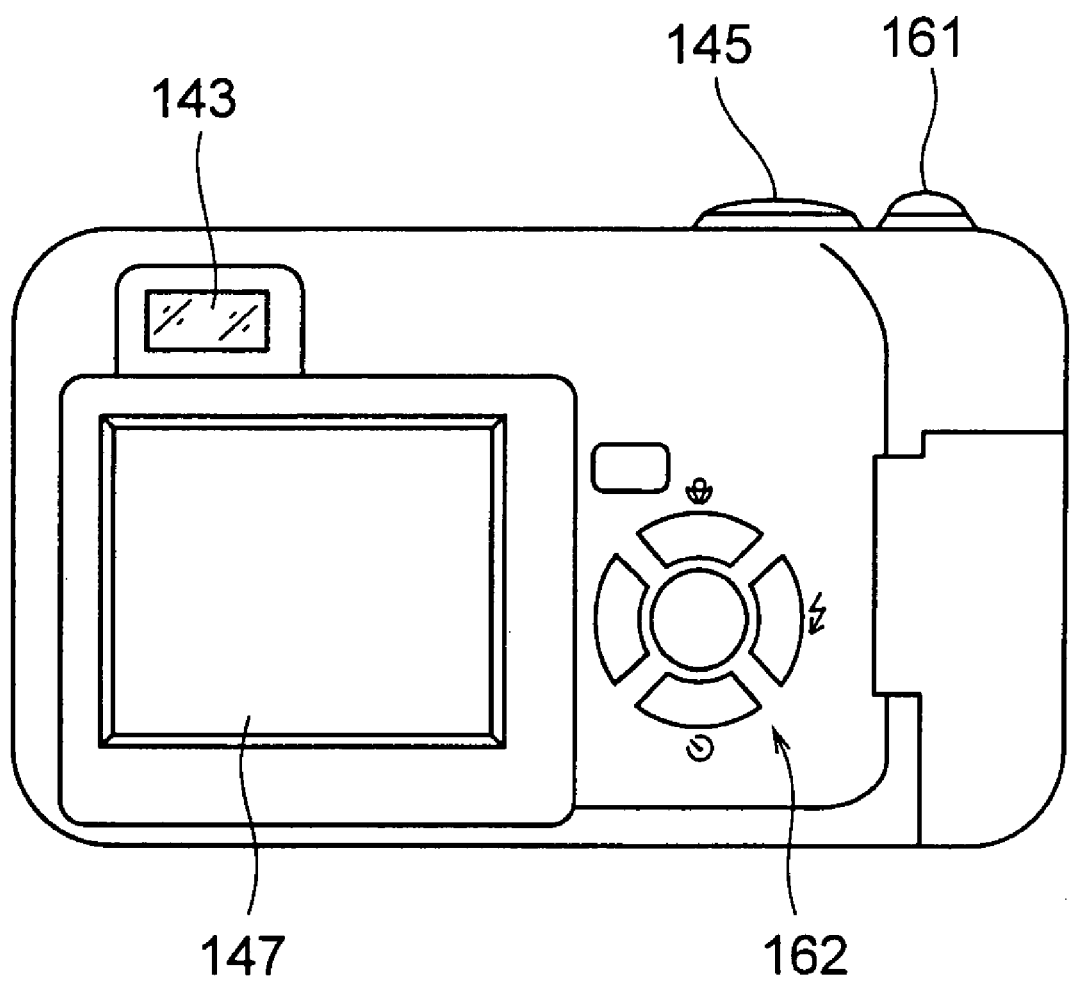
FIG. 21 is a rear perspective view of the digital camera in FIG. 20.
Figure 22:
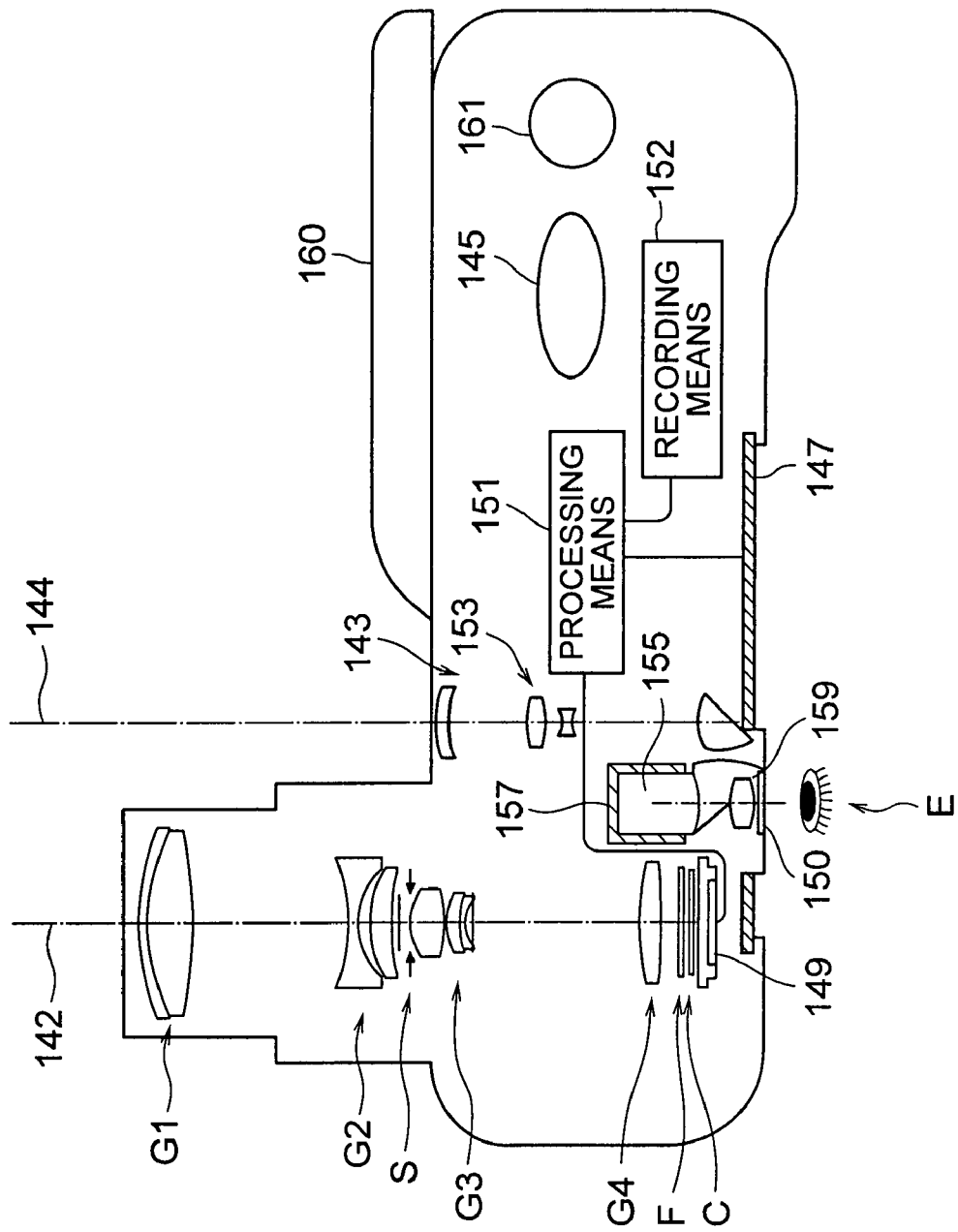
FIG. 22 is a cross-sectional view of the digital camera in FIG. 20.

FIG. 20 and FIG. 22 are conceptual diagrams of a structure of a digital camera according to the present invention in which, a zoom lens system described above is incorporated in a taking optical system 141. FIG. 20 is a front perspective view showing an appearance of a digital camera 140, FIG. 21 is a rear perspective view of the same, and FIG. 22 is a schematic cross-sectional view showing a structure of the digital camera 140. FIG. 20 and FIG. 22, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera 140 is set in a photo taking state, the taking optical system 141 assumes the uncollapsed state shown in FIG. 20, and when the shutter button 145 disposed on an upper potion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver salt film is disposed instead of the CCD 149.

Furthermore, a finder objective optical system 153 is disposed on the finder optical path 144. The finder objective optical system 153 consists of a plurality of lens units (three lens units in the diagram), and two prisms, and is made of a zoom optical system in which, a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141, which, according to the present invention, has an extremely small thickness in collapsed state, and an extremely stable imaging performance in the entire zooming range at high magnification, it is possible to realize a high-performance, a small size, and a widening of angle.

(Internal Circuit Structure)

Figure 23:
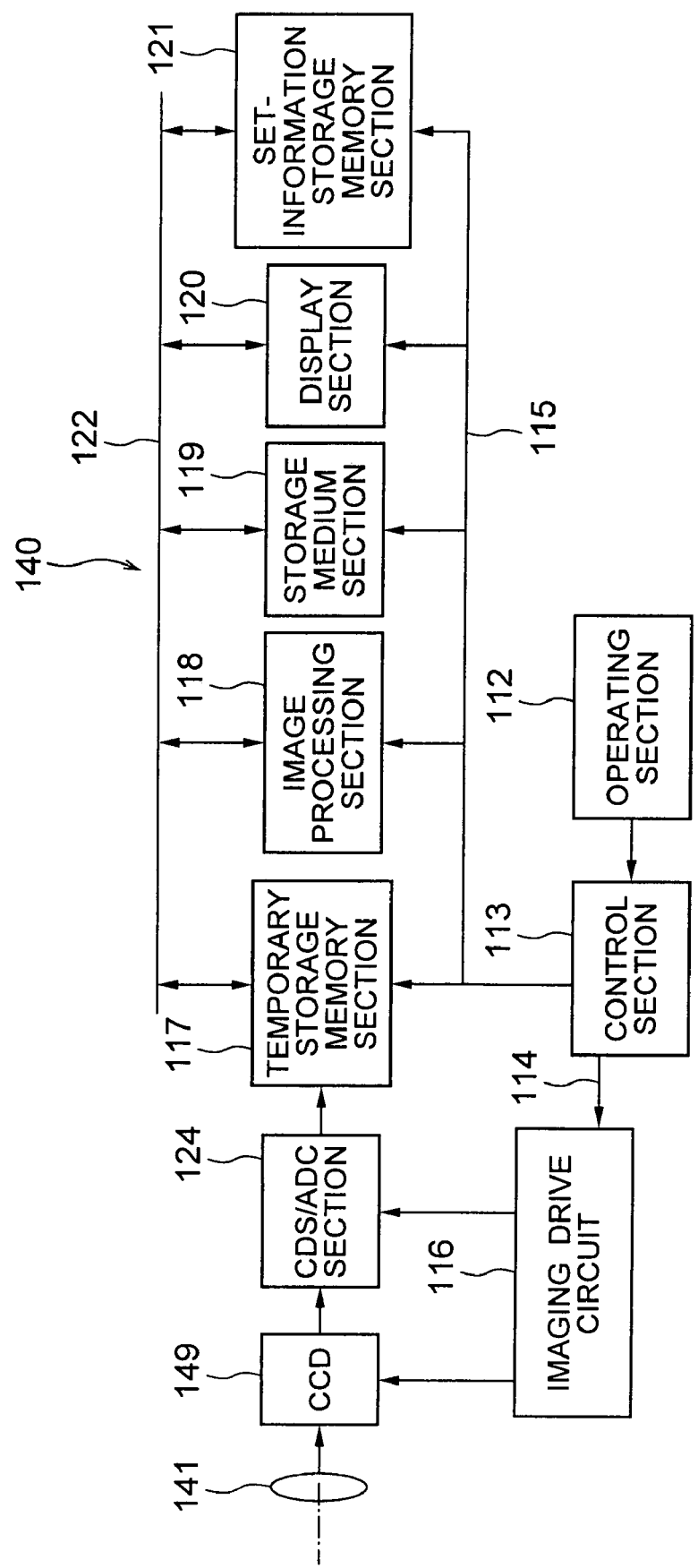
FIG. 23 is a structural block diagram of an internal circuit of main components of a digital camera.

FIG. 23 is a structural block diagram of an internal circuit of main components of the digital camera 140. In the following description, the processing means 151 described above includes for instance, a CDS/ADC section 124, a temporary storage memory 117, and an image processing section 118, and a storage means consists of a storage medium section 119, for example.

As shown in FIG. 23, the digital camera 140 includes an operating section 112, a control section 113 which is connected to the operating section 112, the temporary storage memory 117, and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light, an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117, image raw data (bare data, hereinafter called as 'RAW data) which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically, various image-processing including the distortion correction, based on image-quality parameters specified by the control section 113.

The storage medium section 119 is a recording medium in the form of a card or a stick including a flash memory for instance, which is detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141 according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As it has been described above, the present invention is useful for a zoom lens system having a high magnification ratio of about seven times, in which, the slimming of the digital camera is taken into consideration.

What is claimed is:

1. A zoom lens system comprising, in order from an object side:
a first lens unit having a positive refracting power;
a second lens unit having a negative refracting power; and
a third lens unit having a positive refracting power, wherein:
at a time of zooming from a wide angle end to a telephoto end, each of spaces between the lens units changes, and
the second lens unit comprises a biconcave negative lens which is disposed nearest to the object side, and satisfies the following conditional expressions (1), and
the total number of lenses in the second lens unit is not more than three, and
the zoom lens system satisfies the following conditional expression (2)

$$-1.0 < SF_{2n1} < 0.5 \quad (1)$$

$$3.0 < f_t/f_w < 12.0 \quad (2)$$

where,
$SF_{2n1}$ is defined as $SF_{2n1} = (R_{2n1f} + R_{2n1r})/(R_{2n1f} - R_{2n1r})$, when
$R_{2n1f}$ is a paraxial radius of curvature of a surface on the object side, of the negative lens disposed nearest to the object side, in the second lens unit,
$R_{2n1r}$ is a paraxial radius of curvature of a surface on an image side of the negative lens disposed nearest to the object side, in the second lens unit,
$f_w$ is a focal length of an entire zoom lens system, at the wide angle end, and
$f_t$ is a focal length of the entire zoom lens system, at the telephoto end, and
the first lens unit comprises in order from the object side, a negative lens having a concave surface directed toward an image side, and a biconvex positive lens, and
the total number of lenses in the first lens unit is two, and
the zoom lens system satisfies the following conditional expressions $$1.0 < R_{1pr}/R_{2n1f} < 5.0 \quad (A),$$

$$0.5 < SF_{1n} < 30.0 \quad (B), \text{ and}$$

$$0.1 < R_{1nr}/R_{1pf} < 10.0 \quad (C)$$

where,
$R_{1pr}$ denotes a paraxial radius of curvature of a surface on the image side, of the positive lens in the first lens unit,
$SF_{0.1n}$ is defined as $SF_{1n} = (R_{1nf} + R_{1nr})/(R_{1nf} - R_{1nr})$, when
$R_{1nf}$ denotes a paraxial radius of curvature of a surface on the object side, of the negative lens in the first lens unit,
$R_{1nr}$ denotes a paraxial radius of curvature of a surface on the image side, of the negative lens in the first lens unit, and
$R_{1pf}$ denotes a paraxial radius of curvature of a surface on the object side, of the positive lens in the first lens unit.

2. The zoom lens system according to claim 1, comprising, in order from the object side:
the first lens unit;
the second lens unit;
the third lens unit; and
a fourth lens unit having a positive refracting power.

3. The zoom lens system according to claim 2, wherein the zoom lens system satisfies the following conditional expression $$0.10 < f_4/f_t < 0.70 \quad (6)$$

where,
$f_4$ denotes a focal length of the fourth lens unit, and
$f_t$ denotes a focal length of the entire zoom lens system at a telephoto end.

4. The zoom lens system according to claim 1, wherein the first lens unit satisfies the following conditional expression $$0 \leq d_{12}/\Sigma_{1G} < 0.2 \quad (D)$$

where,
$d_{12}$ denotes an optical axial distance between the negative lens and the positive lens in the first lens unit, and
$\Sigma_{1G}$ denotes an optical axial thickness of the first lens unit.

5. The zoom lens system according to claim 1, wherein the zoom lens system satisfies the following conditional expression $$0.40 < f_1/f_t < 0.90 \quad (3)$$

where,
$f_1$ denotes a focal length of the first lens unit, and
$f_t$ denotes a focal length of the entire zoom lens system at a telephoto end.

6. The zoom lens system according to claim 1, wherein the zoom lens system satisfies the following conditional expression $$0.10 < |f_2/f_t| < 0.20 \quad (4)$$

where,
$f_2$ denotes a focal length of the second lens unit, and
$f_t$ denotes a focal length of the entire zoom lens system at a telephoto end.

7. The zoom lens system according to claim 1, wherein the zoom lens system satisfies the following conditional expression $$0.10 < f_3/f_t < 0.30 \quad (5)$$

where,
$f_3$ denotes a focal length of the third lens unit, and
$f_t$ denotes a focal length of the entire zoom lens system at a telephoto end.

8. The zoom lens system according to claim 1, wherein the zoom lens system satisfies the following conditional expression $$62.0 < \nu_{dip} < 95.0 \quad (8)$$

where,
$\nu_{dip}$ denotes an Abbe's number for a d-line of the positive lens in the first lens unit.

9. The zoom lens system according to claim 1, wherein the zoom lens system satisfies the following conditional expression $$1.76 < n_{d2n} < 2.00 \quad (11)$$

where,
- $n_{d2n}$ denotes a refractive index for a d-line, of the biconcave negative lens in the second lens unit.

10. The zoom lens system according to claim 1, wherein the second lens unit comprises a positive lens which is disposed nearest to the image side, or second from the image side, and which satisfies the following conditional expression $$1.80 < n_{d2p} < 2.15 \quad (12)$$

where,
- $n_{d2p}$ denotes a refractive index for a d-line, of the positive lens in the second lens unit.

11. The zoom lens system according to claim 1, wherein the zoom lens satisfies the following conditional expression $$-0.8 < SF_{1p} < -0.1 \quad (13)$$

where,
- $SF_{1p}$ is defined as $SF_{1p} = (R_{1pf} + R_{1pr})/(R_{1pf} - R_{1pr})$, when
- $R_{1pf}$ is a paraxial radius of curvature of a surface on an object side, of the positive lens in the first lens unit, and
- $R_{1pr}$ is a paraxial radius of curvature of a surface on an image side, of the positive lens in the first lens unit.

12. The zoom lens system according to claim 1, wherein the zoom lens system satisfies the following conditional expression $$0.1 < D_{2w}/f_t < 0.5 \quad (19)$$

where,
- $D_{2w}$ denotes an air space on an optical axis, between the second lens unit and the third lens unit at a wide angle end, and
- $f_t$ denotes a focal length of the entire zoom lens system, at a telephoto end.

13. The zoom lens system according to claim 1, wherein the zoom lens system satisfies the following conditional expression $$0.2 < D_{1t}/f_t < 0.5 \quad (20)$$

where
- $D_{1t}$ denotes an air space on an optical axis, between the second lens unit and the first lens unit at a telephoto end, and
- $f_t$ denotes a focal length of the entire zoom lens system, at the telephoto end.

14. The zoom lens system according to claim 1, wherein the second lens unit comprises, in order from an object side thereof, a negative lens, a negative lens, and a positive lens, and
the total number of lenses in the second lens unit is three.

15. The zoom lens system according to claim 1, wherein the total number of lenses in the third lens unit is not more than three.

16. The zoom lens system according to claim 15, wherein the third lens unit comprises, in order from an object side thereof, a positive lens, a positive lens, and a negative lens, and
the negative lens is cemented to the adjacent positive lens, and the negative lens and the positive lens form a cemented doublet.

17. An electronic image pickup apparatus comprising:
a zoom lens system according to claim 1; and
an electronic image pickup element, which is disposed at an image side of the zoom lens system, and which converts an image formed by the zoom lens system, to an electronic signal.

18. The electronic image pickup apparatus according to claim 17, further comprising:
a processing section, which electrically corrects a distortion of the zoom lens system, based on the electric signal converted by the electronic image pickup element.

19. A zoom lens system comprising, in order from an object side:
a first lens unit having a positive refracting power;
a second lens unit having a negative refracting power; and
a third lens unit having a positive refracting power,
wherein:
at a time of zooming from a wide angle end to a telephoto end, each of spaces between the lens units changes, and
the second lens unit comprises a biconcave negative lens which is disposed nearest to the object side, and satisfies the following conditional expressions (1), and
the total number of lenses in the second lens unit is not more than three, and
the zoom lens system satisfies the following conditional expression (2)

$$-1.0 < SF_{2n1} < 0.5 \quad (1)$$

$$3.0 < f_t/f_w < 12.0 \quad (2)$$

where,
- $SF_{2n1}$ is defined as $SF_{2n1} = (R_{2n1f} + R_{2n1r})/(R_{2n1f} - R_{2n1r})$, when
- $R_{2n1f}$ is a paraxial radius of curvature of a surface on the object side, of the negative lens disposed nearest to the object side, in the second lens unit,
- $R_{2n1r}$ is a paraxial radius of curvature of a surface on an image side of the negative lens disposed nearest to the object side, in the second lens unit,
- $f_w$ is a focal length of an entire zoom lens system, at the wide angle end, and
- $f_t$ is a focal length of the entire zoom lens system, at the telephoto end, and
a surface nearest to an image side, of the second lens unit is a concave surface, and
the third lens unit comprises a positive lens which is disposed nearest to the object side, and of which, a surface on the object side is a convex surface, and
the zoom lens system satisfies the following conditional expression $$62.0 < v_{d3p} < 95.0 \quad (9)$$

where,
- $v_{d3p}$ denotes an Abbe's number for a d-line of the positive lens in the third lens unit.

20. A zoom lens system comprising, in order from an object side:
a first lens unit having a positive refracting power;
a second lens unit having a negative refracting power; and
a third lens unit having a positive refracting power,
wherein:
at a time of zooming from a wide angle end to a telephoto end, each of spaces between the lens units changes, and
the second lens unit comprises a biconcave negative lens which is disposed nearest to the object side, and satisfies the following conditional expressions (1), and
the total number of lenses in the second lens unit is not more than three, and
the zoom lens system satisfies the following conditional expression (2)

$$-1.0 < SF_{2n1} < 0.5 \quad (1)$$

$$3.0 < f_t/f_w < 12.0 \quad (2)$$

where, $SF_{2n1}$ is defined as $SF_{2n1}=(R_{2n1f}+R_{2n1r})/(R_{2n1f}-R_{2n1r})$, when $R_{2n1f}$ is a paraxial radius of curvature of a surface on the object side, of the negative lens disposed nearest to the object side, in the second lens unit, $R_{2n1r}$ is a paraxial radius of curvature of a surface on an image side of the negative lens disposed nearest to the object side, in the second lens unit, $f_w$ is a focal length of an entire zoom lens system, at the wide angle end, and $f_t$ is a focal length of the entire zoom lens system, at the telephoto end, and the zoom lens system satisfies the following conditional expression $$1.0<(\beta_{2t}/\beta_{2w})/(\beta_{3t}/\beta_{3w})<2.5 \quad (14)$$

where, $\beta_{2w}$ denotes a lateral magnification of the second lens unit, at a wide angle end, $\beta_{2t}$ denotes a lateral magnification of the second lens unit, at a telephoto end, $\beta_{3w}$ denotes a lateral magnification of the third lens unit, at the wide angle end, and $\beta_{3t}$ denotes a lateral magnification of the third lens unit at the telephoto end.

21. A zoom lens system comprising, in order from an object side:

a first lens unit having a positive refracting power;
a second lens unit having a negative refracting power; and
a third lens unit having a positive refracting power, wherein:

at a time of zooming from a wide angle end to a telephoto end, each of spaces between the lens units changes, and the second lens unit comprises a biconcave negative lens which is disposed nearest to the object side, and satisfies the following conditional expressions (1), and the total number of lenses in the second lens unit is not more than three, and the zoom lens system satisfies the following conditional expression (2)

$$-1.0<SF_{2n1}<0.5 \quad (1)$$

$$3.0<f_t/f_w<12.0 \quad (2)$$

where, $SF_{2n1}$ is defined as $SF_{2n1}=(R_{2n1f}+R_{2n1r})/(R_{2n1f}-R_{2n1r})$, when $R_{2n1f}$ is a paraxial radius of curvature of a surface on the object side, of the negative lens disposed nearest to the object side, in the second lens unit, $R_{2n1r}$ is a paraxial radius of curvature of a surface on an image side of the negative lens disposed nearest to the object side, in the second lens unit, $f_w$ is a focal length of an entire zoom lens system, at the wide angle end, and $f_t$ is a focal length of the entire zoom lens system, at the telephoto end, and the zoom lens system satisfies the following conditional expression $$2.6<\beta_{2t}/\beta_{2w}<6.0 \quad (15)$$

where, $\beta_{2w}$ is a lateral magnification at a wide angle end, of the second lens unit, and $\beta_{2t}$ is a lateral magnification at a telephoto end, of the second lens unit.

22. A zoom lens system comprising, in order from an object side:

a first lens unit having a positive refracting power;
a second lens unit having a negative refracting power; and
a third lens unit having a positive refracting power, wherein:

at a time of zooming from a wide angle end to a telephoto end, each of spaces between the lens units changes, and the second lens unit comprises a biconcave negative lens which is disposed nearest to the object side, and satisfies the following conditional expressions (1), and the total number of lenses in the second lens unit is not more than three, and the zoom lens system satisfies the following conditional expression (2)

$$-1.0<SF_{2n1}<0.5 \quad (1)$$

$$3.0<f_t/f_w<12.0 \quad (2)$$

where, $SF_{2n1}$ is defined as $SF_{2n1}=(R_{2n1f}+R_{2n1r})/(R_{2n1f}-R_{2n1r})$, when $R_{2n1f}$ is a paraxial radius of curvature of a surface on the object side, of the negative lens disposed nearest to the object side, in the second lens unit, $R_{2n1r}$ is a paraxial radius of curvature of a surface on an image side of the negative lens disposed nearest to the object side, in the second lens unit, $f_w$ is a focal length of an entire zoom lens system, at the wide angle end, and $f_t$ is a focal length of the entire zoom lens system, at the telephoto end, and the zoom lens system satisfies the following conditional expression $$1.2<\beta_{3t}/\beta_{3w}<3.0 \quad (16)$$

where, $\beta_{3w}$ denotes a lateral magnification at a wide angle end, of the third lens unit, and $\beta_{3t}$ denotes a lateral magnification at a telephoto end, of the third lens unit.

23. A zoom lens system comprising, in order from an object side:

a first lens unit having a positive refracting power;
a second lens unit having a negative refracting power;
a third lens unit having a positive refracting power; and
a fourth lens unit having a positive refracting power, wherein:

at a time of zooming from a wide angle end to a telephoto end, each of spaces between the lens units changes, and the second lens unit comprises a biconcave negative lens which is disposed nearest to the object side, and satisfies the following conditional expressions (1), and the total number of lenses in the second lens unit is not more than three, and the zoom lens system satisfies the following conditional expression (2)

$$-1.0<SF_{2n1}<0.5 \quad (1)$$

$$3.0<f_t/f_w<12.0 \quad (2)$$

where, $SF_{2n1}$ is as $SF_{2n1}=(R_{2n1f}+R_{2n1r})/(R_{2n1f}-R_{2n1r})$, when $R_{2n1f}$ is a paraxial radius of curvature of a surface on the object side, of the negative lens disposed nearest to the object side, in the second lens unit, $R_{2n1r}$ is a paraxial radius of curvature of a surface on an image side of the negative lens disposed nearest to the object side, in the second lens unit, $f_w$ is a focal length of an entire zoom lens system, at the wide angle end, and $f_t$ is a focal length of the entire zoom lens system, at the telephoto end, and the zoom lens system satisfies the following conditional expression $$0.7 < \beta_{4t}/\beta_{4w} < 1.7 \quad (17)$$

where, $\beta_{4w}$ denotes a lateral magnification of the fourth lens unit, at a wide angle end, and $\beta_{4t}$ denotes a lateral magnification of the fourth lens unit, at a telephoto end.

24. A zoom lens system comprising, in order from an object side:

a first lens unit having a positive refracting power;

a second lens unit having a negative refracting power;

a third lens unit having a positive refracting power; and a fourth lens unit having a positive refracting power, wherein:

at a time of zooming from a wide angle end to a telephoto end, each of spaces between the lens units changes, and the second lens unit comprises a biconcave negative lens which is disposed nearest to the object side, and satisfies the following conditional expressions (1), and the total number of lenses in the second lens unit is not more than three, and the zoom lens system satisfies the following conditional expression (2)

$$-1.0 < SF_{2n1} < 0.5 \quad (1)$$

$$3.0 < f_t/f_w < 12.0 \quad (2)$$

where, $SF_{2n1}$ is defined as $SF_{2n1} = (R_{2n1f} + R_{2n1r})/(R_{2n1f} - R_{2n1r})$, when $R_{2n1f}$ is a paraxial radius of curvature of a surface on the object side, of the negative lens disposed nearest to the object side, in the second lens unit, $R_{2n1r}$ is a paraxial radius of curvature of a surface on an image side of the negative lens disposed nearest to the object side, in the second lens unit, $f_w$ is a focal length of an entire zoom lens system, at the wide angle end, and $f_t$ is a focal length of the entire zoom lens system, at the telephoto end, and the first lens unit, the second lens unit, the third lens unit, and the fourth lens unit move at the time of zooming, and the zoom lens system further comprising:

an aperture stop which moves integrally with the third lens unit in an optical-axis direction.

25. The zoom lens system according to claim 24, wherein at the time of zooming from the wide angle end to the telephoto end, the first lens unit moves to be positioned at an object side, at a telephoto end rather than a wide angle end, and the second lens unit moves, the third lens unit moves toward an object side, and the fourth lens unit moves.

26. The zoom lens system according to claim 24, wherein the aperture stop is disposed between the second lens unit and the third lens unit.

* * * * *